United States Patent [19]

Suzuki et al.

[11] Patent Number: 5,206,687
[45] Date of Patent: Apr. 27, 1993

[54] COLOR MARKING APPARATUS FOR A RECORDING APPARATUS

[75] Inventors: Takanobu Suzuki; Michihiro Kawamura; Akio Arai; Kiyoshi Matsuzawa; Takeshi Huruya; Satoshi Ootani; Mamoru Kobayashi, all of Kanagawa, Japan

[73] Assignee: Fuji Xerox Co., Ltd., Tokyo, Japan

[21] Appl. No.: 320,269

[22] Filed: Dec. 2, 1988

[30] Foreign Application Priority Data

| May 15, 1987 | [JP] | Japan | 62-116918 |
| May 15, 1987 | [JP] | Japan | 62-116919 |
| May 15, 1987 | [JP] | Japan | 62-116920 |
| Jun. 10, 1987 | [JP] | Japan | 62-143306 |

[51] Int. Cl.⁵ ............... G03G 21/00; G03G 15/01
[52] U.S. Cl. ............... 355/214; 355/202; 355/328
[58] Field of Search ........... 355/202, 214, 328, 326, 355/210

[56] References Cited

U.S. PATENT DOCUMENTS

| 4,769,675 | 9/1988 | Watanabe | 355/202 |
| 4,862,219 | 8/1989 | Yoshida et al. | 355/202 |
| 4,935,779 | 6/1990 | Sawada | 355/326 X |
| 4,958,190 | 9/1990 | Ito | 355/326 X |
| 4,989,049 | 1/1991 | Kusuda et al. | 355/326 |

FOREIGN PATENT DOCUMENTS

| 50-62644 | 5/1975 | Japan. |
| 57-77140 | 5/1982 | Japan. |
| 59-78371 | 5/1984 | Japan. |
| 63-59462 | 4/1988 | Japan. |
| 63-191173 | 8/1988 | Japan. |

Primary Examiner—Fred L. Braun
Attorney, Agent, or Firm—Finnegan, Henderson, Farabow, Garrett and Dunner

[57] ABSTRACT

A color marking apparatus for marking designated areas of an original with a designated color by recording the whole area of an original with a first color, such as black. Desired areas on the original are designated, and the designated areas are colored with a second color different from the first color, and the second color is recorded with a copy density different from the copy density used to record the first color. The color marking apparatus is controlled such that the recording operations of the apparatus are carried out in a selected order.

19 Claims, 41 Drawing Sheets

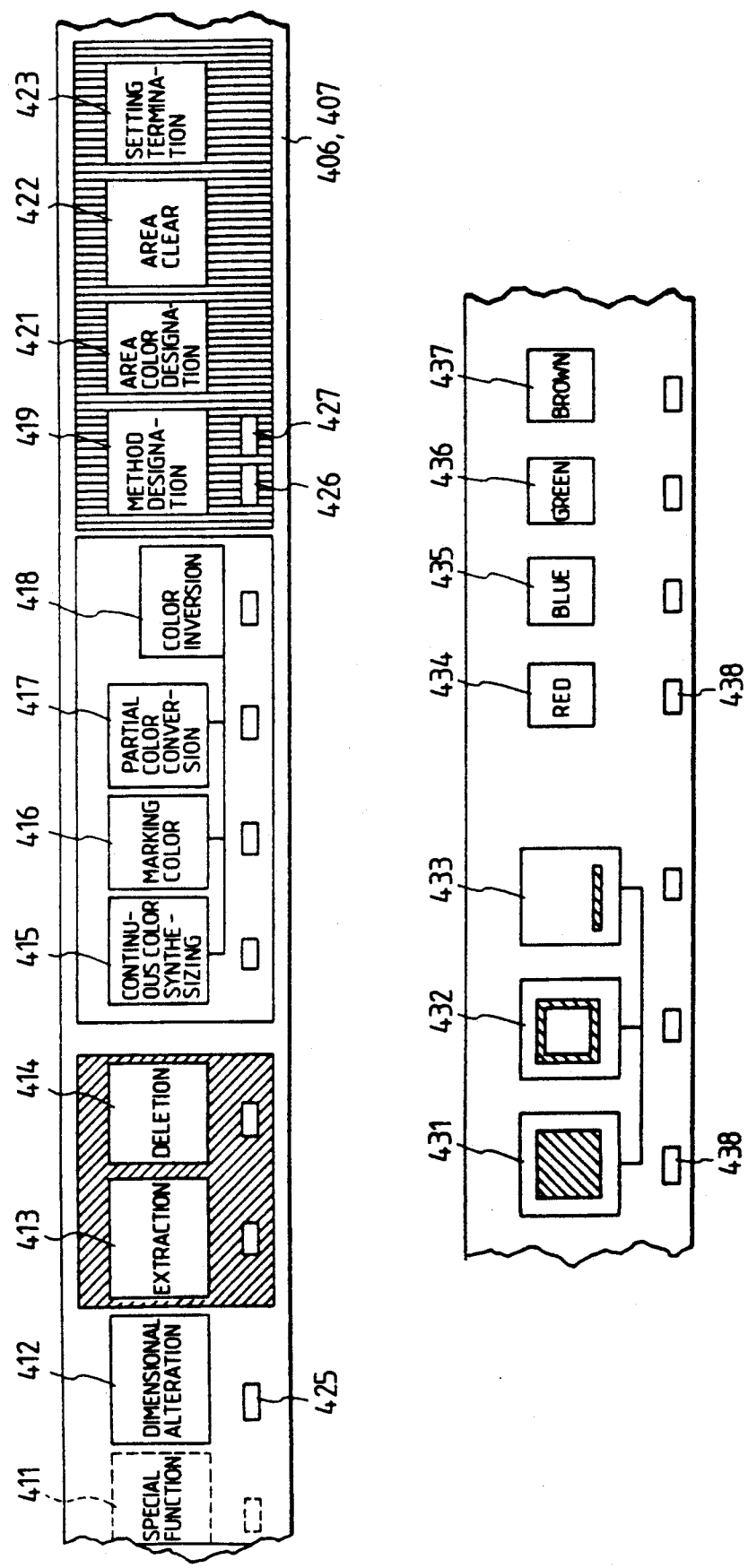

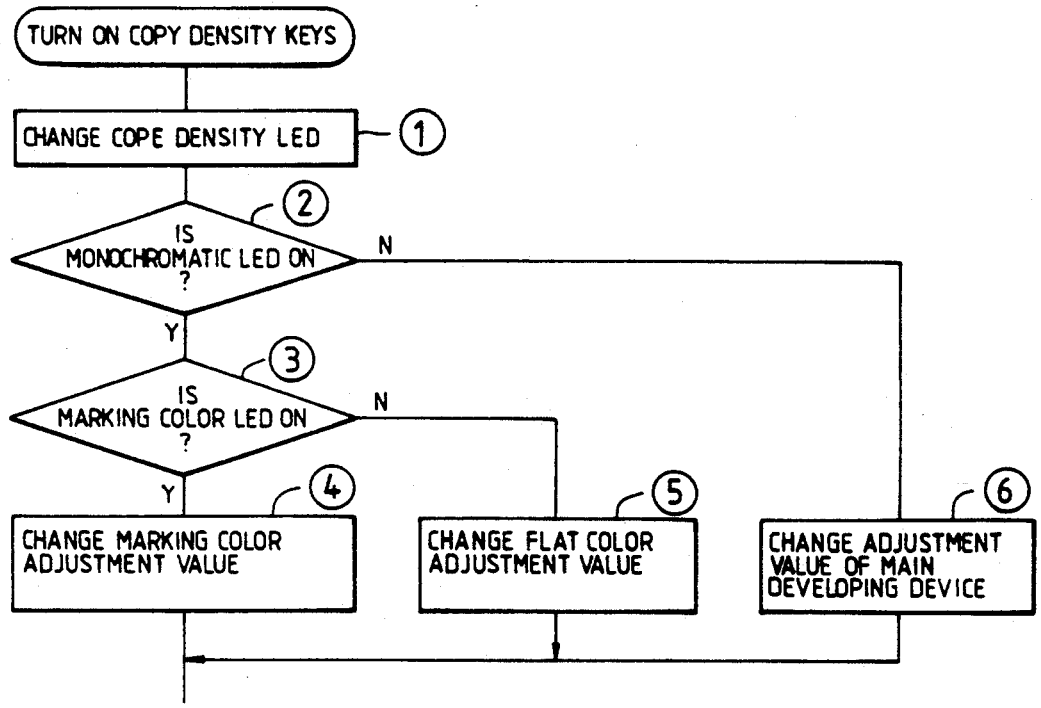
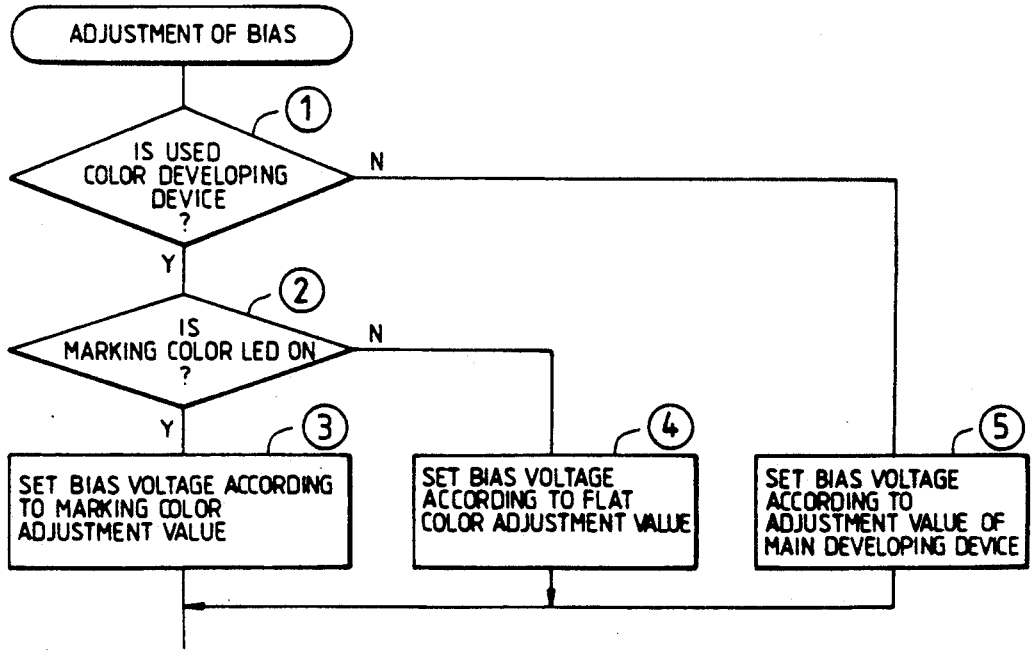

"1"

"R"

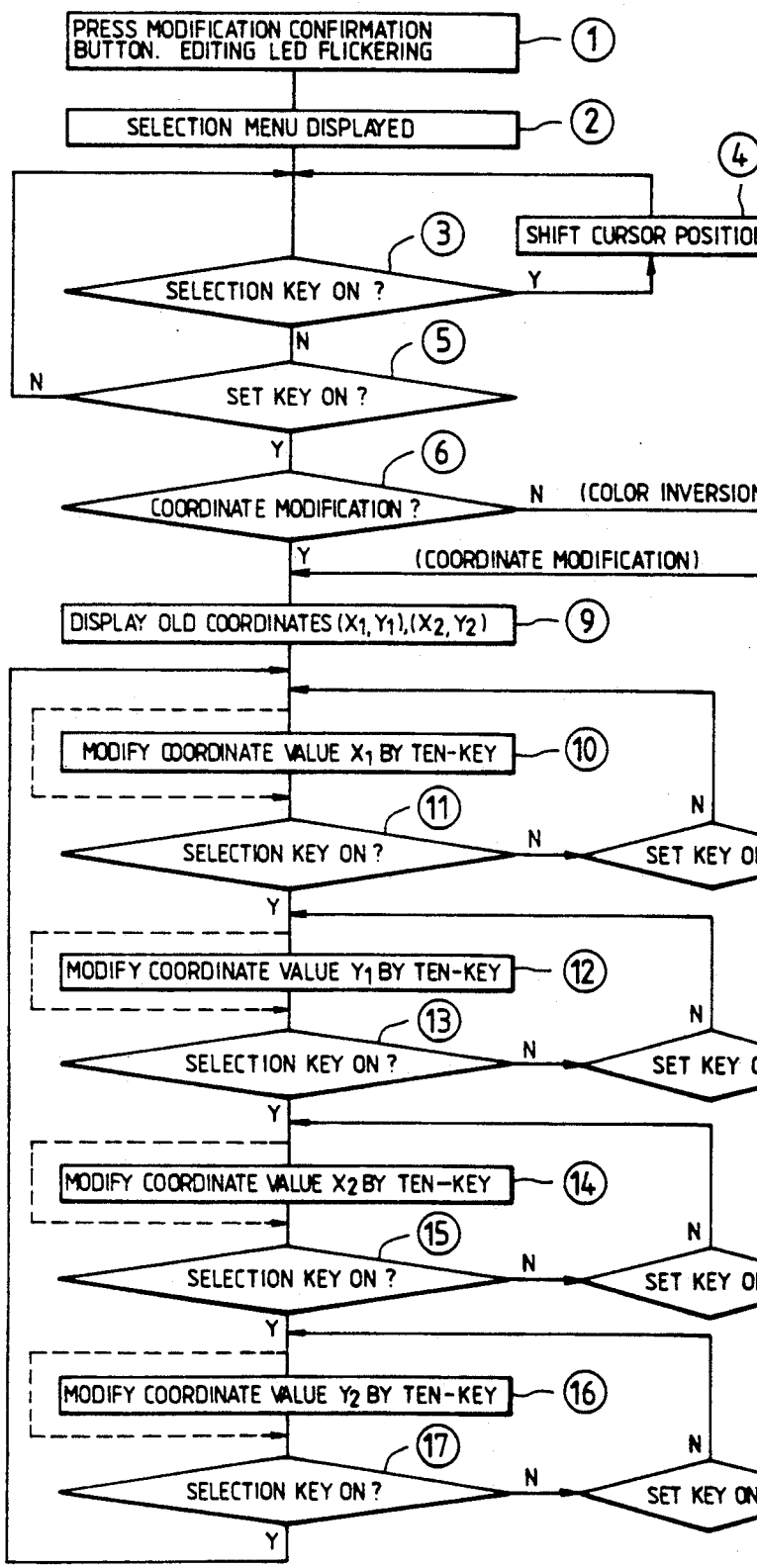
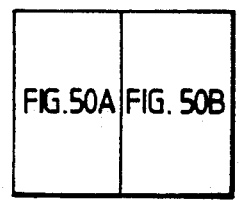
FIG. 50A
FIG. 50

EXAMPLE 1

EXAMPLE 2
FREQUENCY OF MEETING OF QC CIRCLE

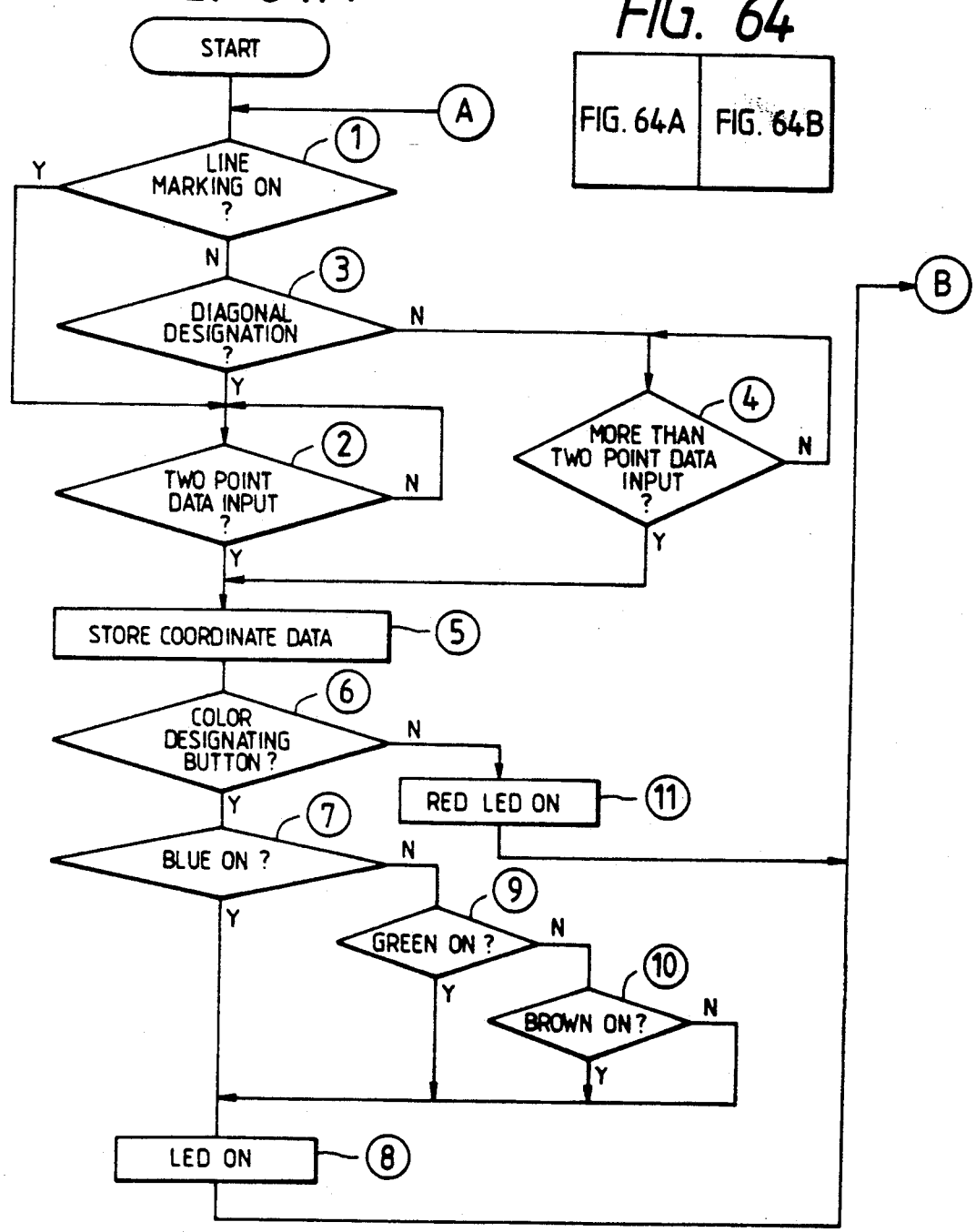

COLOR MARKING APPARATUS FOR A RECORDING APPARATUS

TECHNICAL FIELD

The present invention relates to a color marking apparatus capable of coloring desired parts of images on originals in a recording apparatus such as a copying machine and more particularly to (i) a color marking apparatus capable of effectively using a marking natural to the sense of vision, (ii) a color marking apparatus having the function of modifying the data received for marking and the like, (iii) a color marking apparatus having the function of modifying the data received for marking and the like.

BACKGROUND ART

It is increasingly common to give coloring to documents for use in offices. Colored documents, for instance, have greater visual appeal than monochromatically prepared documents, and an important passage in the colored document can be identified at a glance. Consequently, a color writing instrument using a color such as red is employed to write part of a record to be written in black only. Copying machines capable of accomplishing this effect have been proposed.

Japanese Patent Unexamined Application Publication No. 95457/1985, for instance, discloses a method of forming images of a plurality of original documents using different developing devices. Japanese Patent Unexamined Application Publication No. 166969/1985, on the other hand, discloses a method of reproducing in color data in an area of an original which has been specified for color recording. Further, Japanese Patent Unexamined Application Publication No. 239764/1985 discloses a method of making it possible to copy a specified image area from an original and reproduce it onto a desired area of copying paper and simultaneously copy the image area in a desired color.

However, (i) recording a portion of the image data on a document in a color other than black by means of a color-ink writing instrument is completely reliant on manual work, which is extremely inefficient. Moreover, if that portion of the image is colored unevenly, the quality of the document will not be maintained.

(ii) When part of an area or part of a document is recorded in color using a copying machine, monochromatic and color image data are required to be precisely coordinated with each other.

If character data or the like in a particular area is to be colored differently from data in another area, the reader is required to read the different colored data in the two areas. The problem is that the reader tends to feel visually fatigued. In the case of the electronic copying machine as disclosed in Japanese Patent Unexamined Application Publication No. 166969/1985, an area to be recorded in a color other than black can be specified only after the area designated by an input pen has been recorded in one color. This process of specifying the area to be colored is very troublesome.

An object of the present invention is to provide a color marking apparatus capable of expressing image data itself in a particular area with the same color as that used in another area and marking the image data by making the color of the background of the image data in the specified area different from another area.

Another object of the present invention is to provide a color marking apparatus capable of efficiently performing marking under various conditions of color and density of the document.

Still another object of the present invention is to provide a color marking apparatus with which a marking color can be designated on an area basis.

Another object of the present invention is to provide a color marking apparatus in which input data can readily be modified in order to alter the size of an area or the color for marking or to perform modified operation in consideration of color balance.

DISCLOSURE OF THE INVENTION

As theoretically shown in FIG. 1, a color marking apparatus embodying the present invention includes first recording means 11 for copying the whole area of an original with a first color; area specifying means 12 for specifying an area on the original; second recording means 13 for marking (coloring) the specified area with a desired color other than the first color; selection means 14 for alternatively selecting the recording operations of the first and second recording means 11, 13; and control means 15 for controlling the recording operation in the order in which it is selected.

The first and second recording means 11 and 13 are used to superpose an image and a marking area. The selection means 14 may be used to select the first recording means and then the second recording means, and vice versa.

The apparatus is effective even if the copy density provided by the first recording means is different from what is provided by the second recording means. When the copy density obtained by the second recording means for marking purposes is lower than the copy density obtained by the first recording means and ranges from 0.6 to 1.2 in terms of an optical density, the color in the marking portion becomes suitably light and the image thus superposed can readily be identified.

Differentiating the copy densities attained by the first and second recording means can be effectuated by a combination of three elements when the recording means are used for recording upon the principle of xerography: (i) the amount of charges given to a photoreceptor; (ii) the exposure of the image to the photoreceptor; and (iii) the set value of the bias of the developing electrode.

Since the image data on the original is thus copied with one color according to the present invention, the color gazed at within and without the designated area become the same, so that the copy obtained is visually easy to look at.

The present invention can also be materialized in the form of a color marking apparatus including copy density setting means (vi) for setting the copy densities provided by the first and second recording means separately, in addition to the first recording means (i) for copying the whole area of an original with a first color, the area specifying means (ii) for specifying an area on the original, the second recording means (iii) for marking the specified area with a desired color other than the first color, and the selection means (iv) for alternatively selecting the recording operations of the first and second recording means, and the control means (v) for controlling the recording operations in the order in which they are selected. In this case, the aforesaid objects can be accomplished by making the copy densities in the first and second recording means independently adjustable using the copy density setting means.

The selection means (iv) in the embodiment may be arranged so that it selects the second recording means first and subsequently selects the first recording means, and vice versa. When the second recording means is operated to do marking, the copy density provided by the second recording means should preferably be lower than the copy density provided by the first recording means and should range from 0.6 to 1.2 under normal conditions. Although the first and second recording means may be used for recording on various principles, when these recording means are used for recording upon the principle of xerography, the recording should preferably be implemented by a combination of three elements: (i) the amount of charges given to a photoreceptor; (ii) the exposure of the image to the photoreceptor; and (iii) the set value of the bias of the developing electrode.

The present invention can also be materialized in the form of a color marking apparatus including marking color designating means (vi) for designating a marking color to be provided by the second recording means, in addition to the first recording means (i) for copying the whole area of an original with a first color, the area specifying means (ii) for specifying an area on the original, the second recording means (iii) for marking the specified area with a desired color other than the first color, and the selection means (iv) for alternatively selecting the recording operations of the first and second recording means, and the control means (v) for controlling the recording operation in the order in which it is selected. In this case, the aforesaid objects can be accomplished by having the marking color setting means set the marking color for the second recording means.

The selection means (iv) in the embodiment may be arranged so that it selects the second recording means first and subsequently selects the first recording means, and vice versa. When the second recording means is operated to do marking, the copy density provided by the second recording means should preferably be lower than the copy density provided by the first recording means and should range from 0.6 to 1.2 under normal conditions. Although the first and second recording means may be used for recording on various principles, when these recording means are used for recording upon, e.g., the principle of xerography, the recording should preferably be implemented by a combination of three elements: (i) the amount of charges given to a photoreceptor; (ii) the exposure of the image to the photoreceptor; and (iii) the set value of the bias of the developing electrode.

The color marking apparatus should preferably be equipped with display means, formed with a liquid crystal display or CRT display for displaying a marking area so as to facilitate the marking operation. When the display means is capable of color display for marking a plurality of areas with different colors, respectively, it is convenient if each color is displayed on an area basis. When the display is monochromatic it is convenient if each character or symbol representing the color to be displayed is displayed for each area. When the color marking apparatus according to the present invention is employed, there may arise a case where the result displayed by the display means is checked or where the marking color is partially changed by reference to an actual copy. In this case, it is still convenient if a code designating an area being changed is displayed for each area.

Further, the present invention can be materialized in the form of a color marking apparatus including the first recording means (i) for copying the whole area of an original with a first color, the area specifying means (ii) for specifying an area on the original, the second recording means (iii) for marking the specified area with a desired color other than the first color, the selection means (iv) for alternatively selecting the recording operations of the first and second recording means, the control means (v) for controlling the recording operation in the order in which it is selected, marking color designating means (vi) for designating a marking color for each area specified by the area specifying means, modifying mode setting means (vii) for setting the apparatus to the mode in which the data is modified, and modified contents display means (viii) for displaying the modified contents. In this case, a beginner can confirm how to operate the device by characters if the modified contents display means is designed to display the modified contents in both characters and pictorial symbols (icon), whereas a skilled operator is capable of intuitively understanding the contents of the operation through the icon. If the modified contents display means is designed to display each of the optional items in the modifying mode, the modifying operation will be facilitated. Moreover, it is also effective to display the menu of the modifying contents, the optional item and the completion of modification in order, in accordance with the corresponding operational step of modification.

Since the apparatus can be set to the modifying mode in this embodiment, the preceding data can be called back for modification. Therefore, the modifying operation is readily performed. In addition, exact modification can be made as the contents of modification are displayed by the modified contents display means.

BRIEF DESCRIPTION OF THE DRAWINGS

FIGS. 2 to 69 are intended to illustrate the application of a color marking apparatus embodying the present invention to copying machines as an embodiment and a modified embodiment thereof, wherein FIG. 2 is a system configuration of a copying machine;

FIG. 19 is a top view illustrating an editor panel and a display panel;

FIG. 43 is a flowchart illustrating the proceeding of density setting operation when a copy density key is operated;

FIG. 44 is a flowchart illustrating the state under control of bias voltage of the developing device;

FIGS. 50, 50A and 50B is a flowchart illustrating the proceeding of the operation of modifying the coordinate data;

FIGS. 63, 64, 64A and 64B are flowcharts illustrating the operation of implementing the multicolor process.

FIG. 69 is a flowchart illustrating the control of copying paper accommodated on the intermediate tray when it is developed in color.

MOST PREFERRED FORM OF IMPLEMENTING THE INVENTION

A detailed description will subsequently be given of embodiments of the present invention.

CONTENTS

The following headings are provided for the respective articles:
(1) System configuration of copying machine.
(2) Example of the construction of copying machine.
(3) Circuit configuration of copying machine.
(4) Detailed circuit configuration of copying machine.
  (4-1) Periphery of photoreceptor drum;
  (4-2) Switching mechanism of developing device;
  (4-3) Optical system;
  (4-4) Fixing device;
  (4-5) Control of console;
  (4-6) Billing counter;
  (4-7) Power supply;
  (4-8) Conveying system;
  (4-9) DADF;
  (4-10) Sorter;
  (4-11) Intermediate tray;
  (4-12) Editor pad;
  (4-13) Large capacity tray.
(5) Color marking process.
  (5-1) Principle of color marking;
  (5-2) Adjustment of copy density;
  (5-3) Color marking control in general;
  (5-4) Outline of color density adjustment;
  (5-5) Color density adjusting operation;
  (5-6) Color display control.
(6) Modification of input data.
  (6-1) Modification of coordinates;
  (6-2) Color modification;
  (6-3) Iconographic displays.

(1) SYSTEM CONFIGURATION OF COPYING MACHINE

Figure 2:
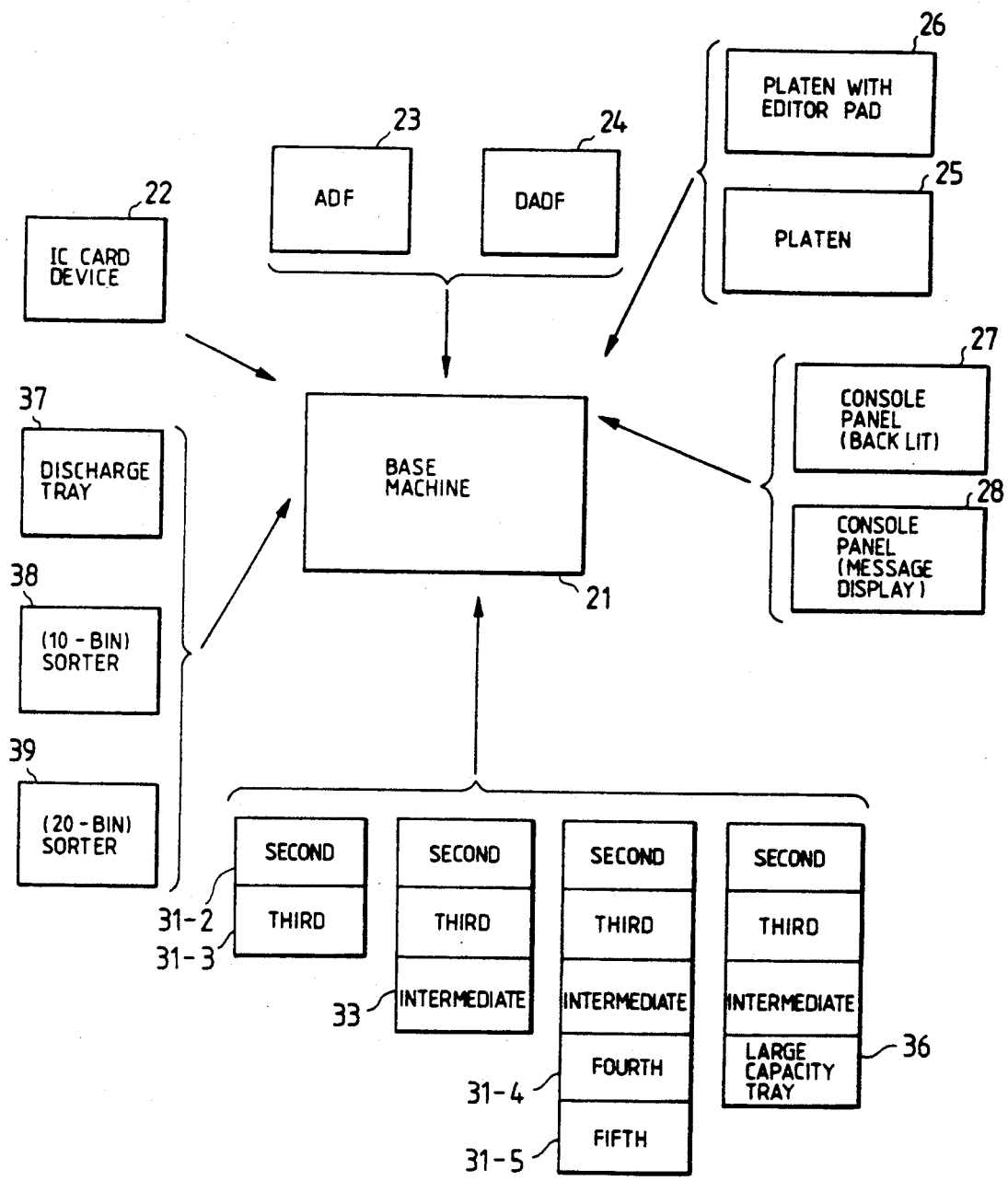

FIG. 2 is a system configuration of a copying machine embodying the present invention.

In this embodiment, as shown in FIG. 2, the copying machine is designed so that desired additional devices are fitted to a base machine 21 as a basic component in order to upgrade its functions. The base machine in this case is equipped with a feed tray of one stage and a manual feed tray and used to make a copy of an original by manually setting the original on a platen glass plate. The following additional devices can be fitted to the base machine:

(1) IC card device 22.

An IC card device 22 is used to supply necessary data to the base machine 21 using IC cards on one hand and to write data from the base machine 21 to the IC cards on the other. When data (coordinate data) is read by means of an editor pad as will be described later, the editor pad is connected to the IC card device 22 to carry out the input operation. The IC card device 22 in this embodiment is designed to control the IC card and the editor pad in an alternative way but it is not possible to read data simultaneously using both of them.

The IC card for use in the IC card device 22 in this embodiment has an ISO type interface with a memory capacity of 2 kilobytes. The use of IC cards permits not only the storage of complicated data therein but also the automated and multifunctional operation of a copying machine. By providing IC cards classified by industries or customers, for instance, a copying machine operating method agreeable to each group of owners can be implemented even if the copying machine has complicated functions. Accordingly, copying machines become quite easy to operate without errors.

(2) ADF 23 and DADF 24.

An ADF 23 is generally called an automatic document feeder and designed to feed originals one after another onto the platen glass plate of the base machine 21 and to discharge the original after completion of exposure. Only one predetermined side of the original is exposed to light.

On the other hand a DADF 24 is of a duplex type, i.e., an automatic document feeder for copying both sides of an original.

The DADF 24 conveys an original in such a manner that a first side of the original faces the platen glass plate to effect a first exposure and then the exposed original is turned upside down when returning to the tray of DADF 24. As a result, the second side is then exposed when the original is fed again. The base machine 21 is arranged so that two sides of copying paper can be used independently for copying and is equipped with the additional devices as will be described later.

As the ADF 23 and the DADF 24 are usable for the copying machine in this embodiment, copy-making operation can be done automatically to copy both sides of originals and copies in combination.

The ADF 23 is basically the same in construction as any of the automatic original feeders previously discussed for use in copying machines. In the case of this embodiment, however, documents are inserted left to right facing the apparatus to prevent them from overflowing in the base machine 21.

(3) Ordinary platen 25 and platen 26 with editor pad.

A platen 26 with an editor pad is provided with a coordinate input device called an editor pad for editing originals on the platen. An ordinary platen 25 is not equipped with such a mechanism.

(4) Console panel.

There are two kinds of console panels: one 27 of a back lit type and the other 28 has a message display. The console panel 27 of the back lit type has a display panel on which messages are arranged in predetermined locations, and the messages are selectively lit by a lamp or the like in order to make them readable.

The console panel 28 with a message display adopted in this embodiment is formed with liquid crystal elements having an advantage such that various messages can be displayed anytime within a relatively small area of display. A decision on whether one of the console panels should be employed may be made on a copying machine basis in consideration of the complication in the system configuration and operability of the copying machine.

(5) Addition of feed tray.

There exists a typical form as disclosed in Japanese Patent Unexamined Application Publication No. 77140/1982, for not only the addition of a large capacity tray but also for a combination of feed trays which can meet the needs of customers, which has been materialized in this embodiment. A detailed description has been given of the combination of such feed trays in, e.g., Japanese Utility Model Application No. 081016/1986 by the present applicants under "Multistage Paper Feed Copying Machine."

(a) Second and third feed trays 31-2, 31-3.

With the addition of these two feed trays, copying paper of a maximum of three different sizes can be fed to the base machine 21.

(b) Second and third feed trays 31-2, 31-3 and intermediate tray 33.

An intermediate tray 33 in this case is employed to accommodate copying paper temporarily when one side of the paper is used for copying a plurality of times or when both sides thereof are alternately used for copying.

(c) Second and third feed trays 31-2, 31-3 and intermediate tray 33, and fourth and fifth feed trays 31-4, 31-5.

(d) Second and third feed trays 31-2, 31-3 and intermediate tray 33, and a large capacity tray.

A large capacity tray herein described is a feed tray capable of accommodating several thousand sheets of copying paper.

(6) Discharged copying paper receiving device.

Copying paper is normally received by a discharge tray 37. There are provided a 10-bin sorter 38 and a 20-bin sorter 39 in this system. Consequently, copies can be sorted by a maximum of 10 or 20 distributees if the 10- or 20-bin sorter is set.

As set forth above, the additional devices can be fitted selectively to the base machine 21 in the copying machine system, and therefore, the most suitable copying machine is offered to the customer. Moreover, the functional upgrading of the copying machine can be attained as the business form on the part of the customer changes.

The purchase of a single unit of base machine 21 may often be fit for customers who do not want to obtain enlarged or contracted copies of originals or a large number of copies at a time. On the other hand, those who need a large number of copies or complicated copymaking operation may often be required to secure the intermediate tray 33 and the large capacity tray. This copying machine system is designed for each additional device to be simply replaced and detached in order to meet such versatile requirements, whereas an independent CPU (Central Processing Unit) is provided for a group of additional devices to effect decentralized control operation by a plurality of CPUs. This means that products which customers seek become readily available and, in addition, the possibility of newly attachable additional devices teaches the customers an innovation in copy-making operation. In view of this, the copying machine system greatly appeals to the customers in that it helps increase the productivity of office business processing.

(2) EXAMPLE OF THE CONSTRUCTION OF COPYING MACHINE

Figure 3:
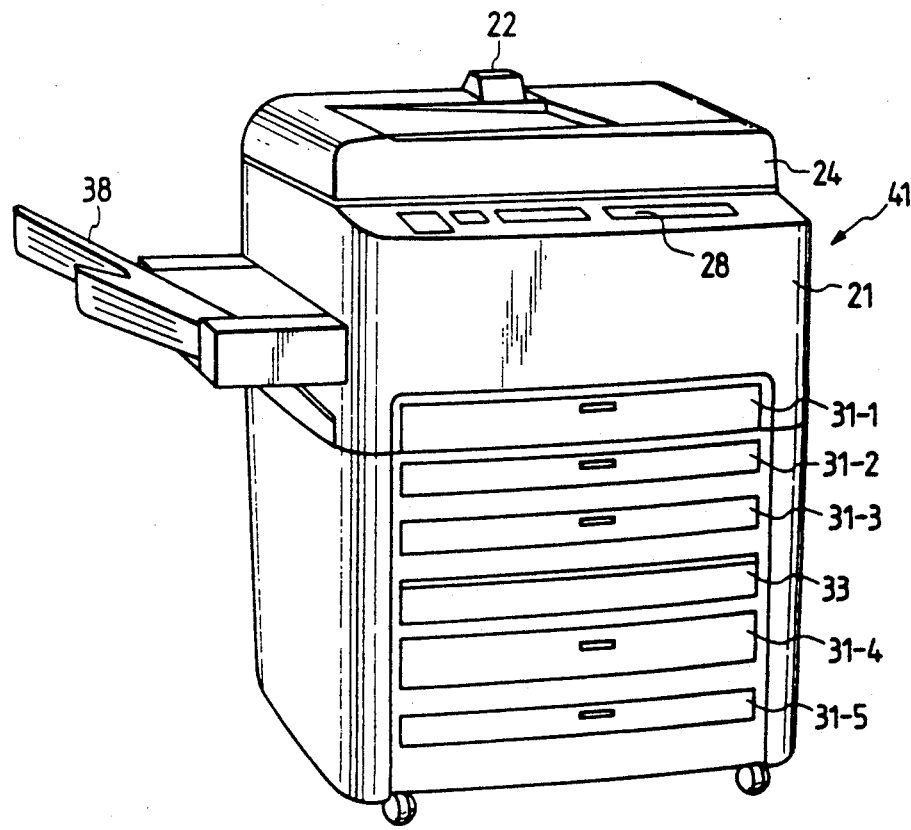
FIG. 3 is an external view of a system configuration of the copying machine employing the color marking apparatus.

FIG. 3 is an external view illustrating an example of a system configuration of a copying machine as the color marking apparatus.

In the copying machine of this embodiment, the DADF 24 is installed on the base machine 21 and the IC card device 22 is arranged on the rear of the top Surface thereof. The console panel 28 with a message display is laid on the front side of the top surface of the base machine 21. A tray 41 for manual insertion (not shown) is fitted to the right side of the copying machine and the 10-bin sorter 38 is fitted to the left side thereof. The tray 41 for manual insertion is used for manual feeding and a plurality of sheets of paper can be simultaneously set before being fed successively.

As set forth above, the base machine 21 is fitted with the first feed tray 31-1 as a basic component. In this copying machine, the second and third feed trays 31-2, 31-3 are disposed under the first food tray, whereas the fourth and fifth feed trays 31-4, 31-5 are arranged with the intermediate tray 33 sandwiched between the third feed tray 31-3 and the fourth feed tray 31-4. All of these feed trays 31-1~31-5 and the intermediate tray 33 can be slid out to this side, not only for the improvement of operability but also for economy of space for the installation of the copying machine. Moreover, this copying machine is neat and streamlined in design without the protrusion of the ADF (Automatic Document Feeder) and the paper feed trays.

Figure 4:
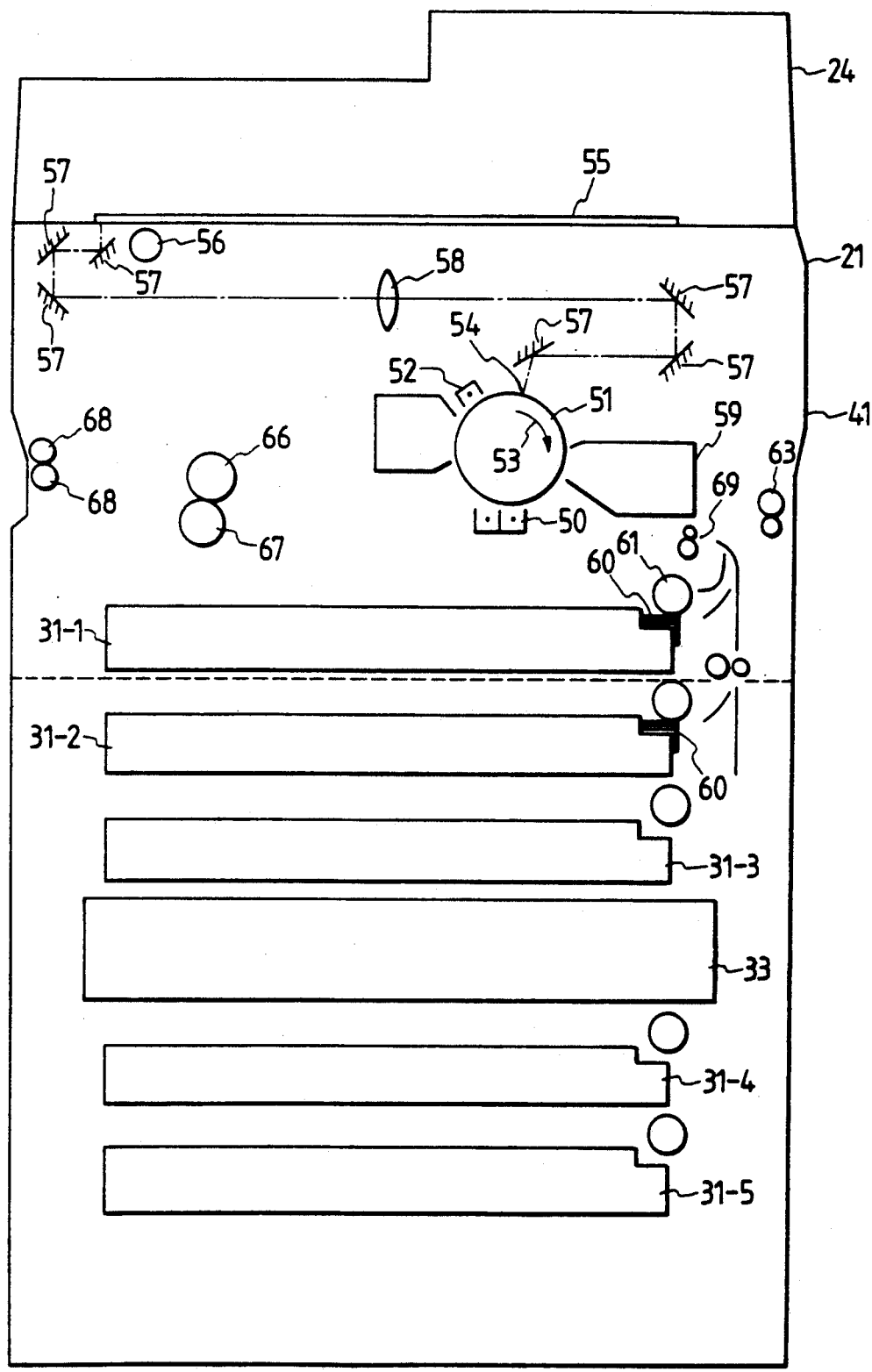
FIG. 4 is a schematic block diagram of the copying machine.

FIG. 4 is a schematic view of the copying machine, wherein a photoreceptor drum 51 is contained in the base machine 21. The photoreceptor drum 51 is uniformly charged by a charge corotron (charger) 52 and turned at a fixed speed in the direction of arrow 53, the charged surface thereof is exposed to light in an exposure range 54. Optical images of an original (not shown) placed on a platen glass plate 55 disposed on the base machine 21 are incident on the exposure range 54. For this purpose, an arrangement is made of an exposure lamp 56, a plurality of mirrors 57 for transmitting the light reflected from the surface of the original illuminated thereby and an optical lens 58. Some of the mirrors as prearranged are scanned for the purpose of reading the original.

Electrostatic latent images corresponding to the original are formed on the photoreceptor drum 51 by the image data exposed in the form of slits in the exposure range 54. The electrostatic latent image is developed by a developing device 59 and converted to a toner image. The toner image moves as the photoreceptor drum 51 turns and passes by a transfer corotron (transfer device) 50.

On the other hand, copying paper 60 contained on the first feed tray 31-1 fitted to the base machine 21 or manually fed along the tray 41 for manual insertion is sent out by a feed roll 61 or rolls 63 and guided by conveyer rolls 69 before being passed between the photoreceptor drum 51 and the transfer corotron 50. The toner images are transferred onto the copying paper at this time. The copying paper 60, after the transfer is passed between a heat roll 66 and a pressure roll 67, and is subjected to heat fixing. Subsequently, the copying paper 60 is passed between a conveyer rolls 68 and discharged onto a discharge tray (not shown).

The DADF 24 is fitted to the base machine 21 in this embodiment. Both sides of the original can thus be placed successively on the platen glass plate 55. In this case, one side of each of the originals piled up in the original container of the DADF 24 is first set on the surface of the platen glass plate 55 and, at the point of time a copy is taken, the original is turned upside down and reset in the container. The original is then sent to the platen glass plate 55 again.

Although five trays 31-2~31-5 and 33 have been installed under the base machine 21, a cabinet may be arranged instead so as to accommodate expandables. Moreover, the copying machine with the base machine 21 left intact may be mounted on a desk and used as a desk-top copying machine. Needless to say, only the second feed tray 31-2 may be installed under the first feed tray 31-1, so that the copying machine with this arrangement is mounted likewise on a desk.

Figure 5:
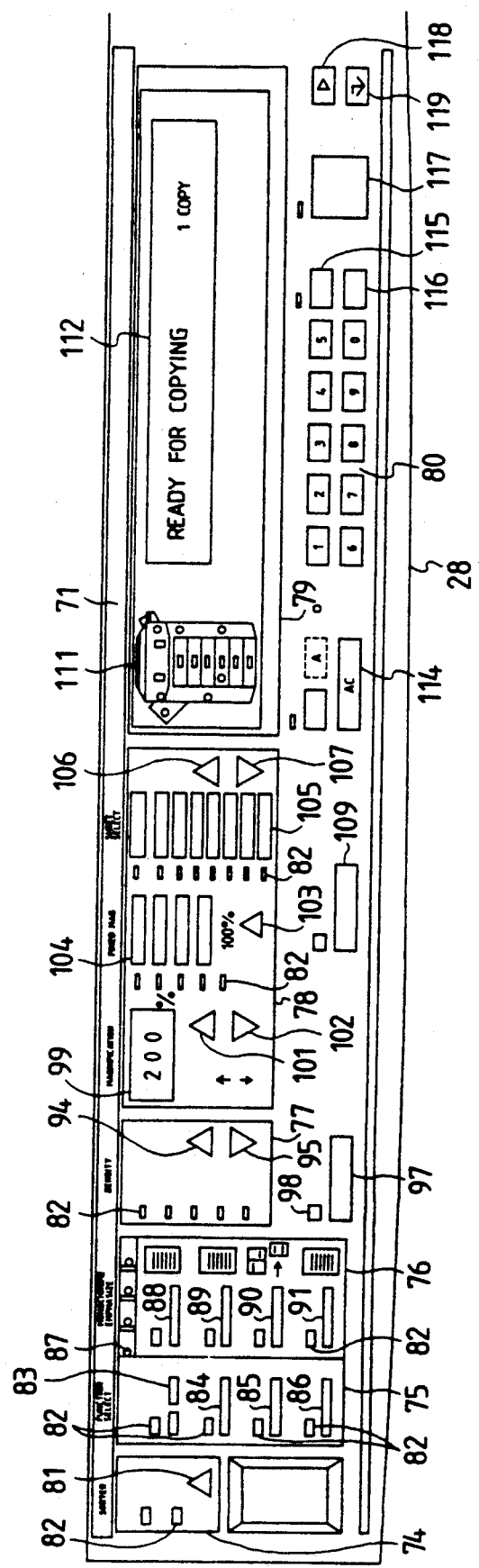
FIG. 5 is a top view of a console panel of the copying machine.

FIG. 5 is a top view of a console panel of the copying machine. The details of the art of display control as described hereinafter by the present applicants have been disclosed in Japanese Utility Model Application No. 130320/1986 as "Display Unit" and Japanese Utility Model Application No. 066170/1986 as "Character Display Unit". Japanese Utility Model Application No. 130320/1986, for instance, discloses the provision of a graphic display area through a dot pattern in a copying machine, suggesting the use of the graphic display area in order to make various kinds of displays. In a copying machine capable of copying part of an original, for instance moving and deleting a picture, an image sensor reads an image in the area of the original intended to be copied while the original is placed on the platen with its contour displayed in the graphic display area, whereby not only errors in area setting but also misoperations are prevented from occurring.

A menu display plate 71 is arranged above the console panel 28 and the contents of the respective panel sections 74~79 are displayed with characters. A switch 81 and two display lamps 82 are disposed in the panel section 74 for the sorting mode when the sorter is connected. The sorting mode consists of a stack mode in which sheets of copying paper are successively stacked and a gathering mode in which they are sorted in bins.

A switch 83 for (i) editing or correcting identifying images; a switch 84 for (ii) having images stored in a job memory; a switch 85 for (iii) implementing various copying forms; a switch 85 for (iv) taking duplex copies; and display lamps 82 for (v) displaying whether or not these switches have been selected are disposed in the function selecting panel sections 75. Editing (i) means the function of reading data for editing by means of the editor, whereas the correcting identifying means the function of displaying the input data in a liquid crystal display for identification and replacing the data. The memory used in (ii) is a nonvolatile memory composed of a random access memory backed up by a battery. Other storage media such as an IC card, a magnetic card, a floppy disk, etc. are also usable as a nonvolatile memory. Image density and magnification can be preset in this copying machine in order to reduce the operating load of the console panel 28 by the operator and the values thus preset are stored in the nonvolatile memory. When the switch 85 is pressed (iii), character data is displayed in the display panel section 79 of the console panel 28 and the desired function among "the other ones" can be selected.

The other functions in that case include (a) a continuous page copying function, (b) a side canceling function and (c) a binding-margin function. The continuous page copying function (a) is that of dividing an original extending over two pages such as a bookbinding original split into two one-page sections while it is in the state of a double-spread page. The side canceling function (b) is that of copying no image data on the periphery of the original so that the original looks as if it were surrounded with a "frame" on the periphery of the image data. The binding-margin function (c) is such that a "binding margin" is set in the right-hand or left-hand side portion of a copy. The binding margin having a desired length can be set and its value may be inputted from the console keyboard 80 or selected from the values displayed on the display panel 79.

(iv) Finally, taking duplex copies means taking copies on both sides of copying paper, respectively. When the duplex copy is made, the copying paper 60 with the first side used for copying is delivered first onto the intermediate tray 33 shown in FIG. 4. Subsequently, the copying paper 60 is again sent out of the intermediate tray 33 and the other side thereof is used for copying. To monochromatically copy by means of this copying machine, as will subsequently be described, the one side thereof is used twice for copying. In this case, it has been so contrived that the inside and outside of the copying paper being accommodated on the intermediate tray 33 are turned upside down.

On the menu display plate 71 shown in FIG. 5 are four display lamps 87 disposed in the uppermost portion of the monochromatic emphasizing panel section 76 under the portion where "For Emphasizing Monochrome" is displayed and used to indicate kinds of color developing agents (colors). The lamp(s) corresponding to the color(s) presently set is lit because one or a plurality of color (out of four colors, e.g., red, blue, etc.) developing agents can be set in this copying machine.

Four switches 88~91 and display lamps 82 for displaying which one of the switches 88~91 has been set are disposed in the remaining portion of the monochromatic emphasizing panel section 76. (i) The marking color switch 88 is used for marking color. If this switch is pressed to specify the area where marking is made, that area is recorded with a light color superposed thereon, for instance, and the intended effect of marking is produced.

(ii) The continuous color synthesizing switch 90 is used to record one color in the specified area of a copy. A figure to be displayed with color is placed on e.g., right-hand side of the platen glass plate 55 (see FIG. 4), whereas an original is set on the left-hand side thereof. When a copy is made in the aforesaid condition, the image data of the original is copied in black and the figure is drawn thereon in one color. If the figure specified is formed of dots, the colored figure adjusted to the desired density by the reproduction of the dots is then recorded in the specified area of copying paper. In addition, the names or designs of merchandise are set on one side of the platen glass plate 55, whereas offering prices written on paper are arranged on the other, so that the standing prices thereof are readily displayed as one pattern of copymaking operation.

(iii) When the partial color conversion switch 89 is selected, only the specified area is copied in one color and the remaining portion is copied in black. On the other hand, the original is copied in one color when the monochromatic switch 91 is selected (iv).

In the copy density panel section 77 provided under the portion where "Copy Density" is displayed on the menu display plate 71 are display lamps 82 indicating which one of the five stage copy densities has been selected and shift keys 94, 95 for selecting one of the copy densities. The upper shift key 94, when pressed, is used to decrease the copy density, whereas the lower shift key 95 is used to increase the copy density. The copy density can be adjusted by changing the developing bias of the developing device 59 shown in FIG. 4, changing the quantity of light from the exposure lamp 56 (FIG. 4), and changing the quantity of charge given by the charge corotron 52 relative to the photoreceptor drum 51. In this embodiment, for instance, the developing bias can be adjusted in 16 stages.

An automatic density adjusting switch 97 is arranged under the copy density panel section 77. When the automatic density adjusting switch 97 is pressed, an automatic density display lamp 98 is lit to provide an automatic density adjusting mode. In the automatic density adjusting mode, part of the light reflected from the original when the original is scanned which arrives at the photoreceptor drum 51 is taken by the half mirror, and the potential of the developing electrode within the developing device 59 is set, depending on the proportional quantity of light. In the magnification paper selection panel section 78 provided under "Optional Magnification" on the menu display plate 71 are a display section for setting the magnification desired on the left-hand side thereof and a paper selector section on the right-hand side thereof.

A magnification table display 99 is provided in the section where magnification is set and displayed. In this copying machine, 50 to 200% magnifications can be set optionally by 1% increments (linear magnifications) and the magnification thus set is displayed in the magnification table display 99. The magnification display is set by either operating shift keys 101 or 102 optionally or selecting the predetermined fixed magnification.

When the optional magnification is set, the shift keys 101 and 102 are operated. The upper shift key 101, when pressed, is used to increase the magnification by 1% each time, whereas the lower shift key 102 is used to decrease the magnification by 1%. While the shift keys 101/102 are kept in a pressed position, the magnification increases/decreases continuously by 1%.

The selection of the fixed magnification is made by a fixed magnification key 103. The fixed magnification is displayed on magnification display plates 104 and, in this embodiment, can be selected from 141.4%, 86.5%, 81.6% and 70.7%. In addition, 100% as being equimultiple may be selected. A selected magnification is made known by display lamps 82 disposed to the left of the display plates 104.

In the copying paper selecting section above are eight display plates 105 for displaying paper sizes or the kinds of paper and shift keys 106 and 107 for selecting one of the sizes. Display lamps 82 are disposed next to the eight kinds of display plates 105, the lamps 82 being used to display which kind of copying paper or size has been selected. The following are displayed on the display plates 105 in this embodiment:

(a) Display of tray for manual insertion.

When the tray 41 (FIG. 4) for manual insertion is used, this display is selected. A conventional tray for manual insertion is designed to feed one sheet of copying paper at a time, and it is only necessary for the operator to feed the copying paper with priority given thereto, whereby the operator need not select the tray for manual insertion. On the other hand, a plurality of sheets of copying paper can simultaneously be set on the tray 41 for manual insertion in this embodiment. If copying paper is conveyed for the tray 41 for manual insertion when it is set, the plurality of sheets of copying paper may start being fed while being set. In order to avoid the situation above, it is arranged that the tray 41 for manual insertion is selected.

(b) A3 paper display.

This display is selected when the tray for feeding copying paper of A3 size in the long direction is used.

(c) B4 paper display.

This display is selected when the tray for feeding copying paper of B4 size in the long direction is used.

(d) A4 paper display.

This display is selected when the tray for feeding copying paper of A4 size in the long direction is used.

(e) B5 paper display.

This display is selected when the tray for feeding copying paper of B5 size in the long direction is used.

(f) A4 crosswise paper display.

This display is selected when the tray for feeding copying paper of A4 size in the direction perpendicular to its long direction is used.

(g) B5 crosswise paper display.

This display is selected when the tray for feeding copying paper of B5 size in the direction perpendicular to its long direction is used.

(h) Nonstandard paper display.

This display is selected when copying paper of a size other than enumerated above is used.

An automatic paper/magnification selecting switch 109 is arranged under the magnification paper selection switch 78. When this switch 109 is pressed, a combination of preset magnification and paper size is selected. The operator can thus learn whether or not the desired combination has been selected from the display lamp 82 lit in the paper/magnification selection panel section 78. If the desired combination has not been provided, it is possible to change the combination by pressing the automatic paper/magnification selecting switch 109 again.

The display panel section 79 is arranged to the right of the paper/magnification selection panel section 78. A pattern display 111 and a liquid crystal display 112 of the copying machine are arranged in the display panel section 79. The pattern display 111 is used to display the feed tray thus selected and the location clogged with paper by means of lamps is lit. A sentence including *Kanjis* (Chinese characters) can be displayed on the liquid crystal display 112 in this embodiment. In the example shown in FIG. 5, it is shown that the copying machine is ready for operation with one copy set. The liquid crystal display 112 in this embodiment is a color liquid crystal display capable of displaying the specified areas with the designated colors, respectively.

The following keys or buttons are disposed under the display panel section 79:

(a) All clear button 114.

This button is used to restore the basic state, i.e., to return the operational mode of the copying machine to the priority one initially set wherein copying paper is selected.

(b) Ten keys 80.

These keys are used to set the number of sheets of copying paper, input numerical values for specifying the contents of diagnosis when the copying machine is diagnosed.

(c) Interruption button 115.

This button is used in case of emergency wherein some other copies must be taken while continuous copy-making operation is performed. It is also used to release the interruption in order to restore the original copy-making operation as soon as the interruption process is terminated.

(d) Stop-clear button 116.

This button is used as a clear button to stop unfinished copy-making operation and to set the number of copies and the bin of the sorter.

(e) Start button 117.

This button is used to start copy-making operation.

(f) Selection key 118.

This key is used to move a cursor in response to the message displayed, i.e., as a cursor key.

(g) Set key 119.

This key is used as a return key to locate the setting at the place specified by the cursor.

As set forth above, the basic operational area and the applicative operational area on the console panel in this embodiment are completely separated from each other; e.g., the selection of copying paper and the copy density setting are carried out in the former, whereas the selection of functions and emphasis on monochromatic color are effected in the latter. In addition, errors in panel operation are minimized by giving assistance to the applicative operation by displaying characters including *Kanjis* (Chinese characters) on the liquid crystal display.

(3) CIRCUIT CONFIGURATION OF COPYING MACHINE

Figure 6:
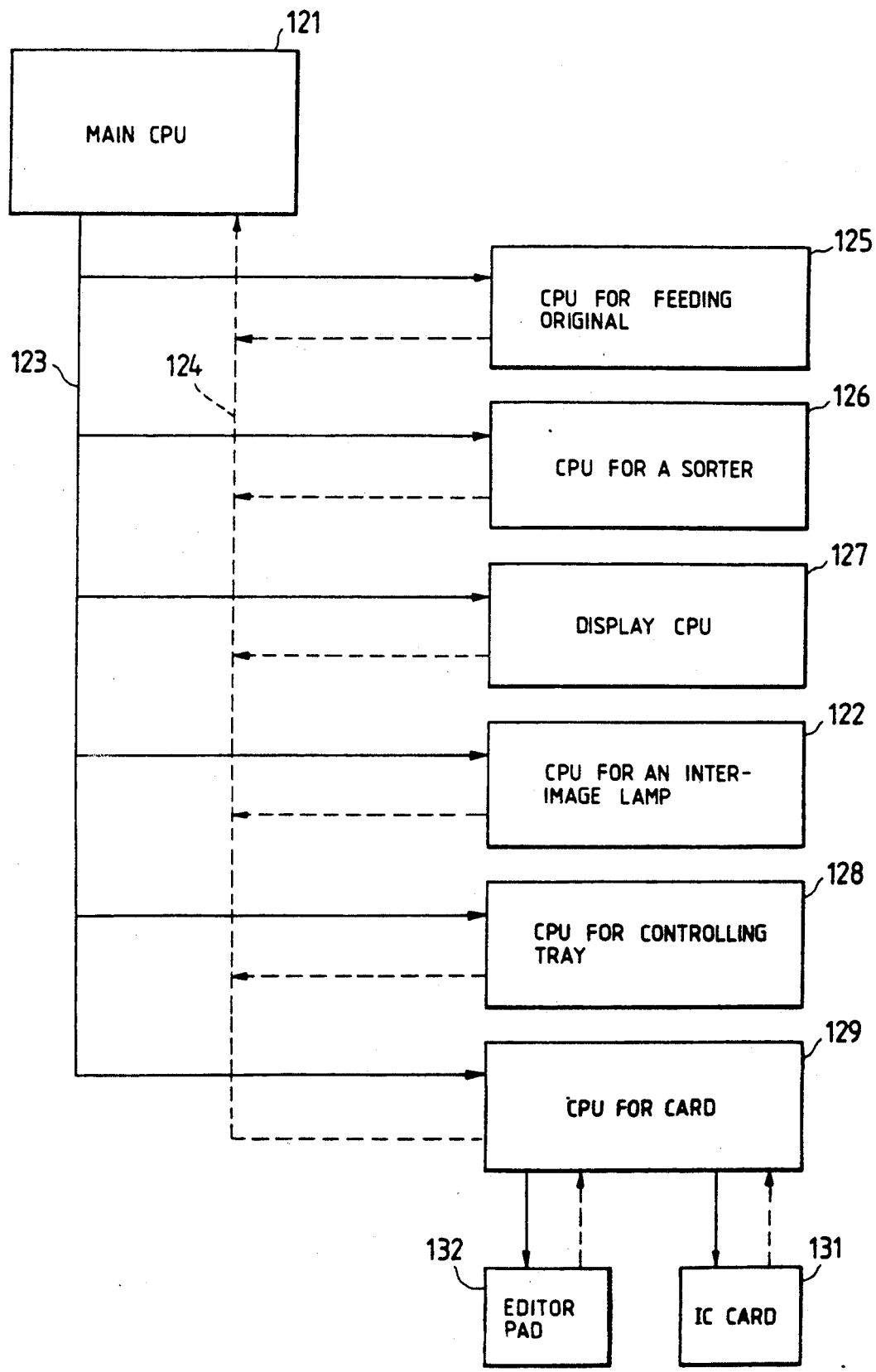
FIG. 6 is a schematic circuit diagram of the copying machine.

FIG. 6 is a schematic circuit configuration of the copying machine (FIG. 2).

In FIG. 6, there is shown a decentralized CPU architecture for serial communication centering around a main CPU 121 so as to make possible not only the optimum arrangement of a controller but also the provision of optimum cost performance. In view of the development of products such as copying machines, it is anticipated to shorten a period of software development and to improve the efficiency thereof. Further, it is ensured to simplify their wire furnaces, reduce production costs and to facilitate troubleshooting.

Since processing efficiency is increased by the decentralization of processing using a plurality of CPUs, programs prepared to the satisfaction of complicated high-speed processing can be provided using inexpensive 8-bit CPUs but not expensive 16-bit CPUs.

Moreover, the decentralization of processing facilitates the diffusion of models. In other words, even when new input/output devices are developed, the modification of programs on the part of the main CPU may become unnecessary, so that the alteration thereof is minimized.

With respect of the printed circuit boards on the main CPU side, the decentralization of the CPUs makes it unnecessary to store needless I/0 ports and programs. Accordingly, it becomes possible to reduce the cost of the printed circuit boards to ensure a free equipment layout.

The base machine 21 in this copying machine is controlled by a main CPU (Central Processing Unit) 121 and a CPU 122 for an inter-image lamp within the base machine 21. The CPU 122 for an inter-image lamp in this case specializes in controlling the inter-image lamp.

The inter-image lamp is used to throw light on the photoreceptor drum 51 after exposure and to erase part of an electrostatic latent image before development. When an original of B5 size is copied equimultiplicably in the prior art, for instance, the area other than the B5 size on the photoreceptor drum 51 is illuminated so as to prevent a toner image from uselessly forming outside the area. The copying machine in this embodiment is, as will be described later, also provided with the function of editing an image. When the formation of an electrostatic latent image is restricted to a predetermined rectangular area or polygonal one, the partial deletion of the electrostatic latent image accordingly becomes necessary to effect the aforesaid processing. In this case, a CPU independent of the main CPU 121 in the copying machine in this embodiment is employed because the inter-image lamp is being used to an extent greater than that in the prior art.

Xerox Co. is one of the manufacturers that has introduced such a decentralized processing system as what is employed to control a copying machine, and Japanese Patent Unexamined Application Publication No. 78371/1959 by Xerox Co. discloses the detailed contents of the art and relevant references in "Copying Machine Control Apparatus and Method of the Same".

The communication method adopted in the present invention is not the "Ether Network" intended for high-speed processing employed in the aforesaid patent application but equivalent to what is capable of obtaining the same effect with a 4,800 Baud current loop.

In the meantime, the present applicants have given a detailed description of the CPU 122 for an inter-image lamp in Japanese Utility Model Application No. 152591/1986 entitled "Image Copying Machine" and Japanese Patent Application No. 023392/1987 entitled "Image Erasing Device for Copying Machine".

In this embodiment, the copying machine is equipped with the following CPUs and connected with communication lines 123 and 124. The main CPU 121 assumes the role of generalizing those CPUs and the CPU 122 for an inter-image lamp.

(a) CPU 125 for feeding originals.

A CPU 125 for feeding originals controls the DADF 24 shown in FIG. 4. When the ADF 23 (FIG. 2) is used in place of the DADF 24, the CPU contained therein is connected to the communication lines 123 and 124.

(b) CPU 126 for a sorter.

A CPU 126 is arranged in the 10-bin sorter 38. Another CPU is also installed for special use in the 20-bin sorter 39. The main CPU 121 finds out which one of the sorters 38, 39 has been connected and controls the sorting correspondingly.

(c) Display CPU 127.

A display CPU 127 is used to display various kinds of data including *Kanjis* (Chinese characters) on the aforesaid display 112 fitted to the console panel 28 and an area for editing purposes. No special CPU is used when the console panel 27 of a back lit type (FIG. 2) is employed because complicated display control is unnecessary. If the liquid crystal display 112 is not employed, the ten keys are used to designate figures being edited.

(d) CPU 128 for controlling trays.

A CPU 128 for controlling trays is used to control the fourth and fifth trays 31-4, 31-5 among those newly added to the base machine 21, the large capacity tray and the intermediate tray 33. This CPU is located behind the tray cabinet containing each of the trays and controls them, depending on the tray thus connected. Among these trays, the intermediate tray 33 is equipped with its own motor for conveying copying paper, and, further, the location of the copying paper placed on each tray differs with its size. Accordingly, the CPU needs to effect complicated control.

The mode of controlling each tray by the CPU 128 for controlling trays is as follows:

(i) Control of both or one of the fourth and fifth feed trays 31-4, 31-5 and the intermediate tray 33;

(ii) Control of the large capacity tray and the intermediate tray;

(iii) Control of only the intermediate tray;

(iv) Control of both or one of the fourth and fifth feed trays 31-4, 31-5; and (v) Control of only the large capacity tray;

(e) CPU 129 for controlling cards.

The CPU 129 controls IC cards 131 used to store additional data for use in adding or correcting the functions of the copying machine in order to read the data. When the IC card 131 is used to designate the coordinates of an original, further, the CPU 129 controls the reading/writing operation of the card 131. Moreover, the CPU 129 can also control an editor pad 132, although this operation is not employed in this embodiment. The editor pad 132 is used to input coordinates and will be described in detail later.

Figure 7:
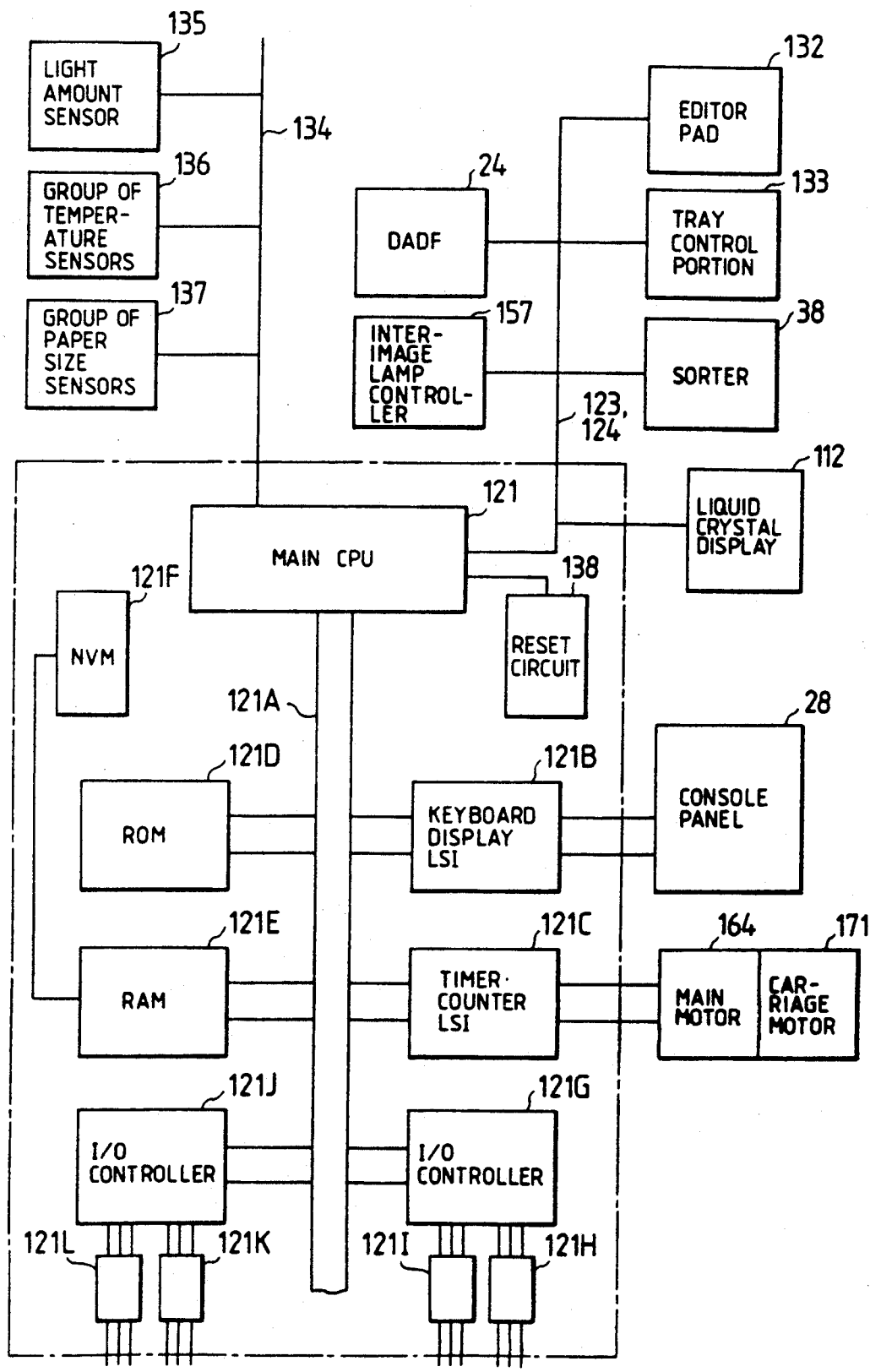
FIG. 7 is a development diagram of FIG. 6 with the main CPU as a central figure.

FIG. 7 is a detailed circuit configuration with the main CPU as a central figure acting as the pivotal role in the copying machine of this embodiment.

Copying machines controlled by control apparatus such as CPUs and microcomputers have already been made known by the paper "A Programmable Digital Control System for Copying Machines" by Sikandar Sheikh of Xerox Co., IEEE Trans, Com, Vol IECI-21 No. 1, Feb. 1974 and as the first instance of a similar idea Japanese Patent Unexamined Application Publication No. 62644/1975 "Electrophotographic Copying Process and Apparatus". Like the main CPU, other CPU modules are composed of one-chip CPUs, ROMs, RAMS, I/0, etc.

(a) The main CPU 121 is, as partially described in FIG. 6, connected via the serial communication lines 123, 124 to the following component parts:

(i) DADF 24.

(ii) Sorter 38.

(iii) Liquid crystal display 112.

(iv) Editor pad 132.

(v) Inter-image lamp controller 157.

(vi) Control unit 133 for controlling the fourth and fifth trays 31-4, 31-5, the intermediate tray 33, etc.

(b) The main CPU 121 incorporates an A/D converter and is connected via an analog data line 134 to the following parts. There are 8-bit one-chip CPUs, e.g., μPD7810CW and μPD7811CW of Nippon Electric Co. and MB89713X of Fujitsu, Ltd.

(i) Light quantity sensor 135 is used to detect and control the quantity of light derived from the exposure lamp 56 (FIG. 4).

(ii) Temperature sensors 136 are soft touch sensors for controlling fixing temperatures as will be described later.

(iii) Paper size sensors 137 are sensors for detecting the sizes of paper placed on the feed tray 31. Copying paper can be fed from a maximum five kinds of trays according to the system configuration of the copying machine in this embodiment. Consequently, if four sensors for detecting the paper size are disposed on one feed tray, with digital data being used for processing purposes, 4-bit digital data will have to be sent to the main CPU 121 from one tray. This will also necessitate the maximum 20 input ports in total, together with a number of connectors and cables constituting a harness. This construction is not preferable in view of not only cost and size reduction but also reliability.

Accordingly, in this embodiment, the conditions specified by the four sensors per tray of the copying machine are sent out as analog data. The analog data received by the main CPU 121 is converted into digital data therein, so that the maximum 16 sizes of copying paper put on each tray are identified.

(c) Further, the main CPU 121 is reset at the time of the initialization of the reset circuit 138 and is connected via a bus line 121A to the following parts.

(i) Keyboard/display LSI (Large Scale Integrated Circuit) 121B; a circuit for interceding with the console panel 28 for the data.

(ii) Timer/counter LSI 121C; a circuit for controlling the driving of a main motor 164 and a carriage motor 171.

(iii) ROM 121D; a Read Only Memory having a capacity of 56 K bytes and storing the basic control data of the copying machine.

(iv) RAM 121E; a Radom Access Memory having a capacity of 6 K bytes and temporarily storing data. The aforesaid nonvolatile memory (NVM) 121F is connected to this ROM 121E and capable of holding the necessary data even when the power supply of the copying machine is cut off. The necessary data stored in the nonvolatile memory (NVM) 121F includes (a) a setup value for use in regulating the registration of copying paper, (b) the quantity of erasing the tip portion of an image by the inter-image lamp as will be described later in detail, (c) a fine adjusting value for use in adjusting the vertical and horizontal magnifications when the equimultiple copying value is set, (d) each parameter adjusting value for use in adjusting the parameter on the copying machine production line such as the quantity of a binding margin when a copy is taken with a blank for providing the binding margin, and (e) data for use in detecting the operating condition of the copying machine such as the actual value resulting from the use of the feed counter on each feed tray 31.

(v) First I/O controller 121G; an input/output controller for reading various data via a filter circuit 121H and driving various parts via a driver circuit 121I. Switches and sensors are connected to the filter circuit 121H. Solenoids such as developing solenoids and clutches 233 contained in the feed trays 31-1 to 31-5 are also connected to the driver circuit 121I as will be described later.

(vi) Second I/O controller 121J; an input/output controller for reading various data via a filter circuit 121K and driving various parts via a driver circuit 121L. Switches and sensors are connected to the filter circuit 121K. The driver circuit 121L is equipped with a known D/A (Digital-Analog) converter and a PWM (Pulse Width Modulator) and used to set the developing bias of a developing device 59 and the current value of the charge corotron 52 as the program is processed, which will be described later.

(4) DETAILED CIRCUIT CONFIGURATION OF COPYING MACHINE

Referring to FIGS. 8 to 13, a detailed description will be given of the circuit configuration of the copying machine in this embodiment.

(4-1) Periphery of Photoreceptor Drum

Figure 8:
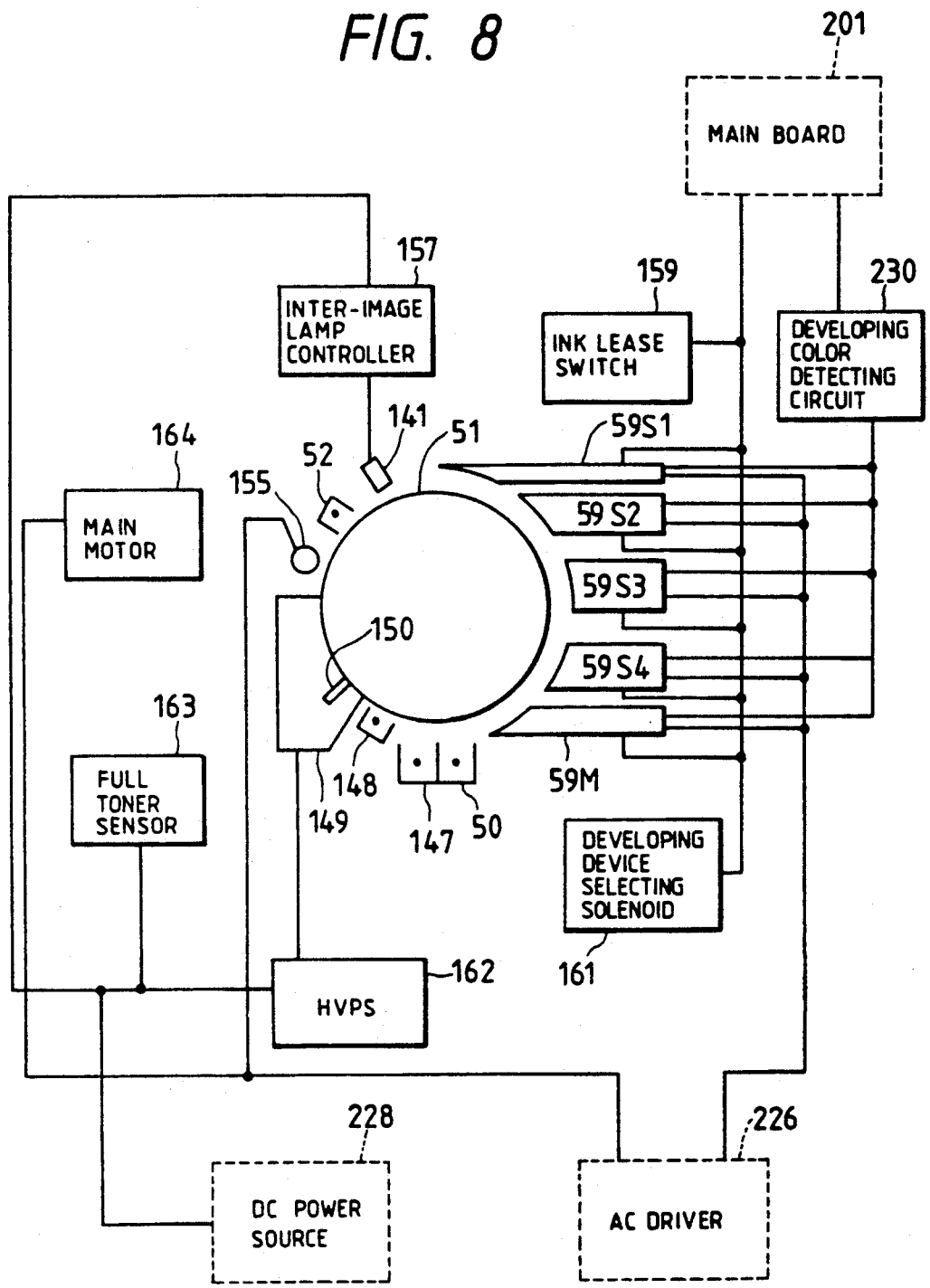
FIG. 8 is a detailed block diagram of a circuit arrangement around a photoreceptor drum of the copying machine.

FIG. 8 is a block diagram illustrating the periphery of the photoreceptor drum 51.

On the periphery of the photoreceptor drum 51 are a charge corotron 52, an inter-image lamp 141, four kinds of sub-developing devices 59S1 to 59S4, a main developing device 59M, a transfer corotron 50, a detack corotron 147, a pre-clean corotron 148, a cleaning device 149 and a deelectrifying erase lamp 155 in this order. The first, second, third and fourth subdeveloping devices 59S1, 59S2, 59S3, 59S4 use red, blue, green and light brown toner for developing, respectively.

The inter-image lamp 141 consists of a train of 128 light-emitting diodes disposed in a row and a plastic lens arranged in parallel with and in front of these diodes. The plastic lens (not shown) having a non-spherical convex surface in a position corresponding to each light-emitting diode is arranged so that, even when the light-emitting diodes adjacent to each other emit light, the intensity of the light on the photoreceptor drum 51 will not become uneven in the boundary therebetween. Moreover, the focal point of the plastic lens is made to properly shade off on the photoreceptor drum 51. Accordingly, when a triangular figure is processed (e.g., extracted or deleted) by the inter-image lamp 141, for instance, the difference in stage between the light-emitting diodes as a unit is considerably decreased in the boundary being processed.

An inter-image lamp controller 157 is designed to control the on/off of the light-emitting diodes as 128 segments of the inter-image lamp 141. The cleaning device 149 is provided with a doctor blade 150 and used to peel the toner, deelectrified by the pre-clean corotron 148, off of the photoreceptor drum 51.

In the copying machine in this embodiment, a main motor 164 is started 0.2 second later than the contact of the doctor blade with the photoreceptor drum 51. Moreover, the doctor blade 150 is not separated from the photoreceptor drum 51 immediately after the main motor 164 stops but is separated therefrom five seconds later; thereby the toner is prevented from contaminating the interior of the copying machine by scattering because of the vacuum suction strength.

The sub-developing devices 59S1 to 59S4 each are equipped with the following parts:

(a) Color sensor

A color sensor for identifying which one of the color developing agents has been set in each developing device. Even if the sub-developing devices 59S are installed with the combination of red, blue, green and light brown colors, the color sensors can be used to detect the respective colors provided for the sub-developing devices 59S1 to 59S4. Each detection output is sent to a developing color detecting circuit 230 and transmitted to a main board 230.

(b) Toner sensor

A toner sensor for determining whether the supply of toner is needed.

(c) Dispense motor

A motor for churning the toner contained in a toner box and supplying it.

A main developing device 59M uses black toner for developing and has a toner sensor and the dispense motor. An ink lease switch 159, if pressed by the operator, is used to increase the quantity of toner. While one of the sub-developing devices 59S1 to 59S4 is selected, the ink lease switch 159, if pressed, operates to increase the quantity of toner being supplied to the sub-developing device involved. If the switch is pressed while the main developing devices 59M is selected, the quantity of black toner increases.

A developing device selecting solenoid 161 is used to selectively switch the five developing devices, namely, the main developing device 59M and the subdeveloping devices 59S1 to 59S4. The switching operation will be described below.

A high-voltage power supply (HVPS) 162 is used to form a parallel electric field in the main and sub-developing devices 59M, 59S1 to 59S4 so as to improve the reproducibility of the solid portion (solid black one). A full toner sensor 163 is used to detect whether the toner has been recovered satisfactorily to a toner recovery container. The main motor 164 is used to drive the photoreceptor drum 51, a heat roll 66 or a conveyer system from the registration of timing at which the copying paper 60 is conveyed up to the discharging time.

(4-2) Switching Mechanism of Developing Device

Figure 9:
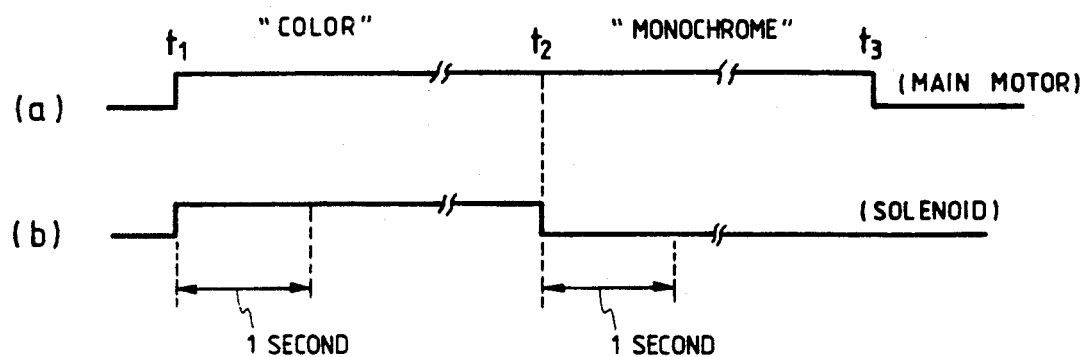
FIG. 9 is a timing chart illustrating the operation of a main motor and a developing solenoid when a sub-developing device is used for first development and subsequently a main developing device is used for second development.

FIG. 9 is a waveform chart illustrating the switching timing of the main developing device and the sub-developing devices. The waveform chart exemplifies red color developing first carried out in the first developing device 59S1 and monochromatic developing second made in the main developing device. When the start button 117 (FIG. 5) of the copying machine is pressed in order to start the copy-making operation, the main motor 164 is driven from time $t_1$ as shown in FIG. 9(a) The main motor 164 is driven up to $t_3$ when the copy-making operation is completed in both developing devices 59S1, 59M.

FIG. 9(b) represents the drive timing of the developing device selecting solenoid 161. The developing device selecting solenoid 161 is kept excited until red copy-making operation by the first subdeveloping device 59S1 is terminated. A lever abuts against the peripheral face of a clutch (not shown) because of the excitation of the developing device selecting solenoid 161 in this copying machine. On receiving the drive force from the main motor 164, the clutch shifts by 72 degrees at a time and starts the rotation of five sets of cams (not shown), each having a protrusion. When one of the protrusions abuts against the first sub-developing device 59S1, it presses the first sub-developing device 59S1 toward the photoreceptor drum 51. The protrusions of the remaining cam are left apart from the main developing device 59M and the other sub-developing devices 59S2 to 59S4, and the main developing device 59M and the other subdeveloping devices 59S2 to 59S4 remain apart from the photoreceptor drum 51.

There are five protrusions disposed on the periphery of the clutch and, when the lever abuts against the protrusion involved, the protrusion corresponding to the one cam is most strongly pressed against the first sub-developing device 59S1. Development with red color toner is made in that position. However, since the main developing device 59M in the initial state is arranged close to the photoreceptor drum 51 in this copying machine, the red color development is not started immediately at $t_1$ but kept on standby for one second. At this time, the aforesaid cam, in place of the main developing device 59M, sets the first subdeveloping device 59S1 (or the other sub-developing devices 59S2 to 59S4) to the photoreceptor drum 51.

When the first sub-developing device 59S1 has completed the copy-making operation, the aforesaid five cams move to set the lever position for the protrusion of the monochromatic cam, whereas the main developing device 59M is set to the photoreceptor drum 51 for one second after $t_2$ Then the monochromatic development is carried out.

What has been described above refers to only red color marking. When marking with a plurality of colors the subdeveloping devices 59S1 to 59S4 are successively selected in a predetermined order and the monochromatic development is made after the completion of the above operation.

Figure 10:
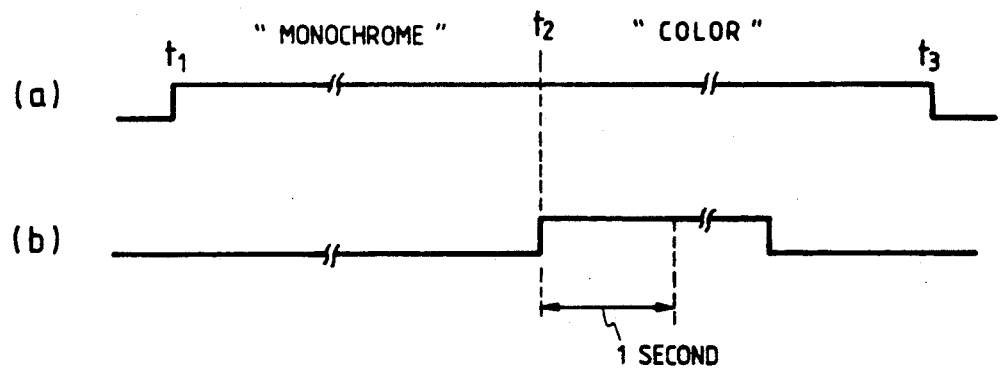
FIG. 10 is a timing chart illustrating the operation of the main motor and the developing solenoid when the main developing device is used for the first development and the sub-developing device is used for the second development.

FIG. 10 refers, by way of example, to a case where the monochromatic development is made first and followed by red color development. FIGS. 10(a) and 10(b) are graphic presentations respectively illustrating the operation of the main motor 164 and the developing device selecting solenoid 161. In the case of FIG. 10, development is first carried out by the main developing device 59M, and therefore, one second of standby time is unnecessary at time $t_1$. However, one second has to be secured after the completion of the monochromatic development at time $t_2$, and the main developing device 59M has to be set again to the photoreceptor drum 51.

(4-3) Optical System

Figure 11:
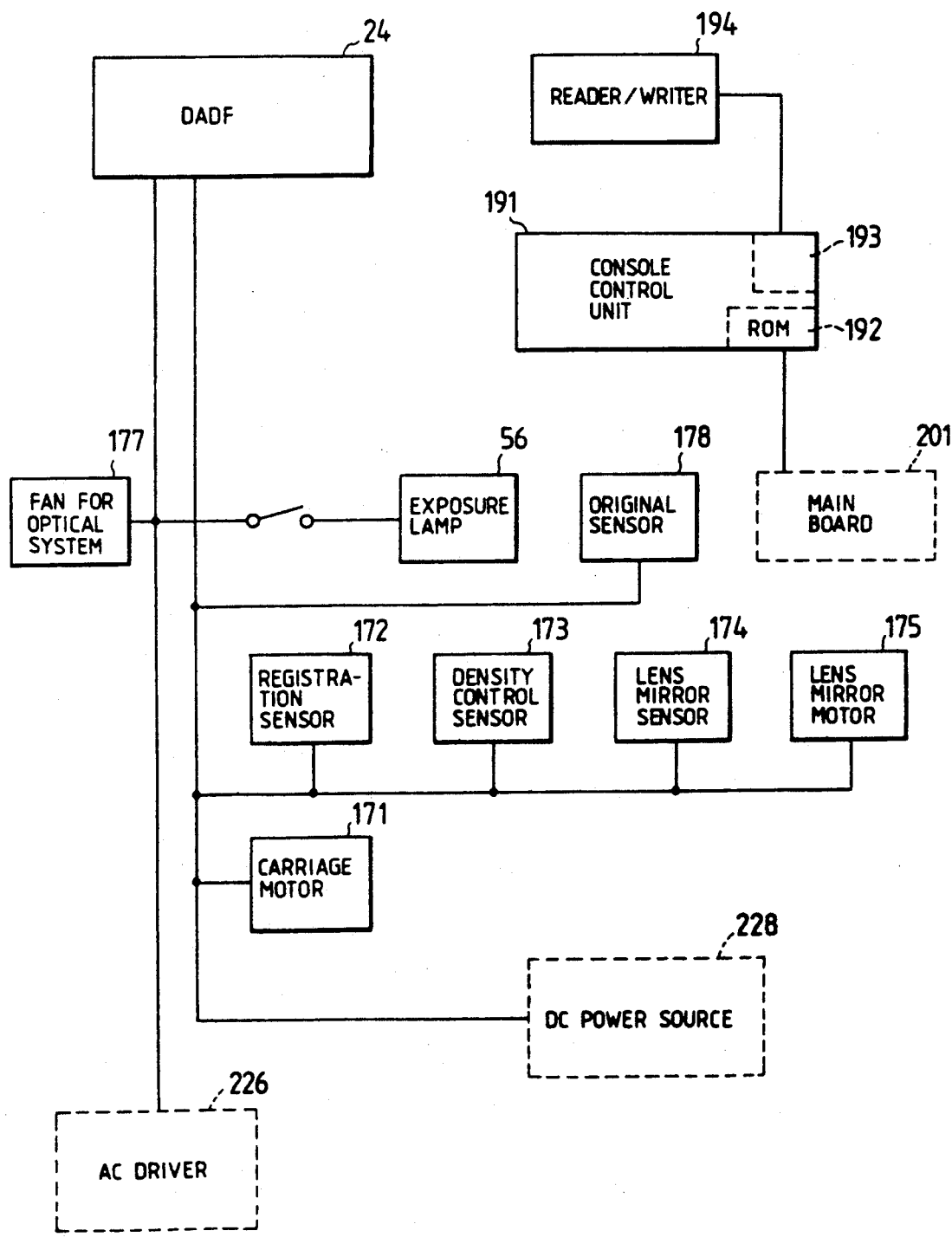
FIG. 11 is a detailed block diagram illustrating the peripheries of an exposure system and a console under control of the copying machine.

Referring to FIG. 11, an optical system will be described.

A carriage (not shown) provided with the lens and mirrors is reciprocally operated by a carriage motor 171. The carriage motor 171 includes a step motor, and the position of the carriage returning to the home position is controlled by a registration sensor 172.

Figure 1:
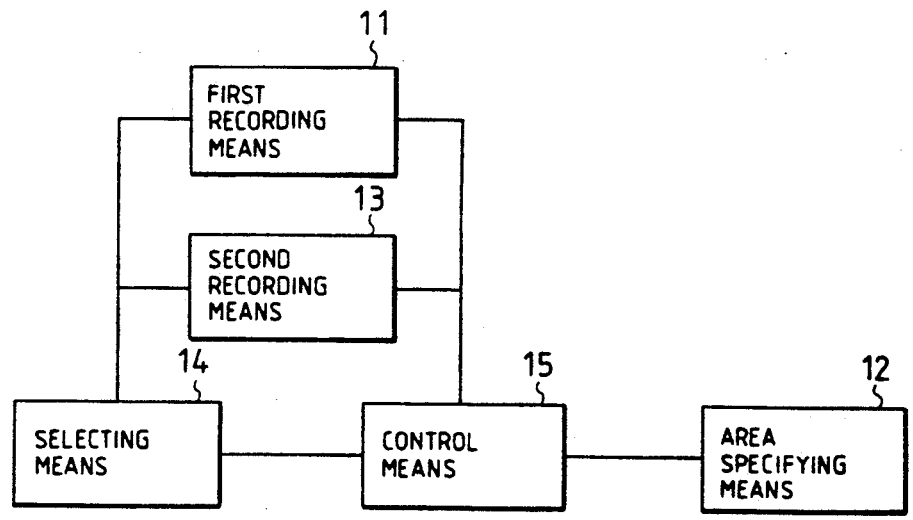
FIG. 1 is a block diagram illustrating the principle of the present invention.

The registration sensor 172 is used to set the timing at which the optical system is adjusted relative to the conveyance of the copying paper 60 (FIG. 1). In other words, the carriage is provided with an actuator for intercepting the transmission of light and, as the carriage moves, the registration sensor 172 detects the temporary interruption of the light rays. The signal detected thereby is used to determine the position or timing for implementing the registration or to determine the home position at the time the carriage is returned.

A density control sensor 173 is used to control the copy density of an original. As set forth above, the copying machine in this embodiment is so designed as to control the copy density by simultaneously adjusting the charge quantity given to the photoreceptor drum 51, the image exposure quantity and the developing electrode bias. A lens mirror sensor 174 controls the movement of the optical lens 58 and the mirrors 57 (FIG. 4) and consists of one detecting element. A lens mirror motor 175 has also been redesigned to simultaneously drive the lens 58 and the mirror 57 that have been driven separately in the conventional copying machine. The exposure lamp 56 has already been described. A fan 177 for the optical system is used to air-cool part of the optical system in order to remove heat from the platen glass plate 55. An original sensor 178 is used to detect the size of an original.

(4-4) Fixing Device

Figure 12:
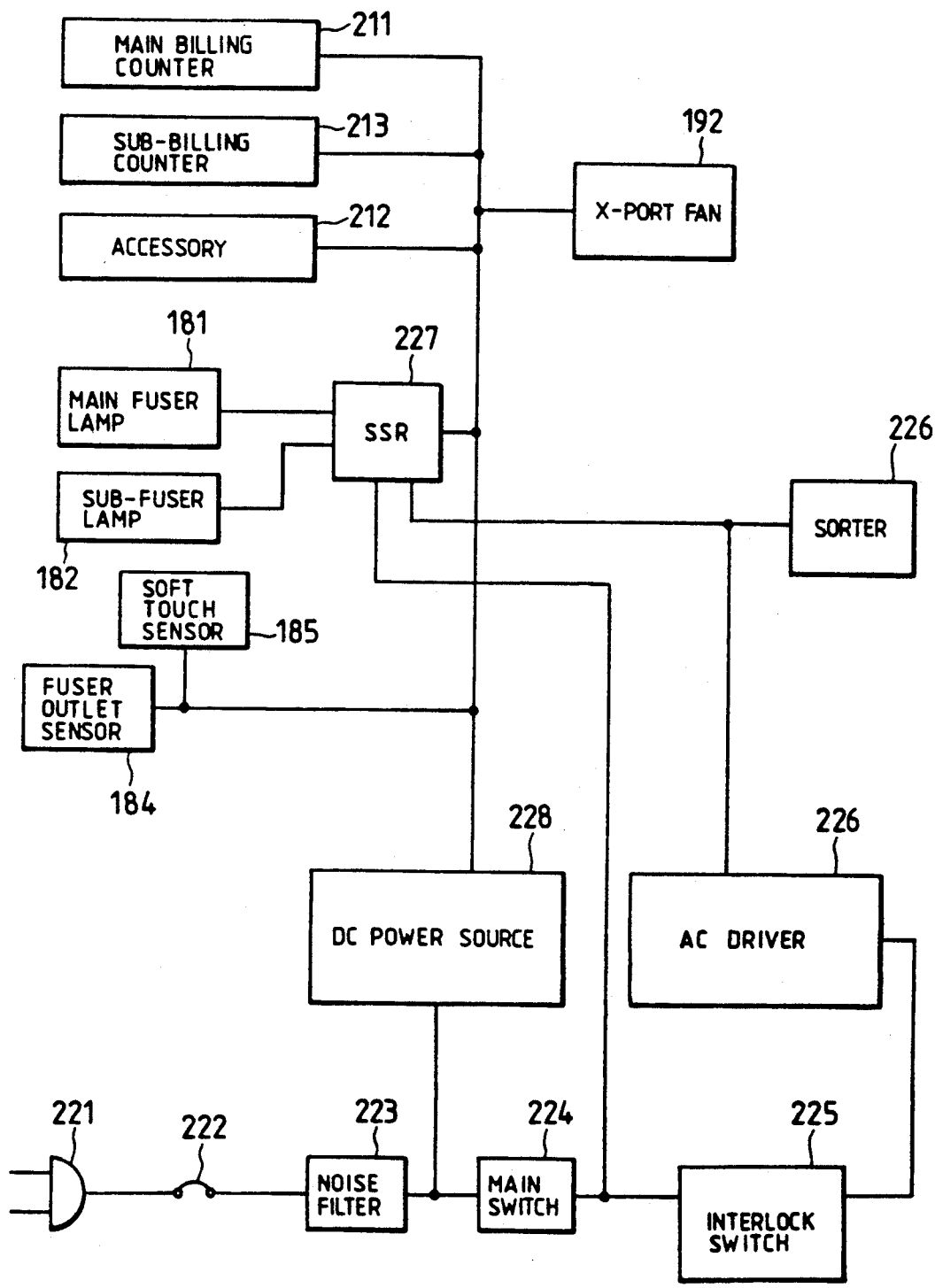
FIG. 12 is a detailed block diagram illustrating a power supply with a fixing device of the copying machine.

The relationship of a fixing device to the other devices will subsequently be described. FIG. 12 illustrates the fixing device.

The base machine 21 in this embodiment is provided with a main fuser lamp 181 and a sub-fuser lamp 182, i.e., two kinds of fuser lamps within the heat roll 66. The sub-fuser lamp 182 is shorter than the main fuser lamp 181 and slightly deviated from one end of the main fuser lamp 181. In this embodiment, the so-called corner registration method is employed, wherein the copying paper 60 in this copying machine is aligned with one side of the platen glass plate 55, whereby the required quantity of heat energy in the axial direction of the heat roll 66 differs with the size of copying paper 60 for use. In order to correct the deviation of the temperature distribution in the axial direction caused thereby, the power supplied to the sub-fuser lamp 182 is controlled, depending on the size of copying paper 60. The adoption of the sub-fuser lamp 182 makes it possible to satisfactorily prevent temperature variations in the fixing device.

A fuser outlet sensor 184 and an STS (Soft Touch Sensor) 185 are both connected to the fixing device. The fuser outlet sensor 184 is employed to detect whether the copying paper is discharged on the discharge tray without being rolled in between both the rolls 66 and 67. The STS 185 is the temperature sensor of the fuser lamps 181, 182.

(4-5) Control Console

Referring to FIG. 11 again, the control of the console will be described.

A console control unit 191 is provided with a message ROM 192 for displaying messages in *Kanjis* (Chinese characters). A reader/writer 194 for reading and writing the IC card 131 (FIG. 6) and connecting the editor pad 132 (FIG. 6) via an interface board 193 in the console controlling unit 191 can be connected thereto. The reader/writer 194 is, as described above, controlled by the card CPU 129 (FIG. 6). The console control unit 191 is connected to a main board 201 with the aforesaid main CPU 121 mounted thereon.

(4-6) Billing Counter

Referring to FIG. 12, a description will be given of a billing counter for use in collecting copying charges.

As the base machine 21 in this embodiment is capable of making copies in five colors, two kinds of billing counters are installed. Of the two, a main billing counter 211 counts the number of copies taken, irrespective of the color. The values counted by the main billing counter 211 are employed as data for use in controlling counts even when accessories 212 such as a coin kit and a key counter are fitted to this copying machine. A sub-billing counter 213 is used to count the sum of the number of colors used for each color copy taken.

(4-7) Power Supply

Referring to FIG. 12, a power supply will be described.

The base machine 21 is connected to a commercial 100 V power supply. As to those put in overseas markets, it has been arranged that they can be connected to a 115 V/60 Hz or 220 V/50 Hz power supply. The power supplied via a plug socket is given to a main switch 224 through a 15A (ampere) circuit breaker 222 and a noise filter 223. The power is then supplied from the output of the main switch 224 via an interlock switch 225 to an AC driver 226, a fixing control element 227 and a DC power supply 228. Further, the power is supplied to the DADF 24 and the intermediate tray 33.

The AC driver 226 supplies the power to the following parts at a predetermined timing.

(a) Deelectrifying erase lamp 155 (FIG. 8).
(b) Exposure lamp 56 and a fan 177 for an optical system (FIG. 11).
(c) Main fuser lamp 181 and the sub-fuser lamp 182 (FIG. 12).

The DC power supply 228 supplies the following parts at a predetermined timing:

(a) Interlock switch 225 (FIG. 12).
(b) AC driver 226 (FIG. 12).
(c) High-voltage power supply device 162 FIG. 8).
(d) Sorter 38 (FIG. 12).

(e) Fuser outlet sensor 184 (FIG. 12).
(f) Element 227 for controlling fixation (FIG. 2).
(g) Accessories 212 (FIG. 12).

Accessories include a coin kit for having copies taken, e.g., coins and a key counter for controlling copying-making operation in each section.

(h) Main billing counter 211 and a sub-billing counter 213 (FIG. 12).

(i) X-port.fan 192 (FIG. 12); a vacuum fan for sucking the copying paper 60 conveyed in a conveyer passage called an X-port.

(j) Inter-image lamp controller 157 (FIG. 8).
(k) Carriage motor 171 (FIG. 11).
(l) Registration sensor 172, density control sensor 173, lens mirror sensor 174 and lens mirror motor 175 (FIG. 11).
(m) Original sensor 178 (FIG. 11).
(n) Ink release switch 159, toner empty detecting sensors of sub-developing devices 59S1~59S4 and main developing device 59M and development selecting solenoid 161 (FIG. 8).
(o) Main board 201 (FIG. 8, etc.).

(4-8) Conveyer System

Figure 13:
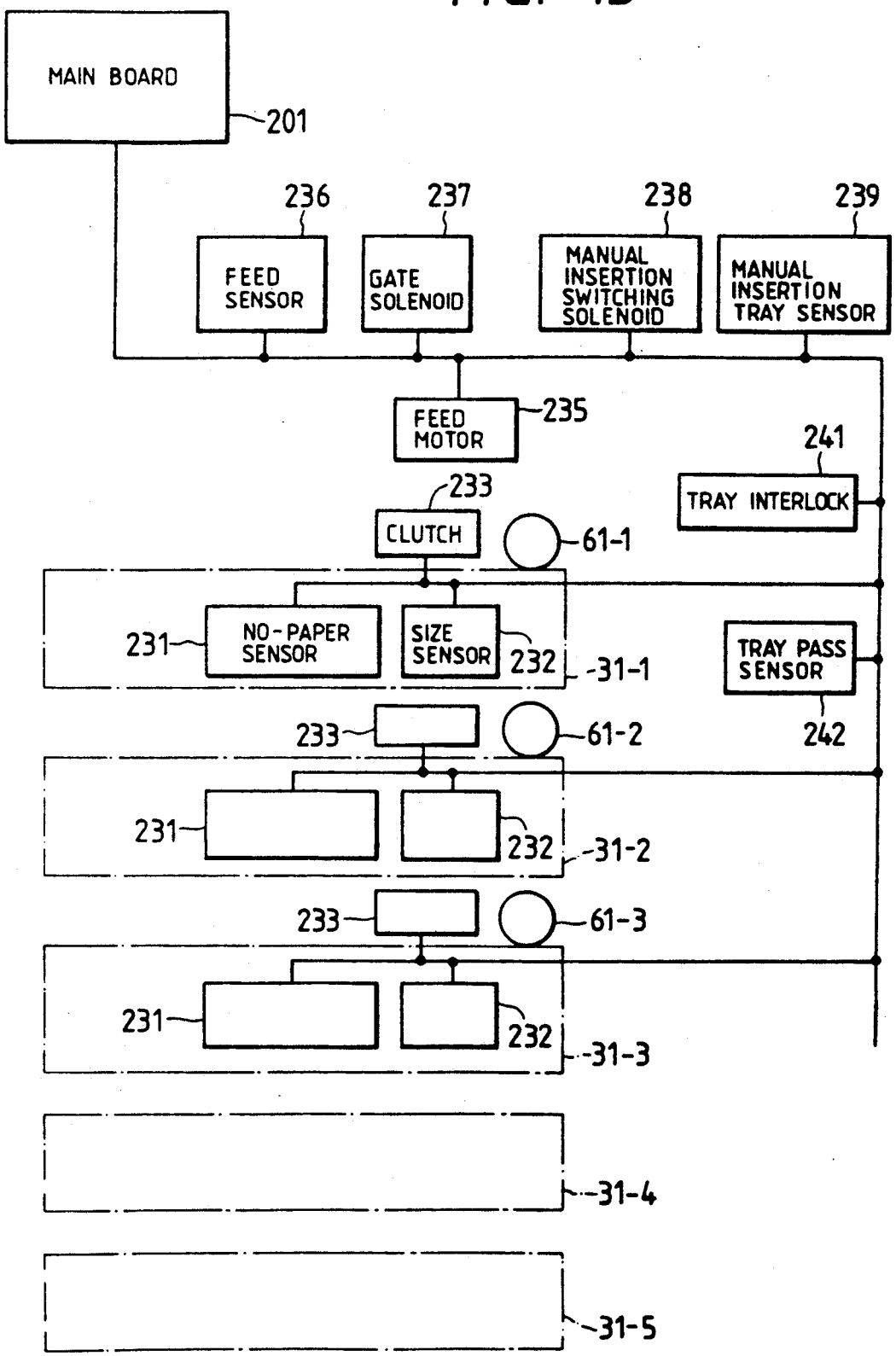
FIG. 13 is a detailed block diagram illustrating a circuit arrangement of a copying paper conveyer system.

Referring to FIG. 13, a conveyer system for conveying copying paper will be described.

The first~fifth feed trays 31-1~31-5 are provided with no-paper sensors 231, size sensors 232 and clutches 233, respectively. The no-paper sensors 231 are used to detect the presence or absence of copying paper on the feed trays 31-1~31-5. Copying paper of the same size can be set on the plurality of feed trays in this copying machine and copying paper of the same size is automatically supplied from another feed tray when no copying paper is present on one of the feed trays. The size sensor 232 is used to identify the size of copying paper placed on the tray. The clutch 233 is a component part for controlling the on/off state of each of the feed rolls 61-1, 61-2, ... being driven.

Copying paper is fed by a feed motor 235 for special use in feeding the paper. A step-motor is used as the feed motor 235. A feed sensor 236 detects whether copying paper is being properly conveyed. A gate solenoid 237 is used to true up the front edges of sheets of copying paper sent out once. The gate solenoid 237 is different from an ordinary type and is used to control copying paper in such a manner that the paper is passed as it opens when energized.

More specifically, power is not supplied to the gate solenoid 237 in the standby state in which no copying paper arrives thereat, and the gate is kept open. Power is then supplied to the gate solenoid 237 slightly before the arrival of copying paper, and the gate is shut to check the passage of the copying paper. The gate solenoid 237 is subsequently deenergized and opened at the point of time when the copying paper is conveyed again at the predetermined timing. The gate solenoid 237 is controlled so that its position fluctuates less at the point of time when the front edge of the copying paper is held in check. The copying paper is thus accurately positioned even while it is relatively strongly pressed against the gate solenoid 237.

A manual insertion switching solenoid 238 is used to switch the driving of a carrier roller for conveying copying paper sent out from the first feed tray 31-1 and a carrier roller for conveying copying paper manually fed from the tray 41 for manual insertion. A manual insertion tray sensor 239 detects the presence of copying paper when sheets of copying paper are fed from the tray 41 for manual insertion. A tray interlock switch 241 is fitted to a mechanism operated to remove the blocked copying paper. A tray pass sensor 242 detects the copying paper 60 supplied from the second and third feed trays 31-2, 31-3 and arranged near the connection of the base machine 21 and the feed trays 31-2, 31-3.

(4-9) DADF

Figure 14:
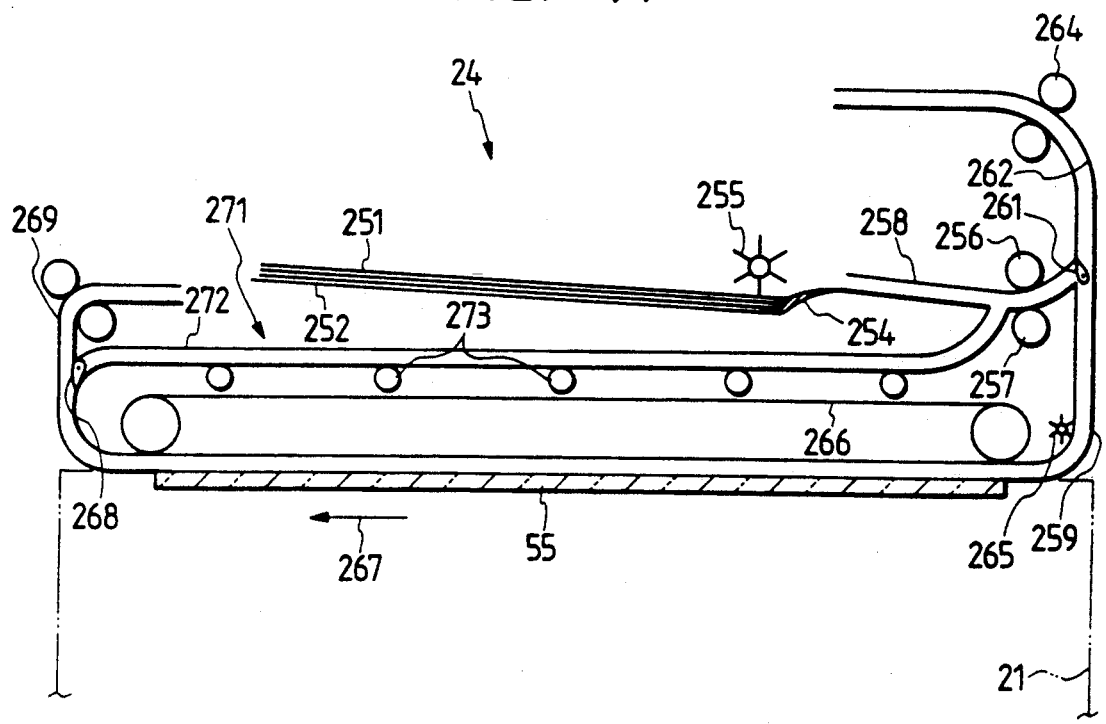
FIG. 14 is a schematic block diagram of a DADF.

Referring to FIG. 14, the DADF 24 will be described in detail.

The DADF 24 is mounted on the platen glass plate 55 of the base machine 21 and provided with an original tray 252 on which originals 251 are placed. Originals 251 are piled on the original tray 252 in such a manner that the first side of each original from which a copy is taken faces down.

A retard pad 254 and a feed paddle 255 are disposed on one side of the original tray 252 from which originals 251 are sent one after another. The originals 251 thus fed is moved by driving rollers 256 and 257 passed through an S-shaped conveyer 258 before being pressed against a branch guide 261 arranged in the position where the S-shaped conveyer 258 and a vertical conveyer 259 intersect. The branch guide 261 is opened thereby and the original 251 is sent to an inverted conveyer 262.

When the rear end of the original 251 passes through the branch guide 261, the branch guide 261 is stopped on the S-shaped conveyer 258 side because of a spring action (not shown). Then the passage of the original 251 is detected by a sensor (not shown) arranged close to the branch guide 261. A driving roller 264 for inverting the original responds to the detection signal output and turns inversely. As a result, the direction in which the original 251 is conveyed is inverted and changed to what is roughly perpendicular to the platen glass plate 55.

The original 251 is conveyed while one side of the original abuts against a side positioning guide (not shown) and is thus adequately positioned. The original is further carried by an endless conveyer belt 266 up to a proper position on the platen glass plate 55. In this manner, a copy of the first side of the original 251 is made.

After the completion of exposure of the first side, the original 251 is conveyed by the endless conveyer belt 266 in the direction of arrow 267. When only one side is copied, a vertical conveyer 269 is selected by a guide on the outlet side and the original 251 is received by an original receiving part 271.

If the second side opposite to the first one is copied, a horizontal conveyer 272 is selected. The original 251 fed onto the horizontal conveyer 272 is conveyed by a carrier roller 273 in the direction opposite to the arrow 267 and further conveyed by the driving roller 256 and the driven roller 257 to the S-shaped conveyer 258. At this time, the underside of the original 251 is the second side which is opposite to the first side of the original placed on the original tray 252. Accordingly, the second side is copied when the original 251 is sent to the platen glass plate 55.

The original 251 is sent to the vertical conveyer 269 by the action of the guide 268 on the outlet side after the exposure of the second side and discharged onto the original receiving part 271.

(4-10) Sorter

Figure 15:
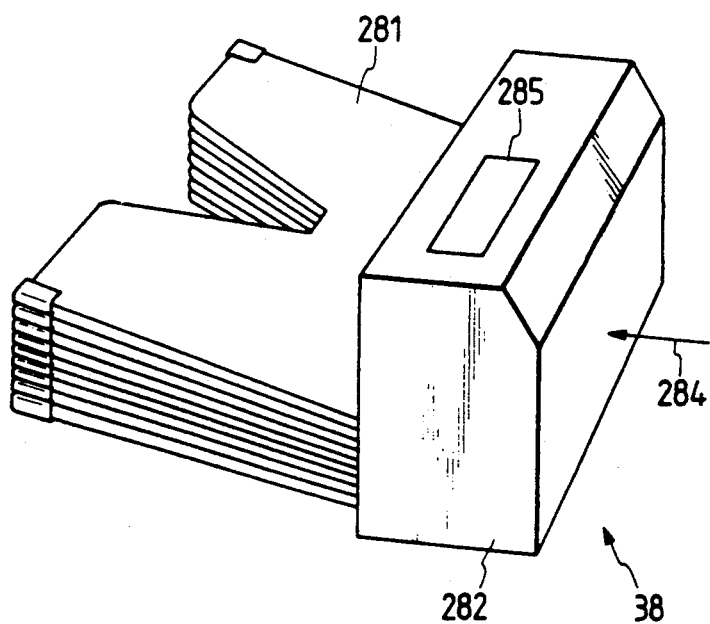
FIG. 15 is a perspective view of a sorter.

Referring to FIG. 15, the 10-bin sorter 38 will be described in detail.

FIG. 15 is an external view of the sorter. The 10-bin sorter 38 is constructed so that 10 bins 281 are integrally moved up and down. The sorter proper 282 consists of a driving source (bin motor) for moving them up and down, a cam and a cam switch for controlling the movement of each bin, and a down limit switch (both not shown) for detecting the arrival of the bins 281 at the lowest limit position.

Copying paper 60 is moved by the carrier rolls 68, shown in FIG. 4, in the direction of arrow 284 and fed into the sorter proper 282 and discharged onto the bins located opposite to the conveyer passage. Some sorters are designed to switch the discharge passage not by moving the bins 281 but by moving the sorter proper 282. Mode selection in the sorter 38 is effected by operating the panel 74 for a sorter shown in FIG. 5.

(4-11) Intermediate tray

The intermediate tray 33 will subsequently be described.

Figure 16:
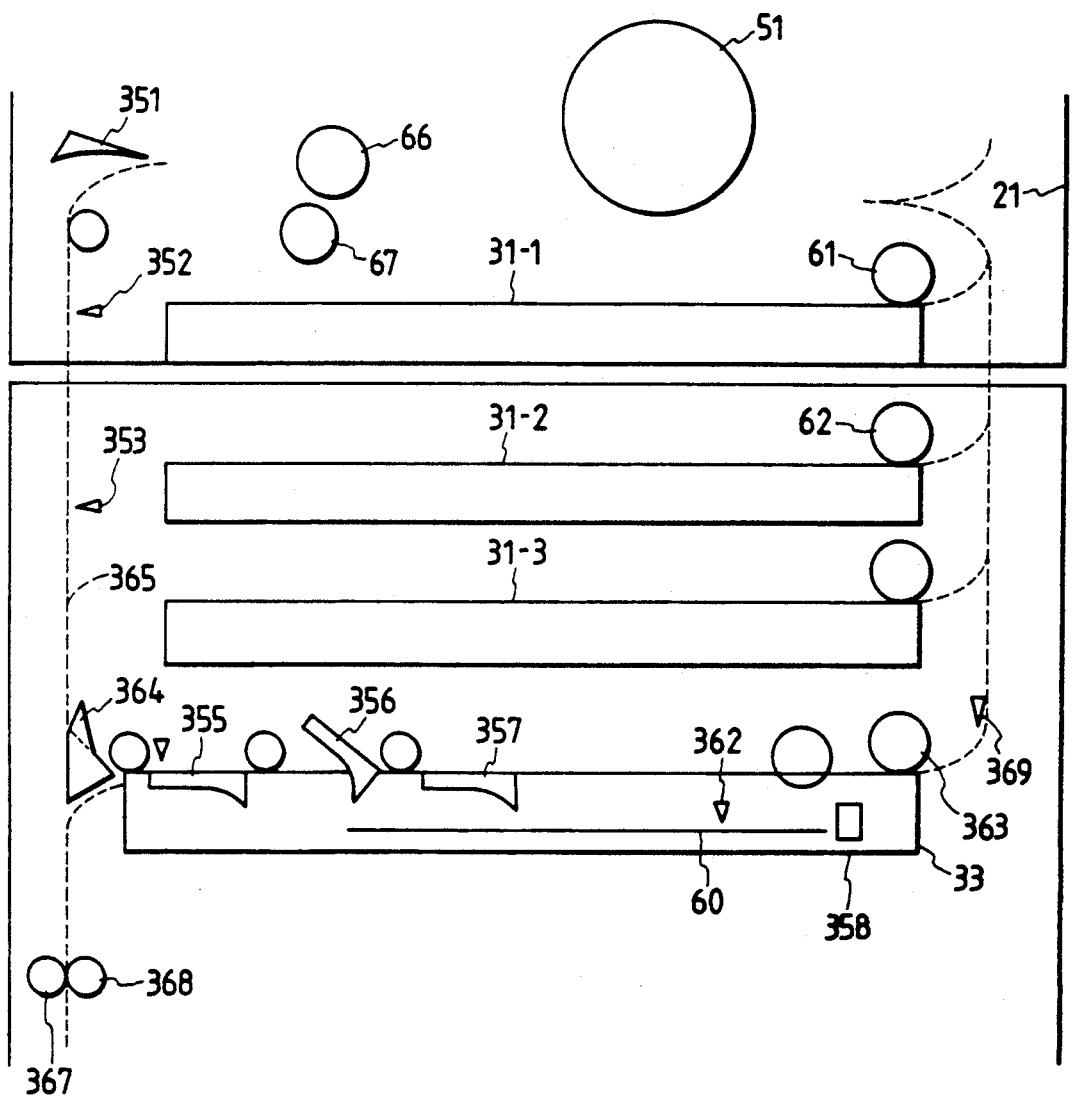
FIG. 16 is a schematic side view illustrating the conveyer system with an intermediate tray as a main figure.

FIG. 16 shows the conveying system centering around the intermediate tray 33.

The copying paper 60 heat-fixed by the heat roll 66 in the base machine 21 is controlled in such a manner that it is discharged by a duplex gate solenoid 351 installed in the base machine 21 onto the discharge tray or sent to the intermediate tray 33. A first duplex pass sensor 352 is disposed on the base machine 21 side, whereas a second duplex pass sensor 353 is located close to the second feed tray 31-2, the pass sensors being used to detect whether or not the copying paper 60 approaching the intermediate tray 33 is blocking the passage.

No feed roll for feeding the front edge of copying paper 60 up to the front edge of the tray is provided for the intermediate tray 33. As a result, three duplex solenoid gates 355~357 for carrying the copying paper 60 received up to a desired position, depending on its size, and then "dropping" the paper onto the tray are provided. These duplex solenoid gates 355~357 have the solenoids operate selectively, depending on the size of the copying paper received, so that the corresponding gate opens or closes. A skew-roll solenoid gate 358 controls the copying paper 60 thus dropped in such a manner that one corner of the front edge thereof is caused to abut against the front edge of the intermediate tray 33 and uniformly arranges the front edges of sheets of copying paper received. Each time that operation equivalent to one sheet of paper is completed, the main billing counter 211 counts the value upward.

As already described, the intermediate tray 33 is controlled by the CPU 128 and copying paper is conveyed under the control of the duplex motor 361 (FIG. 8). A duplex sensor 362 is used to detect the presence or absence of copying paper 60 on the intermediate tray 33. A duplex clutch 363 is a mechanism for turning on/off the driving source feeding copying paper 60.

An inverter gate solenoid 364 is used to switch the operation to take duplex copies, give a marking to the same side with a plurality of colors or to obtain synthesized copies. While the inverter gate solenoid 364 is kept directed as shown in FIG. 16, the copying paper 60 conveyed downwardly through a conveying passage 365 is guided by the inverter gate solenoid 364 and dropped before being conveyed upwardly by carrier rolls 367 and 368. The direction in which the copying paper 60 has been conveyed is turned right in FIG. 16 before the inverter gate solenoid 364 and the paper is placed on the intermediate tray 33 upside down. A duplex copy is taken if the conveyance of the copying paper in that state is restarted.

On the other hand, if the direction in which the copying paper 60 has been conveyed downwardly is turned right in FIG. 16 before the inverter gate solenoid 364, the copying paper 60 is placed with its surface side up again. A copy is then taken again on the same side if the conveyance of the copying paper in that state is restarted. When marking is made with N kinds of colors, one sheet of copying paper is normally put on the intermediate tray 33 N times and then subjected to monochromatic development before being discharged.

A duplex feed sensor 369 detects whether the copying paper sent out of the intermediate tray 33 has become lodged.

(4-12) Editor Pad

Figure 17:
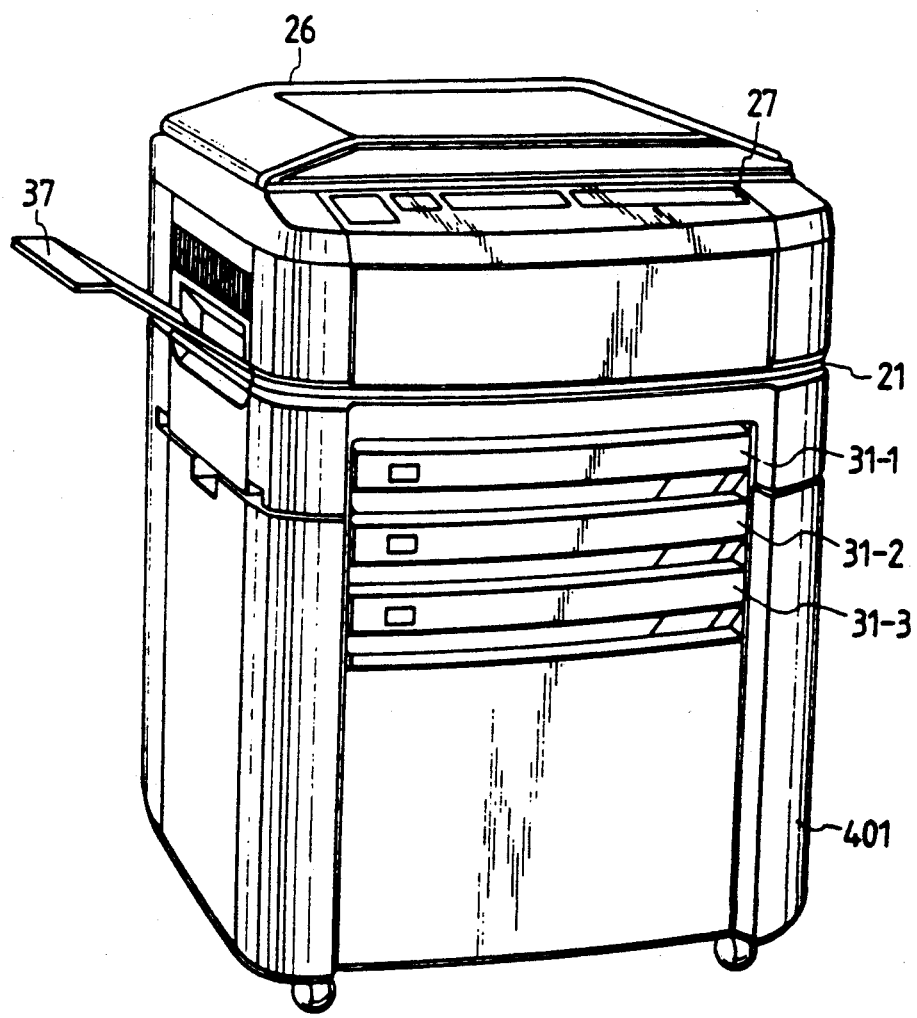
FIG. 17 is a perspective view illustrating a system configuration of the copying machine equipped with a editor pad.
Figure 18:
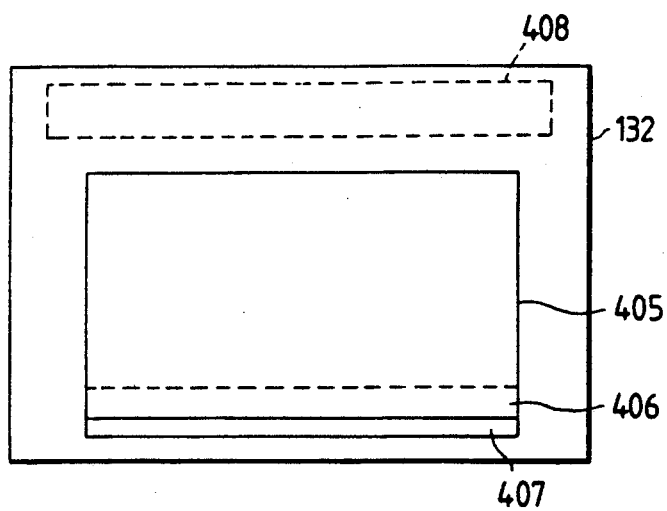
FIG. 18 is a top view of the editor pad.

Referring to FIGS. 17 and 18, an editor pad 132 will be described in detail.

FIG. 17 shows the system configuration of the copying machine with an editor pad. More specifically, because the copying machine embodying the present invention is equipped with the DADF 24 mounted on the platen glass plate 55 as shown in FIG. 3, the platen 26 with an editor pad cannot be mounted thereon.

In the copying machine shown in FIG. 17, the platen with the editor pad is mounted on the base machine 21. The editor pad 132 is located in a square portion in FIG. 17. This copying machine is provided with a back lit type console panel. Moreover, a cabinet 401 containing only the second and third feed trays 31-2, 31-3 is arranged under the base machine 21. The base machine 21 is fitted without a sorter but the discharge tray 37 for receiving the discharged copying paper is installed.

As to the general construction of the copying machine, see FIG. 2. The editor pad 132 is extremely convenient for coordinate input and usable as an independent unit for the copying machine so constructed as shown in FIG. 3 as an embodiment of the present invention. In this case, the editor pad 132 may be placed on a desk or the like and directly connected to the IC card device 22 (FIG. 3) with a cord or coordinate data may be written to the IC card 131, which is then mounted on the IC card device 22 for use.

FIG. 18 illustrates the construction of the editor pad. The editor pad 132 is provided with a rectangular coordinate input pad 405 which is 307 mm long and 432 mm wide. An area 10 mm wide on this side of the pad is employed as an editor panel 406. The editor pad 132 including the editor panel 406 is such that a first rubber pad with a resistance wire for designating a position on the abscissa and a second rubber pad with a resistance wire for designating a position on the ordinate are superposed with a spacer sandwiched therebetween. The position pressed by the finger of the operator or tip of a pen is sensed in the form of values on the abscissa and ordinate. On this side of the editor panel 406 is a display panel 407 for displaying various kinds of data. Moreover, a circuit board for processing coordinate data 408 and a circuit board interface circuit are disposed in the rear portion of the editor pad 132.

FIG. 19 shows the editor panel illustrated in FIG. 18 and the principal part of the display panel. The following buttons are disposed on the editor panel 406:

(a) Special function button 411 for use when special functions are employed.

(b) Button 412 for dimensional alteration and redoubling, and used to specify contraction and magnification by designating distances.

(c) Extraction button 413 for extracting the area specified, and used for monochromatic recording.

(d) Deletion button 414 for deleting the area specified, and also used for monochromatic recording.

(e) Continuous color synthesizing button 415, which is a function button for specifying the function of continuous color synthesizing.

(f) Marking color button 416, which is a function button for specifying the function of marking color.

(g) Partial color conversion button 415 used to specify the function of converting partial color.

(h) Color inversion button 418 used to color the area specified by color in black and to convert the area specified by black to color. The continuous color synthesizing button 415, the marking color button 416, the partial color conversion button 417 and the color inversion button 418 are all function buttons for color recording.

(i) Method designation button 419 used to choose whether an area is specified with the coordinate of two points at both ends of a diagonal line of a rectangle or the coordinates of each point of a polygon.

(j) Area color designation button 421 used when an area is specified.

(k) Area clear button 422 used to release the designation of an area.

(l) Setting termination button 423 used when the designation of one or a plurality of areas is completed.

Attached to the display panel section 407 corresponding to the first 8 buttons 411~418 are display lamps 425 for displaying whether the respective 8 buttons 411~418 have been selected. As for the designation method button 419, a diagonal designation lamp 426 or a polygon designation lamp 427 is lit, depending on the designation selected.

Figure 53:
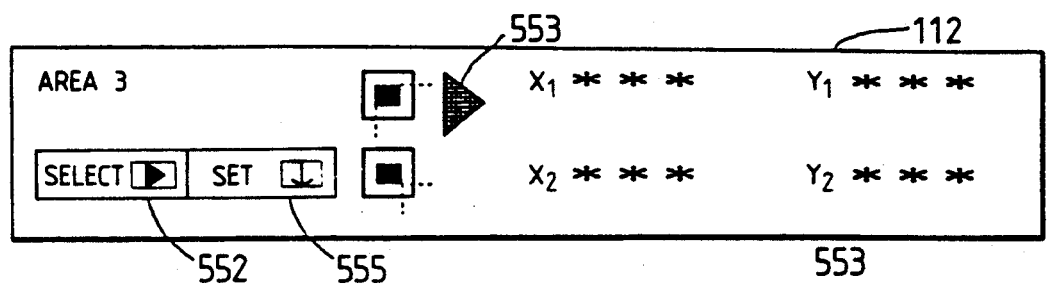
FIG. 53 is a top view of an example of a display on the liquid crystal display when a third are is modified.
Figure 54:
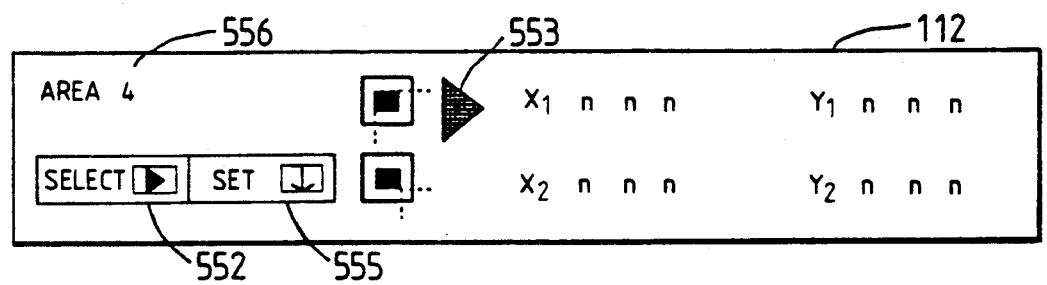
FIG. 54 is a top view of an example of a display on the liquid crystal display when a fourth area is modified.
Figure 55:
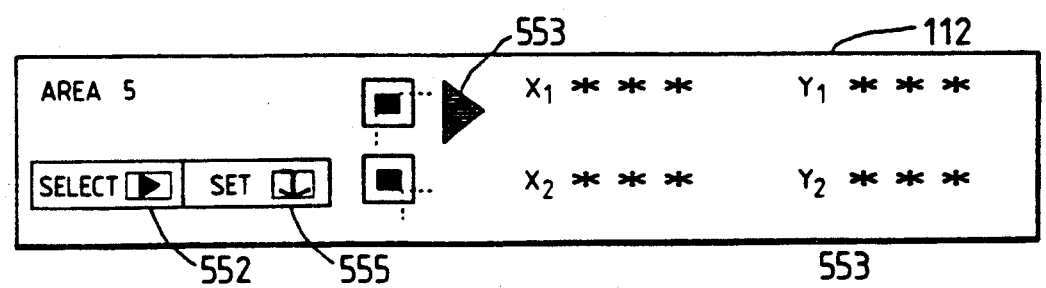
FIG. 55 is a top view of an example of a display on the liquid crystal display when a fifth area is modified.

(m) Normal marking button 431 used to specify the normal marking form for uniformly marking, e.g., rectangular areas 17A, 17B of FIG. 53.

Figure 56:
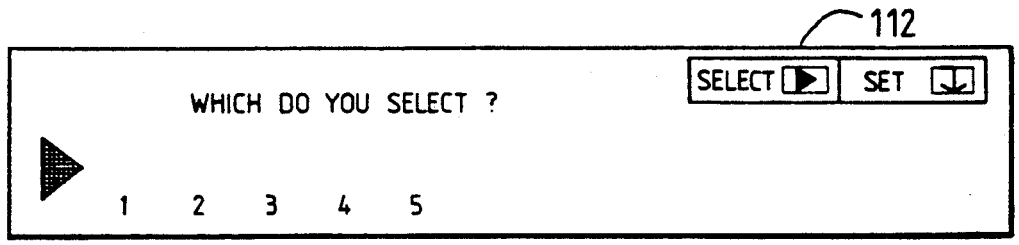
FIG. 56 is a top view of an example of a display on the liquid crystal display when an area is selected.

(n) Frame marking button 432 used to mark a frame-like area 17H enclosing the specified area shown in FIG. 56.

(o) Line marking button 433 used to mark the specified area with a thick underline shown in FIG. 56.

(p) Color designation buttons 434~437 for specifying a color relative to a marking area because the marking color can be determined independently on an area basis. In this case, the color designation button 434 is used to specify red and the color designation button 435 to specify blue. The color designation button 436 is employed to specify green and the color designation button 437 to specify light brown. As set forth above, the color marking apparatus in this embodiment permits colors other than the above-described ones to be set and, in that case, the top covers attached to the surface of the color designation buttons 434~437 will have to be replaced with desired ones, respectively. Display lamps 438 are annexed to the buttons 431~437 for special use in marking. The buttons have been described in (m)~(p), respectively, in order to display the selected lamp.

(4-13) Large Capacity Tray

In place of the fourth and fifth feed trays 31-4, 31-5, a large capacity tray 471 can be set in this copying machine. Although the construction of the copying machine in this embodiment is different from what includes the large capacity tray, a brief description thereof will subsequently be given.

Figure 20:
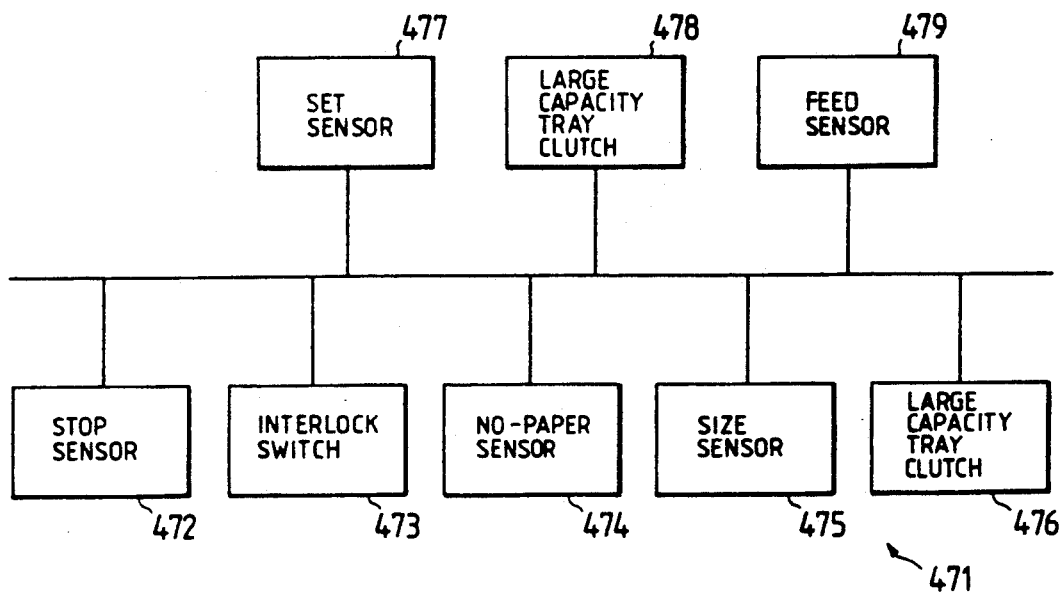
FIG. 20 is a block diagram of a circuit arrangement of a large capacity tray.

FIG. 20 is a block diagram illustrating the circuit configuration of a large capacity tray.

The large capacity tray 471 is employed to set 1,000~2,000 sheets of copying paper at a time and a large number of copies can be taken without interruption. The large capacity tray 471 is equipped with the following circuit components. The large capacity tray 471 is supplied with alternating current from the output of the noise filter 223 shown in FIG. 8 and direct current from the DC power supply 228 via the main board 201 shown in FIG. 8 and operates the following circuit components.

(a) Stop sensor 472.

A sensor fitted to the large capacity tray 471 equipped with an elevator mechanism for moving copying paper up and down and used to detect the lower limit position.

(b) Interlock switch 473.

An interlock switch fitted to the front panel of the large capacity tray 471 and used to detect the opening and closing of the panel.

(c) No-paper sensor 474.

A sensor for detecting that sheets of the copying paper 60 contained are running short.

(d) Size sensor 475.

A sensor for identifying the sizes of copying paper 60.

(e) Motor 476 for Large capacity tray.

A motor for driving the elevator mechanism of the large capacity tray 471 to move its copying paper container up and down.

(f) Set sensor 477.

A sensor for detecting the upper limit position of the large capacity tray 471 equipped with the aforesaid elevator mechanism.

(g) Clutch 478 for Large capacity tray.

A clutch for controlling the feeding of copying paper.

(h) Feed sensor 479.

A sensor for detecting the logged copying paper fed from the large capacity tray 471.

(5) COLOR MARKING PROCESS (5-1) Principle of Color Marking

The principle of the color marking process carried out by the copying machine will be described prior to giving a description of the operation of modifying the input data for marking.

Figure 21:
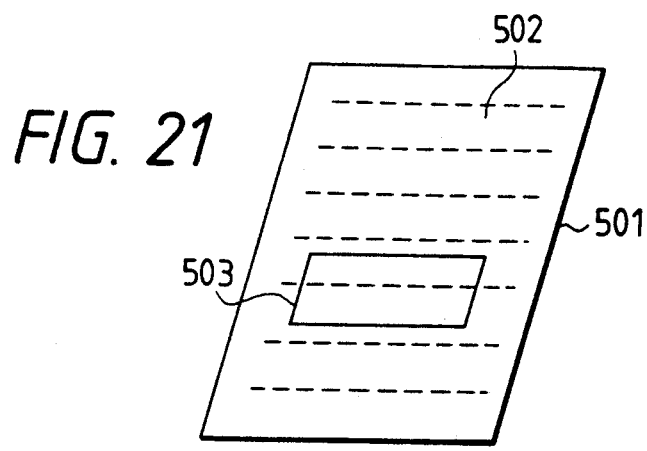
FIG. 21 is a diagram illustrating paper subjected to a color marking process.

FIG. 21 is a diagram illustrating copying paper subjected to the color marking process. In the color marking process carried out by the copying machine in this embodiment, the specified area 502 (rectangular in this embodiment) of image data 502 monochromatically expressed on an original 501 as shown therein, is lightly colored. The color used for marking is shown by the lit display lamp 87 located in the uppermost portion of the monochromatic color contrasting panel (FIG. 5) section 76. In this embodiment, one of the four colors, red, blue, green and light brown, may be selected for marking.

Before the color marking process is described, examples of color marking applications will be explained.

Figure 22:
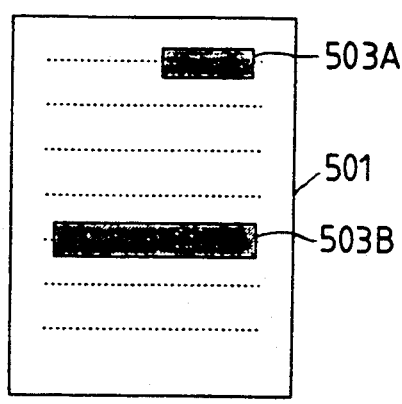
FIG. 22 is a top view illustrating two rectangular areas of an original which are marked with one color.
Figure 23:
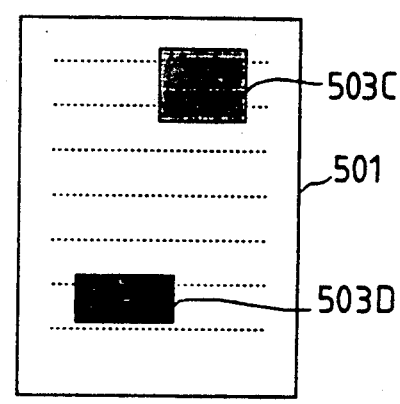
FIG. 23 is a top view illustrating two rectangular areas thereof marked with different colors, respectively.

FIG. 22 shows an example in which two rectangular areas 503A and 503B of an original 501 are marked with one color. On the contrary, an area 503C and another 503D are marked with different colors as shown in FIG. 23. Using different colors to mark different areas in this manner is convenient because the areas thus marked can be colored by the degrees of importance, fields and uses.

Figure 24:
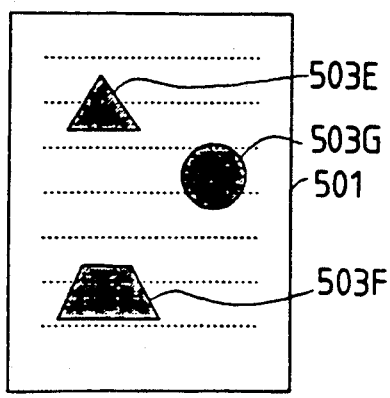
FIG. 24 is a top view illustrating areas of different shapes in color.
Figure 25:
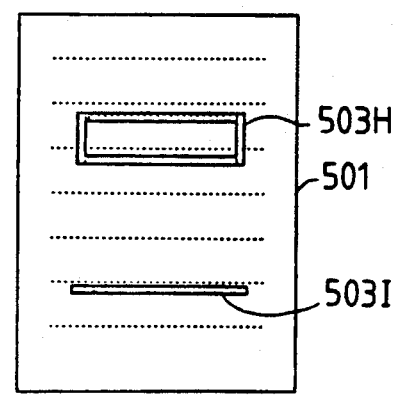
FIG. 25 is a top view wherein areas are specified with a frame and an underline.

The making area is not limited to a rectangle. As shown in FIG. 24, various shapes such as triangular, trapezoidal and circular shapes 503E, 503F and 503G are possible. The color marking process does not always mark a particular area with color. A frame-like area 503H enclosing a particular area and a thickly underlined area 503I may be set as shown in FIG. 25.

The designation of the circular area in FIG. 24 can be effected by using a keyboard to input the coordinates of the center point and the radius or diameter thereof, or supplying the position of the center point and one point on the circumference from the editor pad. An ellipse may also be designated (not shown). The designation of the position of a triangle or square will be described in detail later.

A description of the order in which the color marking process is conducted is as follows:

(1) The operator first designates an area for marking using the editor pad 132 (FIG. 18). With a copying machine having an editor pad 26 and no platen (FIG. 2), the editor pad 132 may be connected to the IC card device 22 with a cord as described above. When the editor pad 132 is not employed, the ten keys 80 may be used to designate the area. However, the shape of the area thus designated is limited to a rectangle.

(2) When the operator sets the copying machine in the color plate 55 and pushes the start button 117, the copying machine reproduces the portion designated by the editor pad 132 with a designated color and accommodates the copy in the intermediate tray 33.

The position of the optical lens 58 shown in FIG. 4 is set at an equimultiple position (100%) irrespectively of the magnification to which the copying machine has been set. Moreover, the carriage moved by the mirror 57 stands still in the position of a reference reflection plate and the exposure lamp 56 in this state throws light to the reference reflection plate at all times. The reference reflection plate is installed close to the platen glass plate to keep the copy density constant even though the exposure of the exposure lamp 56 changes. When color marking is conducted, the marking is carried out with a uniform density, irrespective of the image data 502 on the original 501, and the carriage becomes fixed to the position of the reference reflection plate without scanning the platen glass plate 55.

The exposure of the exposure lamp 56 at this time is set at 50% as a target of the equimultiple value during the normal copy-making operation. The reason for this is that the marking is conducted in such a state as if the colored portion is "overlapped" the image. The bias voltage of the developing device 59 (FIG. 4) is set in the "lightest" mode, regardless of the value set by the operator or the initially set value of the copying machine. The lightest mode means the mode of setting the bias voltage at the upper limit value (about 400 V in this embodiment).

To give a marking to the designated area only, a charge pattern corresponding to the area is formed on the photoreceptor drum 51 and the inter-image lamp 141 is used for the purpose. In other words, the inter-image lamp 141 performs on/off control divided by the image-lamp controller 157 into 128 segments and forms the desired charge pattern by partially erasing the charge on the photoreceptor drum 51.

The charge pattern is developed by the subdeveloping device 59S, and the light color marking given looks as if it were drawn with a writing instrument.

(3) When the predetermined number of sheets of copying paper are placed on the intermediate tray 33, exposure scanning of the original is started. Copying paper is simultaneously fed from the intermediate tray 33 and normal copy-making operation is performed. When a magnification other than the equimultiple one has been set at the time of the copy-making operation, the position of the optical lens is automatically reset to the position of the magnification. When a copy density has been preset, the bias voltage of the main developing device 59M is automatically adjusted to the value of the copy density.

(5-2) Adjustment of Copy Density

The copy density of the portion marked by the subdeveloping device 59S has to be adjusted so that it ranges from 0.6 to 1.2, preferably 0.8~1.0 in terms of an optical density when a light color marking is given to the specified portion of the image data of the original.

The reason for setting the copy density in the range of 0.6~1.2 in terms of the optical density in the copying machine of this embodiment will be described.

(i) If the optical density becomes lower than 0.6, the marked portion, i.e., the portion where the light density has been set, can hardly be expressed as a uniform density. That is, the density level tends to become uneven and may cause "irregularity", thus making that portion of the image extremely indistinct in this case. Admittedly, the weak point of the latest electrophotographic technology is that medium contrast is unevenly reproduced.

(ii) If the optical density becomes higher than 1.2, no problem is posed in the reproducibility of that portion. However, image data including characters and figures superposed for marking purposes may be smeared and therefore the intended effect of marking is unobtainable because of the resulting indistinct images. For the reasons above, the optical density is set within the range of 0.6~1.2 in the copying machine of this embodiment. Generally speaking, the range of 0.8~1.0 in terms of the optical density was proved most preferable.

There is a method of reducing only the amount of charges applied to the photoreceptor drum 51, that of increasing only the bias of the sub-developing device 59S and the like to lower the copy density in the marking portion. Notwithstanding, a stabler desired copy density is available by combining the charged amount, increase in bias, and decrease in exposure. The copy density with respect to the marking portion can be made properly changeable, depending on the color of a developing agent and the use of a copy. Although the copy density of the marking portion is set lower than what is set by the main developing device 59M, the a density substantially the same as the latter may also be effective, as occasions demand.

The principle of adjustment of the copy density to the range of 0.6 to 1.2 in terms of the optical density will subsequently be described.

Figure 26:
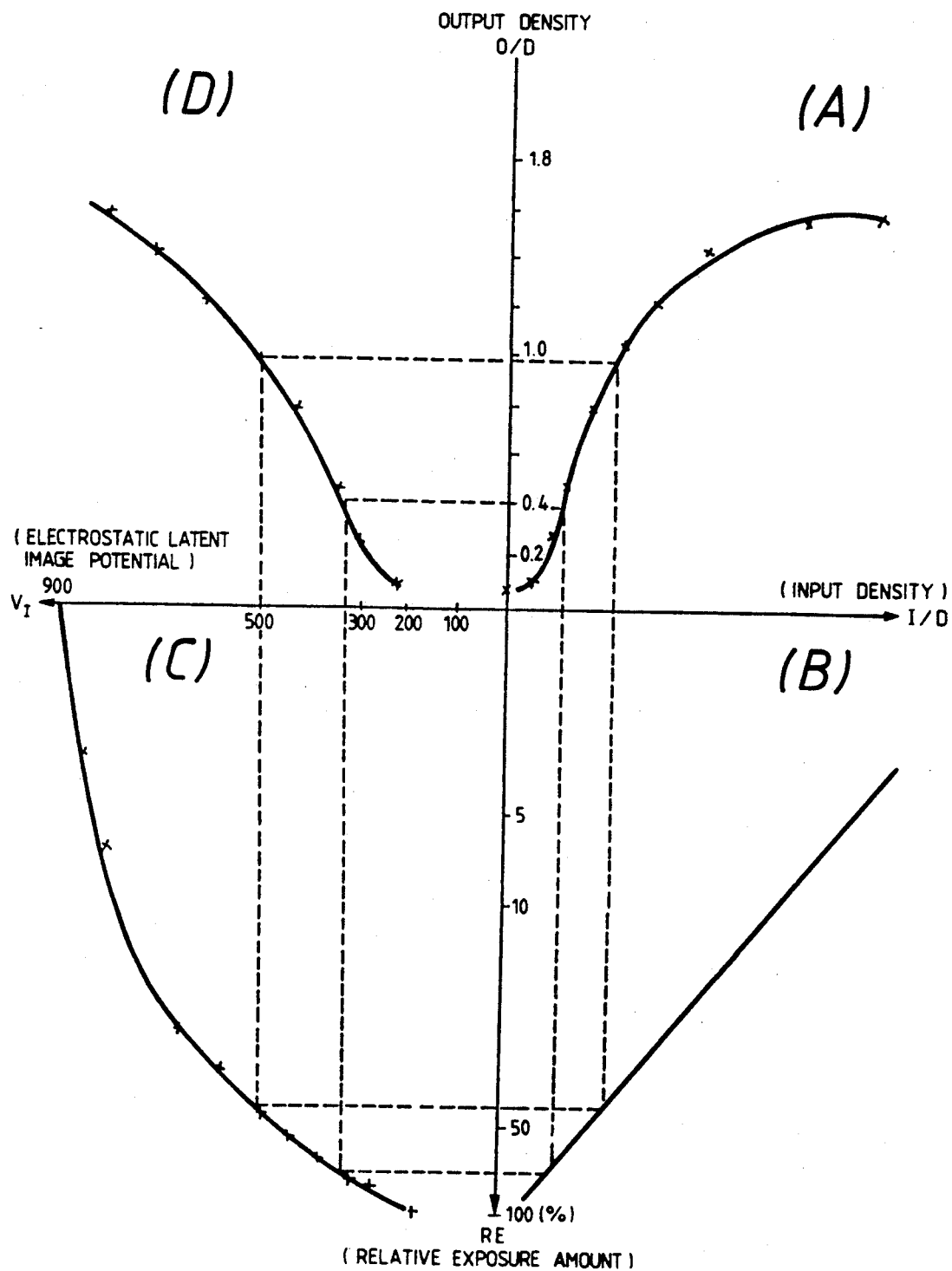
FIGS. 26(A) to (D) are characteristic diagrams illustrating the characteristics of the photoreceptor in this embodiment.

FIG. 26(A) is a graph illustrating the characteristics of the photoreceptor drum 51 employed in the copying machine of the embodiment. In this graph, the abscissa axis represents an input density (I/D), i.e., a density on the surface of a copy of the original 281 (FIG. 14), whereas the ordinate axis represents an output density (O/D), i.e., the optical density of the copy on the assumption that toner is black. When the input density is 1.0, an output density of about 1.5 is obtained with the black toner of the copying machine of this embodiment. The copying machine of this embodiment allows high density copies to be taken.

Assuming the optical density of the marking portion in this copying machine ranges from 0.6 up to 1.2, the relative exposure of the copying machine by means of the exposure lamp 56 (FIG. 4) has to be set within the range of 44% to 76% as shown in FIG. 26(B). As shown in FIG. 26(B), the abscissa and ordinate axes designate the input density (I/D) and the relative exposure (RE), respectively. The relative exposure is such that its 100% corresponds to bright potential and 0% to dark potential.

FIG. 26(C) is a graph illustrating the relation between the relative exposure on the photoreceptor drum 51 of the embodiment and the potential of an electrostatic latent image. While the relative exposure ranges from 44% to 76%, the potential of the electrostatic latent image in the marking portion ranges from 490 V to 330 V as shown in FIG. 26(C). The bias potential of the sub-developing device 59S has to be set so that the output density of the marking portion is set within the range of 0.6 to 1.2 relative to that potential range as set forth above.

The higher the bias potential is set, the smaller the gap between the potential of the electrostatic latent image and the former becomes. Consequently, the output density lowers. FIG. 26(D) is a graph showing a suitable bias value for setting the output density within the range of 0.6 to 1.2 when the potential of the electrostatic latent image ranges from 500 V to 300 V. It falls under 300 V in this example.

Figure 27:
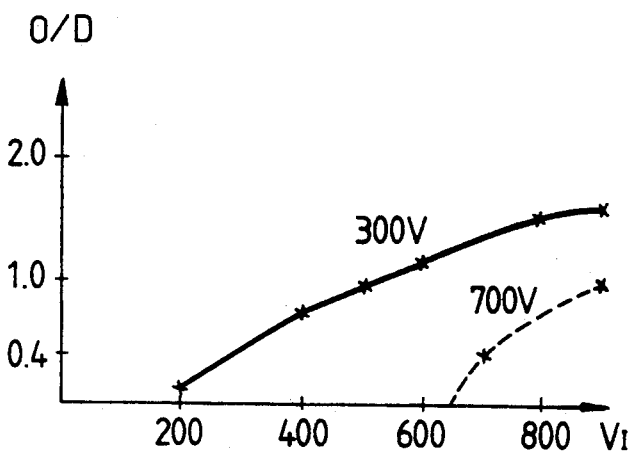
FIG. 27 is a characteristic diagram illustrating a comparison between cases where density adjustment is made by combining the exposure and bias voltage of the photoreceptor drum and where the density adjustment is made only by the exposure.

FIG. 27 is a graph showing a comparison between a case where the exposure and the bias voltage are combined for the adjustment of the density and another where only the exposure is used for the purpose.

It is not always necessary to combine the exposure and the bias voltage to reduce the copy density of the marking portion. The copy density thereof can be reduced by adjusting bias voltage of the sub-developing device 59 without lighting the exposure lamp 56 or the quantity of the current supplied to the photoreceptor drum 51 using the charge corotron.

The characteristics shown by a solid line in FIG. 27 signify the case where the bias potential is set at 300 V as described above and the other where the bias potential is set at 700 V while the exposure lamp 56 is switched off. At this time, the potential of the electrostatic latent image corresponding to the dark potential of the original on the photoreceptor drum 51 is assumed to be set at 900 V. As is obvious from FIG. 27, the output density can be set within the range of 0.6 to 1.2, provided the bias potential is set at 700 V.

On the other hand, the marking portion can be lightly colored by reducing the discharge current of the charge corotron while the exposure lamp 56 is switched off. For this purpose, the current value by the charge corotron 52 is adjusted so that the difference between the potential of the electrostatic latent image on the photoreceptor drum 51 and the bias potential of the sub-developing device 59S becomes about 200 V. Assuming the bias potential is 300 V, for instance, the potential of the electrostatic latent image of the marking portion becomes 500 V. In this manner, the copy density can be reduced up to a desired value by halving the current flowing through the charge corotron 52.

Moreover, a static eliminator lamp may be provided newly to adjust the drum potential of the marking image.

It is also possible to reduce the copy density by changing the developing characteristics of the developing device, e.g., by making variable the angle of the magnetic pole pattern and the speed of the developing roll.

(5-3) Color Marking Control in General

FIGS. 28 to 34 are diagrams illustrating the operations for implementing the color marking process.

Figure 28:
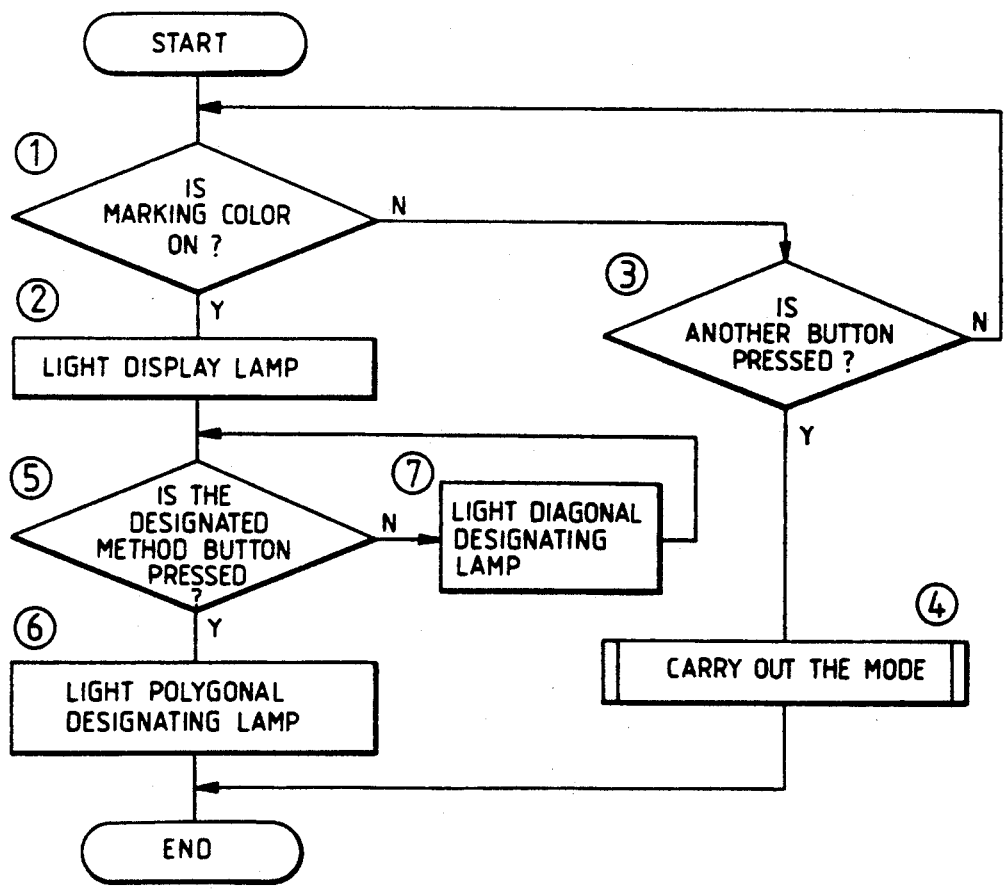
FIGS. 28 and 29 are flowcharts illustrating the operation of implementing the color marking process.

Referring to FIG. 28, when a marking area is designated, the card CPU 129 (FIG. 6) monitors whether the operator presses the button above the platen 26 with the editor pad. When the color button 416 is pressed (Step 1, Y), the card CPU 129 makes the corresponding display lamp 424 light to provide the color marking mode (Step 2). If any other button is pressed (Step 3), the operator in the corresponding mode is carried out (Step 4).

If the color marking mode is set, the CPU 129 monitors the state in which a designated method button 419 is pressed. If the designated method button 419 is pressed (Step 5, Y), the polygonal designating lamp 427 lights (Step 6). The diagonal designating lamp 427 will light initially unless the designated method button is pressed.

Figure 29:
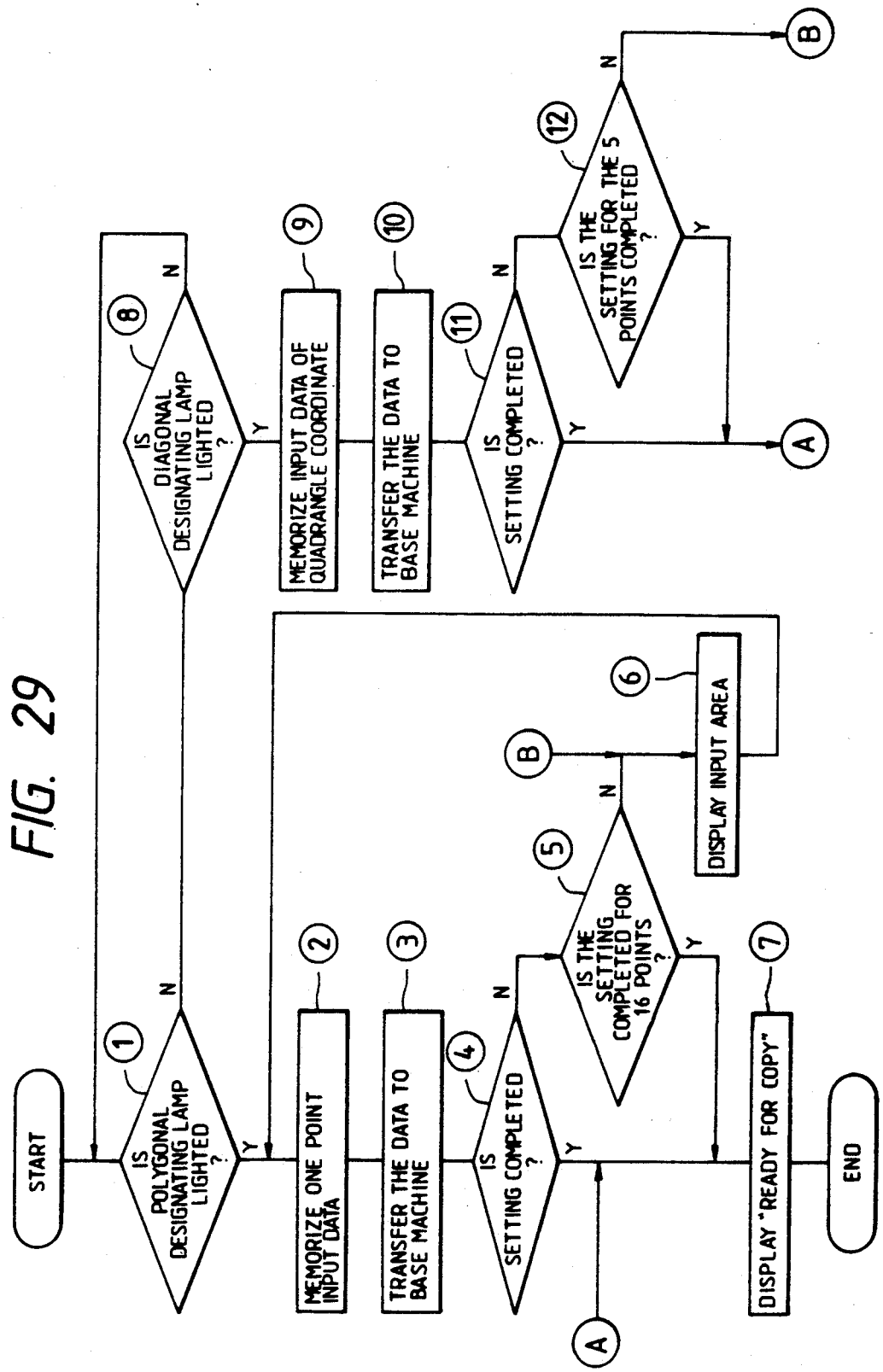

Referring to FIG. 29, one point of a polygon will be designated with the pen or operator's finger, provided the polygonal designating lamp 427 lights. The coordinate data is stored in the RAM under control of the CPU 129 (Step 2). Then the data on that one point is transferred to the main CPU 121 of the base machine 21 (Step 3). The data is stored in both the storage areas of the display CPU 127 and the CPU 122 for the inter-image lamp.

Unless the operator presses the setting completion button 423 in that state (Step 4, N) and unless the designation is of the 16th place (Step 5, N), the position and size of the area applied to the liquid crystal display 112 corresponding to the size of the actual editing picture plane are displayed as an "input figure." Because of this display, the following point input is shown as being applicable (Step 6).

Figure 30:
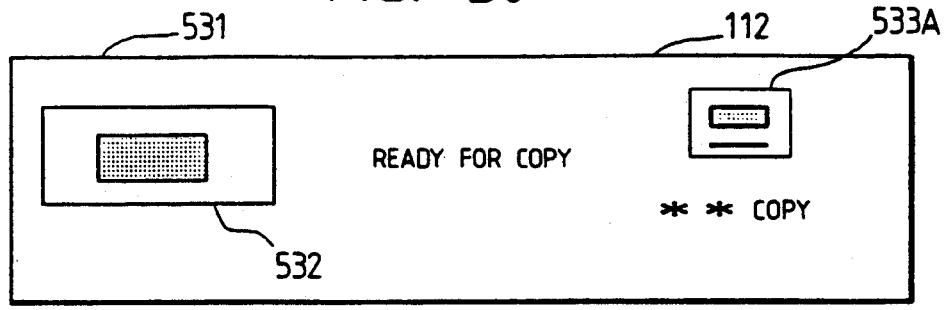
FIG. 30 is a top view illustrating an example of the display contents of a liquid crystal display in a color marking mode.

FIG. 30 shows a display on the liquid crystal display in the aforesaid state. There is shown a frame 531 representing a maximum size wherein the area of the coordinate input pad 405 shown in FIG. 18 can be designated is displayed close to the left end of the liquid crystal display 112. The position and size of the area presently applied are displayed as a designated area 532 therein. The frame 531 may be displayed as what conforms to the size of the original being applied in an alternative example.

Figure 31:
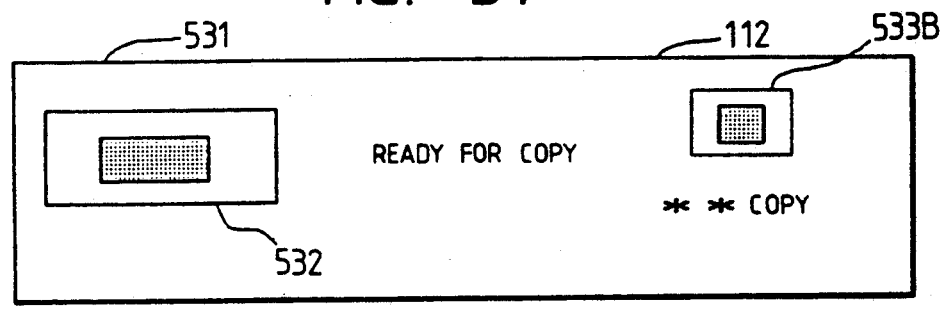
FIG. 31 is a top view illustrating an example of the display contents in an extraction mode.
Figure 32:
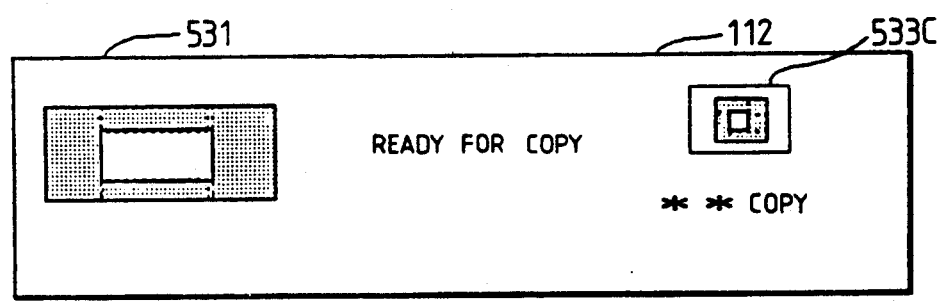
FIG. 32 is a top view illustrating an example of the display contents in a deletion mode.
Figure 33:
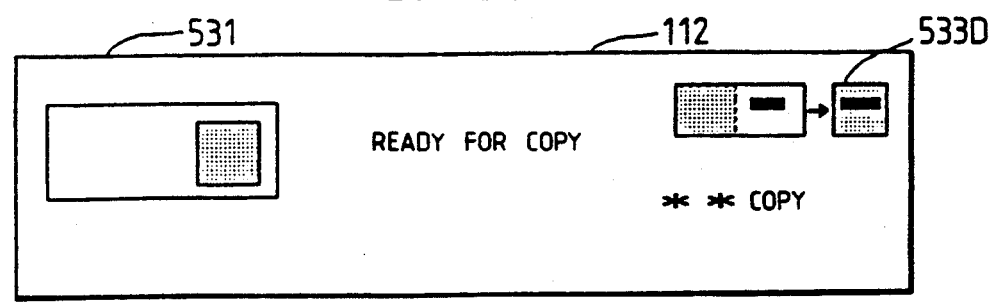
FIG. 33 is a top view illustrating an example of the display contents in a continuous color synthesizing mode.

There is incidentally shown an icon 533A in the upper right portion of the liquid crystal display 112 shown in FIG. 30. The icon 533A represents that the mode presently set is the color marking mode. FIGS. 31 to 33 show displays of the icon in other modes for reference. FIG. 31 among them shows an icon 533B in the extraction mode and FIG. 32 shows an icon 533C in the deletion mode. FIG. 33 further shows an icon 533D displayed when continuous color synthesization is made. Since a different icon 533 is thus displayed in the liquid crystal display 112 according to the presently set mode, the operator is prevented from performing operations in error.

As shown in FIG. 29, the designation of an area is to be completed if the operator presses the setting completion button 423 or the 16th input is performed at the time of area designation (Step 4, 5, Y), so that "Ready for Copy" is displayed on the liquid crystal display 112 (Step 7). The central portion in FIG. 30 represents that display.

The designation of a polygon is not necessarily limited to 16 places. The maximum number of points in the copying machine of this embodiment is 16. Accordingly, a maximum of five areas can be designated in the case of a triangle, whereas a maximum of four places can be designated when a square is employed for the polygonal designation. When the designation of one area is completed, the area setting button 421 is pressed.

In FIG. 29, while the diagonal designation lamp 426 is lit (Step 8, Y), data specifying the diagonal of the square is supplied. The data is supplied by a pen or a finger. The coordinate data thus supplied is stored in the RAM under control of the CPU 129 (Step 9) and transferred to the base machine 21 of the main CPU 121 (Step 10). The data is stored in both the storage areas of the display CPU 127 and the CPU 122 for the inter-image lamp.

Unless the operator presses the setting completion button 423 in that state (Step 11, N) and unless the designation is directed to the fifth place, i.e. the fifth area (Step 12, N), an "input figure" is displayed on the liquid crystal display 112 and the following area can be read (Step 6). When the setting completion button 423 is pressed or the fifth place is supplied (Steps 11, 12, Y), it means the designation of the area is terminated and "Ready for Copy" is display on the liquid crystal display 112 (Step 7).

Figure 34:
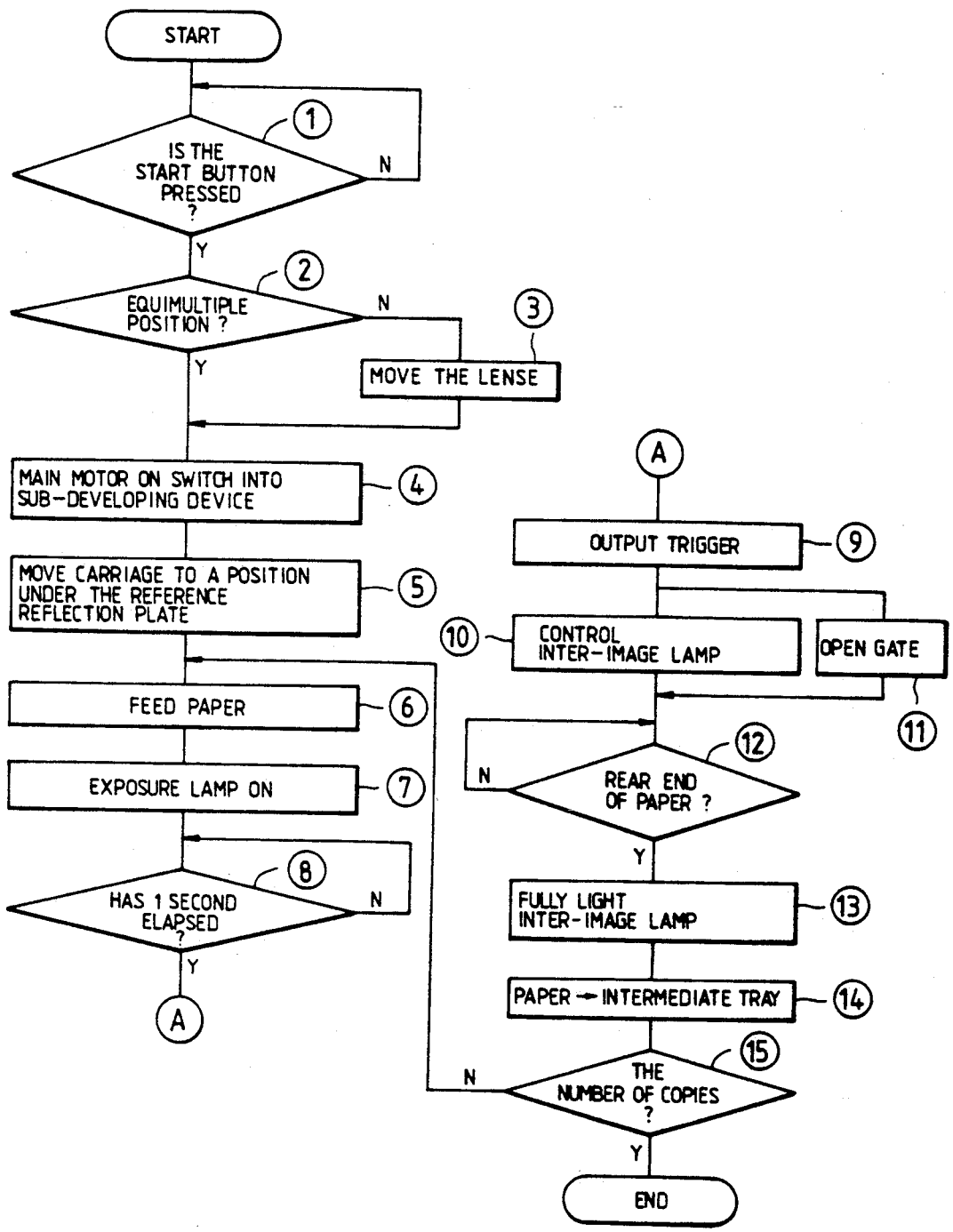
FIG. 34 is a flowchart illustrating the operation of implementing the color marking process.

FIG. 34 shows a marking operation out of the copy-making operation in the designated area.

When the start button 117 is pressed (Step 1, Y), whether the optical lens 58 is located in the equimultiple position (Step 2) is determined. If the position is not equimultiple (N), the optical lens 58 is moved to the equimultiple position (Step 3).

While the optical lens 58 is in the equimultiple position, the main motor 164 is turned on and the sub-developing device 59S is subsequently switched on (Step 4). Simultaneously, the carriage moves to a position under the reference reflection plate and stops thereat (Step 5). The feeding of copying paper 60 is also started being fed (Step 5). The exposure lamp 56 is turned on in that state (Step 7). The target quantity of light then is 50% of the equimultiple quantity during the normal copymaking operation. As already described, this operation is intended to adjust the copy density of the marking portion by means of the sub-developing device 59S to the range of 0.6 to 1.2, preferably 0.5 to 0.6 in terms of the optical density.

When one second has elapsed after exposure lamp 56 is lit (Step 8), a trigger for driving the inter-image lamp 141 is outputted (Step 9). Data corresponding to the figure thus supplied are read out one line after another and the on/off control of inter-image lamp 141 is a performed by the inter-image lamp CPU 122 (Step 10). When something other than equimultiplication is designated, the inter-image lamp CPU 122 changes the multiplication in the designated area to another after contraction/magnification ratio conversion and controls the on/off switching of the inter-image lamp 141 corresponding to the area thus changed.

In the tray control CPU 128, the gate (registration gate) for letting the copying paper that has been stopped temporarily in the midway start moving is opened (Step 11).

After the light-emitting element is subjected to on/off control with respect to the area thus designated, the CPU determines whether the inter-image lamp 141 has reached the position corresponding to the rear end of the copying paper 60 (Step 12). When the inter-image lamp 141 is seen to have reached the rear end, it is controlled so that it is fully lit (Step 13). After fixation the copying paper 60 is delivered onto the intermediate tray 33 (Step 14). The above-described operation is repeated the number of times equivalent to the number of copies (Steps 6 to 15).

Figure 35:
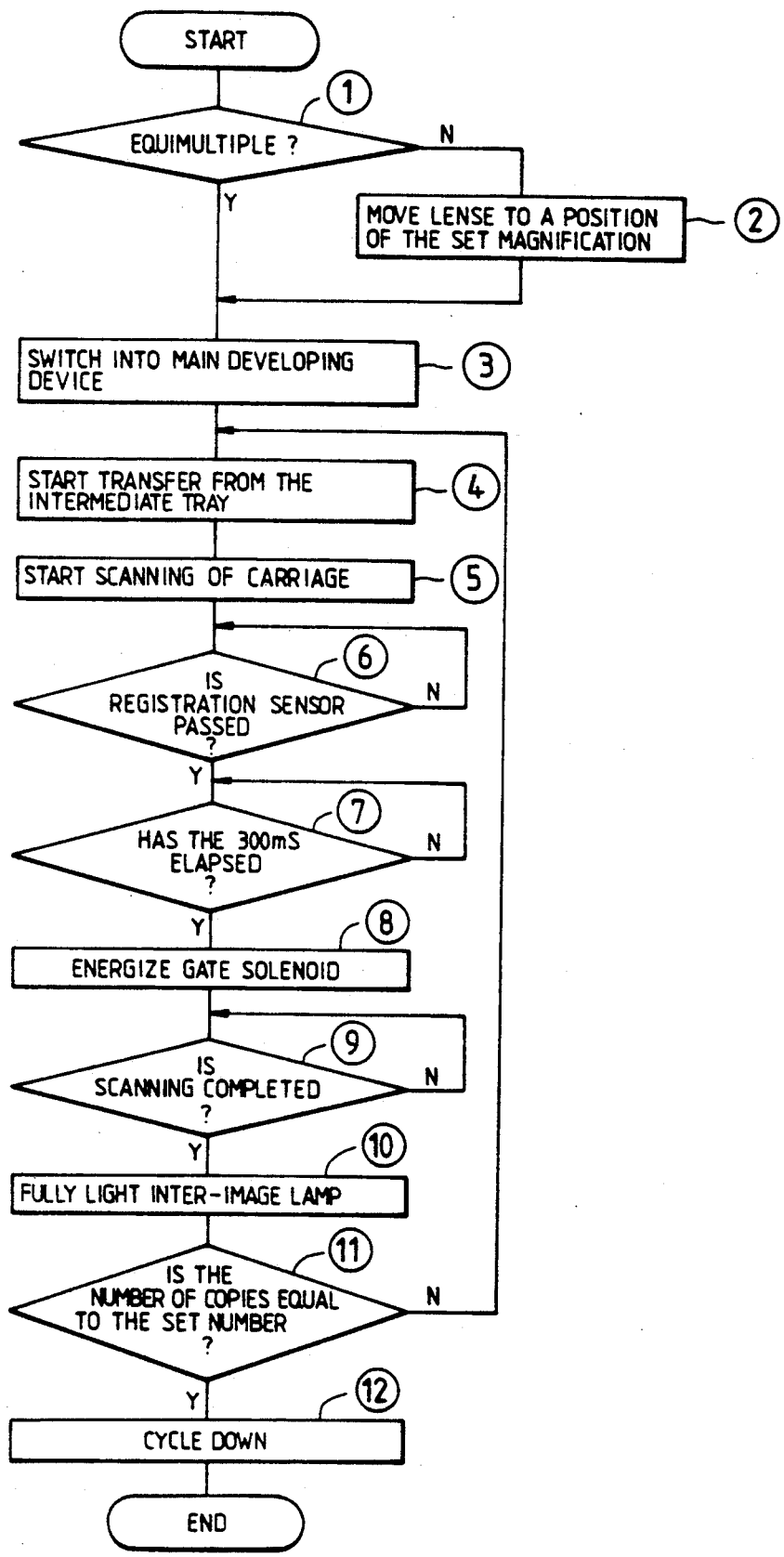
FIG. 35 is a flowchart illustrating the subsequent control of copying paper accommodated on the intermediate tray to implement the color marking process.

FIG. 35 is a flowchart illustrating the subsequent control of copying paper accommodated on the intermediate tray 33 to implement the color marking process.

The main CPU 121 has normal copy-making operation performed with a black developing agent for copying paper given a marking. At this time, the main CPU 121 determines whether the magnification presently set and displayed on the magnification display 99 on the console panel 28 is equimultiple, i.e., 100% (Step 1). If it is not equimultiple (N), the main CPU has the optical lens 58 move up to the position corresponding to the magnification set (Step 2). When the position of the optical lens 59 is fixed, the sub-developing device 59S is switched to the main developing device 59M (Step 3). The feeding of the copying paper 60 from the intermediate tray 33 is then started (Step 4). The scanning of the carriage for exposing the original 401 is also started (Step 5).

The main CPU 121 in this state keeps monitoring the time at which an actuator (not shown) is detected by the registration sensor 172 to detect the exposure position of the exposure lamp 56 (Step 6). The gate solenoid 237 is energized (Step 8) 300 ms (millisecond) after the aforesaid detection is effected by the registration sensor 172 (Step 7) and the conveyance of the copying paper 60 remaining stationary with its front end pinned down by a gate (not shown) is started. This step is intended to eliminate a timing error at which the copying paper 60 is fed out of the intermediate tray 33 and to effect the registration of the electrostatic latent image and the copying paper 60 on the photoreceptor drum 51.

The scanning of the original by means of the carriage is conducted up to the length of the original in the direction in which the carriage is fed. When the scanning of the carriage is completed (Step 9, Y), it is unnecessary to form an electrostatic latent image longer than the length on the photoreceptor drum 51. Accordingly, the inter-image lamp 141 is lit in the whole breadth direction to prevent the formation of an unnecessary toner image (Step 10).

When the copy-making operation equivalent to one copy is completed, the main CPU 121 determines whether the number of copies conforms to the set number of copies (Step 11). If the former and the latter conform to each other, cycle down, i.e., work for terminating the copy-making operation, is performed (Step 12), and the copy-making operation through the color marking process is terminated. If the former and the latter do not conform to each other (N), the same operation is repeated until they conform to each other (Steps 4 to 11), so that the desired number of copies is obtained.

Figure 36:
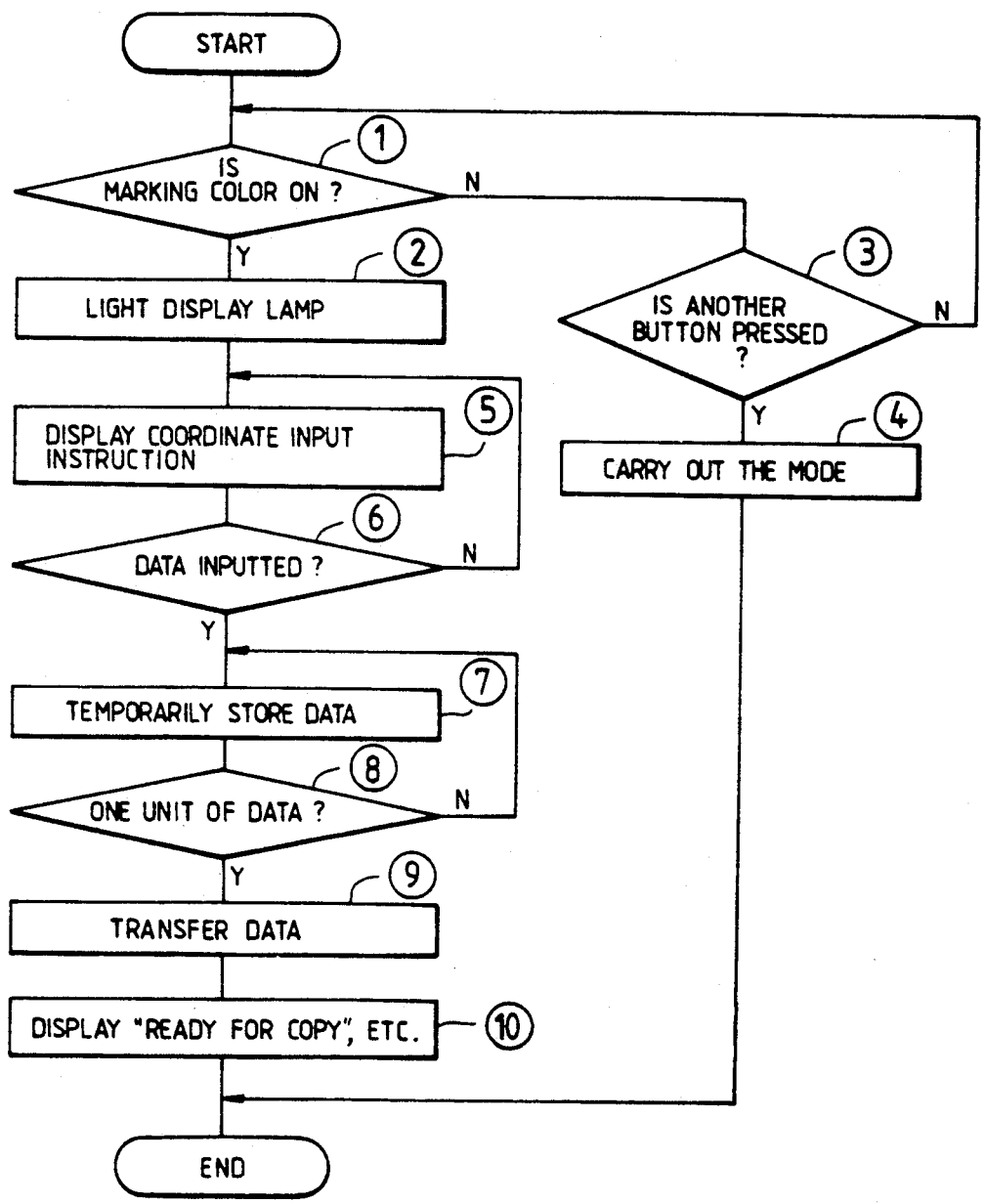
FIG. 36 is a flowchart illustrating a coordinate input means of ten keys.

FIG. 36 is a flowchart illustrating a coordinate input through ten keys 80.

Even in the case of the copying machine thus constructed in this embodiment, a coordinate data input for the designation of an area and its modification can be made with the ten keys 80. When a marking area is designated as shown in FIG. 36, the main CPU 121 monitors whether the operator presses the color marking switch 88 on the console panel 28. When the color marking switch 88 is pressed (Step 1, Y), the main CPU 121 makes the corresponding display lamp 82 light, whereby the color marking mode is established (Step 2). If another button or switch is pressed (Step 3), the mode corresponding to the operation of the button or switch is performed (Step 4).

When the color marking mode inputted by the ten keys 80 is set, the CPU 121 displays coordinate input instructions given to the liquid crystal display 112 (Step 5). This display is made with *Kanjis*. The display CPU 127 is employed to control the display.

Figure 37:
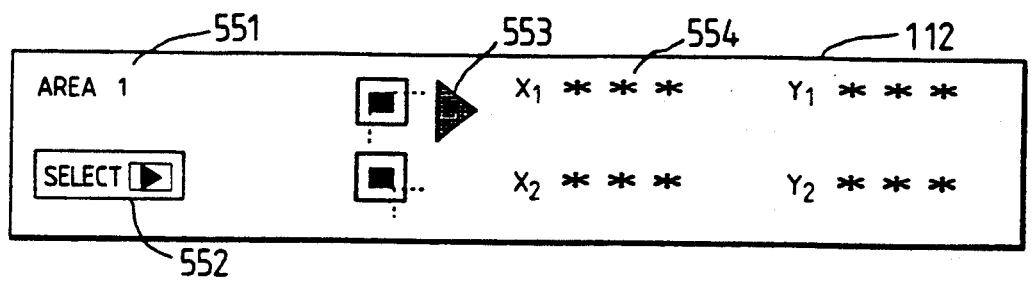
FIG. 37 is a top view illustrating the display contents in the initial state of the liquid crystal display when an "area 1" is specified.

FIG. 37 is a diagram illustrating the initial state of the display. As the contents of the area to be designated, characters 551 reading an "area 1" are displayed on the liquid crystal display 12. A selection display mark 552 for having the area selected is displayed thereunder. The selection display mark 552 flickers in that state. In the right half of the liquid crystal display 112 are coordinates ($X_1$, $Y_1$), ($X_2$, $Y_2$) for designating the rectangular "area 1" with two points on both sides of a diagonal line and, an instruction mark 553 and an uninput "*" mark 554 are caused to flicker so as to input the coordinate data $X_1$.

Figure 38:
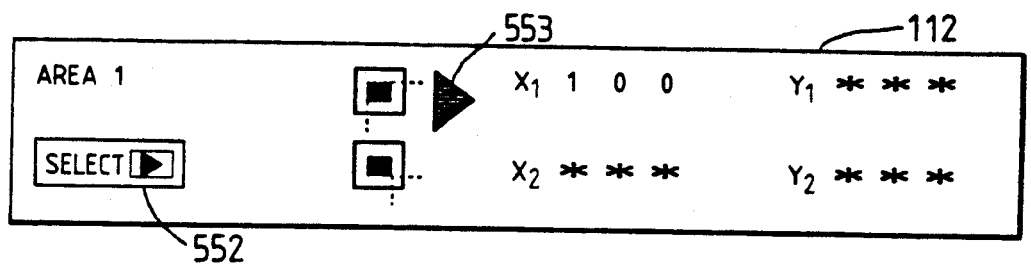
FIG. 38 is a top view illustrating the display contents of the liquid crystal display when coordinate data ($X_1$) is applied with respect to the "area 1"

The operator uses the ten keys 80 (FIG. 5) to input the coordinate data ($X_1$) for designating the area according to the contents of the display. FIG. 38 shows an example in which a numerical value of 100 as the coordinate data ($X_1$) is applied. When the operator presses the selection key 118 after the application of the coordinate data ($X_1$), the display mark 553 moves to that place and flickers to have the coordinate data ($Y_1$) supplied. The operator presses the selection key 118 after the application of the coordinate data ($Y_1$) and supplies the numerical values of the coordinates ($X_2$, $Y_2$) in order.

Figure 39:
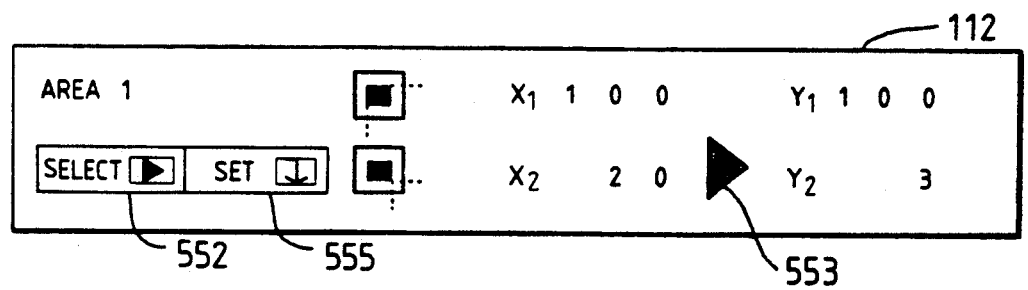
FIG. 39 is a top view illustrating the display contents of the liquid crystal display when the whole coordinate data is applied with respect to the "area 1"

FIG. 39 is a diagram illustrating the state in which a numerical value "20" as the coordinate data ($X_2$) and "3" as the coordinate data ($Y_2$) are supplied. The data sufficient to designate the rectangular "area 1" is supplied, a setting mark 555 adjacent to the selection display mark 552 of the liquid crystal display is caused to flicker as shown in FIG. 39. If the set key 119 shown in FIG. 5 is pressed, the designation of the "area 1" is completed.

Figure 40:
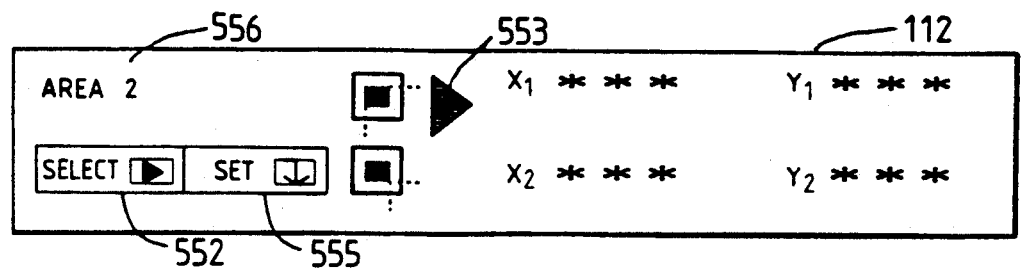
FIG. 40 is a top view illustrating the display contents of the liquid crystal display when an "area 2" can be applied.

As shown in FIG. 40, then, characters 556 for having an "area 2" designated are displayed on the liquid crystal display 112. The setting mark 555 is flickering at this point of time. The operator is allowed to supply data regarding the "area 2" in this state or, if the operator does not designate more than the area, to terminate the designation of areas. The operator presses the set key 119 then to terminate the designation of areas.

Referring to FIG. 36 again, the main CPU 121 has the data for area designation temporarily stored when it is supplied from the ten keys 80. When one unit of processable data is collected (Step 8, Y of FIG. 36), the CPU transfers the data to the memory of the inter-image lamp CPU 122 (Step 9). Subsequently, "Input Figure" in Step 6 of FIG. 29 or "Ready for Copy" in Step 7 of FIG. 29 is displayed (see FIG. 30) (Step 10).

(5-4) Outline of Color Density Adjustment

In the color marking apparatus of this embodiment, copy density adjustment in connection with the sub-developing device 59S separately from the main developing device 59M is possible. It depends on the display on the monochromatic color contrasting panel 76 shown in FIG. 5 which one of the color densities of the developing devices 59M, 59S is adjusted when the color marking mode has been selected. The adjustment is made as follows:

(i) While the display lamp 82 corresponding to the monochromatic color switch 91 is turned off, the adjustment of the copy density of the main developing device 59M, i.e., that of the monochromatic density expressing image data on the original is made. In this case, the adjustment value of the copy density ranges $a_1 \sim a_5$. The adjustment value $a_1$ is equivalent to the lowest (lightest) copy density among five stages of them on the copy density panel 77 (FIG. 5), whereas $a_5$ is equivalent to the highest (thickest) copy density. The adjustment value $a_3$ is equal to a normal copy density. The adjustment values $a_1 \sim a_5$ of the monochromatic density should preferably be $1.2 \sim 1.7$. The central adjustment value $a_3$ at this time should preferably be 1.5.

(ii) While the display lamp 82 corresponding to the monochromatic color switch 91 is turned on and while the display lamp 82 corresponding to the color marking switch 88 is turn off, the density regarding the sub-developing device 59S is adjusted. The adjustment value of the copy density in this case (a flat color adjustment value) ranges from $b_1 \sim b_5$.

The flat color adjustment value $b_1$ is equivalent to the lowest (lightest) copy density among five stages of them on the copy density panel 77 (FIG. 5), whereas the flat color adjustment value $b_5$ is the highest (thickest) copy density. The flat color adjustment value $b_3$ is equal to a normal copy density.

Even if the automatic density adjusting switch 97 (FIG. 5) is pressed in this density adjusting mode, the copy density of the color sub-developing device 59S is not automatically adjusted and the flat color adjustment value becomes $b_3$ (normal copy density) in this case.

The flat color adjustment values $b_1 \sim b_5$ should preferably be $0.9 \sim 1.4$, provided the developing agent is green or blue in color. The central adjustment value $b_3$ becomes 1.2 at this time. When the developing agent is red or brown, moreover, the flat color adjustment values b1~b5 should preferably be $0.7 \sim 1.2$. In case of the latter, the adjustment value $b_3$ becomes 1.0.

(iii) While both the display lamps 82 corresponding to the monochromatic color switch 91 and the color marking switch 88 are turned on, the density in connection with the sub-developing device 59S is adjusted. The adjustment value of the copy density in this case ranges $c_1 \sim c_5$, which are the values (marking color adjustment values) set differently from the flat color adjustment values. The reason for this is that it is more convenient to define the copy density differently in accordance with the kind of the developing agent. The copy density is not automatically adjusted by the operation of the automatic density adjusting switch 97 even in this mode and the marking color adjustment value becomes $c_3$ (normal copy density) when the automatic density adjusting switch 97 is pressed.

The marking color adjustment values $c_1$~$c_5$ should preferably be 0.8~1.2 when the developing agent is green or blue. The central adjustment value $c_3$ becomes 0.1 at this time. When the developing agent is red or brown, moreover, the marking color adjustment values $c_1$~$c_5$ should preferably be 0.6~1.0. The adjustment value $c_3$ in the case of the latter becomes 0.8.

The above-shown adjustment values $a_1$~$a_5$, $b_1$~$b_5$, and $c_1$~$c_5$ have been written to the nonvolatile memory 121F (FIG. 7). These central adjustment values $a_3$, $b_3$, $c_3$, are automatically initially selected when power is supplied to the copying machine and changed, if necessary, by the operator.

The alteration of the adjustment values $a_1$~$a_5$, $b_1$~$b_5$, and $c_1$~$c_5$ themselves or the ranges of such values, e.g., the alteration of the range of 300~500 V for the developing bias to 200~400 V may be required in some cases. This alteration can be effected by making use of the self-diagnosis mode of the copying machine. In this case, the copying machine is set in the self-diagnosis mode which is different from the copy-making mode when the power is supplied, and it is subsequently set in the density adjusting mode by the special operation thereof. Then, the ten keys 80, for instance, are used to change the adjustment values $a_1$~$a_5$, $b_1$~$b_5$, and $c_1$~$c_5$ themselves.

The alteration and selection of the adjustment values $a_1$~$a_5$, $b_1$~$b_5$, and $c_1$~$c_5$ should preferably be made properly in accordance with the kind of the original and the like. Consequently, a code number is attached to each original, so that the copy density is automatically set simultaneously with the setting of the button for each type of copy-making operation at the point of time the IC card 131 is inserted in the IC card device 22.

(5-5) Color Density Adjusting Operation

The steps of adjusting the color density will subsequently be described in order.

(i) Referring to FIG. 41, a description will be given of a case where the operator presses the color marking switch 88.

If the display lamp 82 corresponding to the color marking switch 88 is turned on (Step 1, Y), it is turned off when the color marking switch 88 is pressed, (Step 2). In this case, the display CPU 127 causes the copy density lamp set relative to the main developing device 59M to light (Step 3) the display lamps 82 of five stages on the copy density panel 77 shown in FIG. 5. In this case, the color marking mode is canceled (Step 4) since this operation is to release the color marking mode set once.

If the display lamp 82 is turned off (Step 1, N) when the color marking switch 88 is pressed, the light is turned on (Step 5) since this operation is to set the color marking mode. The display CPU 127 checks whether the display lamp 82 corresponding to the monochromatic switch 91 is held on (Step 6). When it is held on (Y), one of the display lamps 82 of five stages on the copy density panel 77 is selected in accordance with the marking color density adjustment value and turned on (Step 7). Then the input operation in the color marking mode is accepted (Step 8). When the display lamp 82 corresponding to the monochromatic switch 91 is held off in Step 6, the operation immediately proceeds to Step 8.

Figure 41:
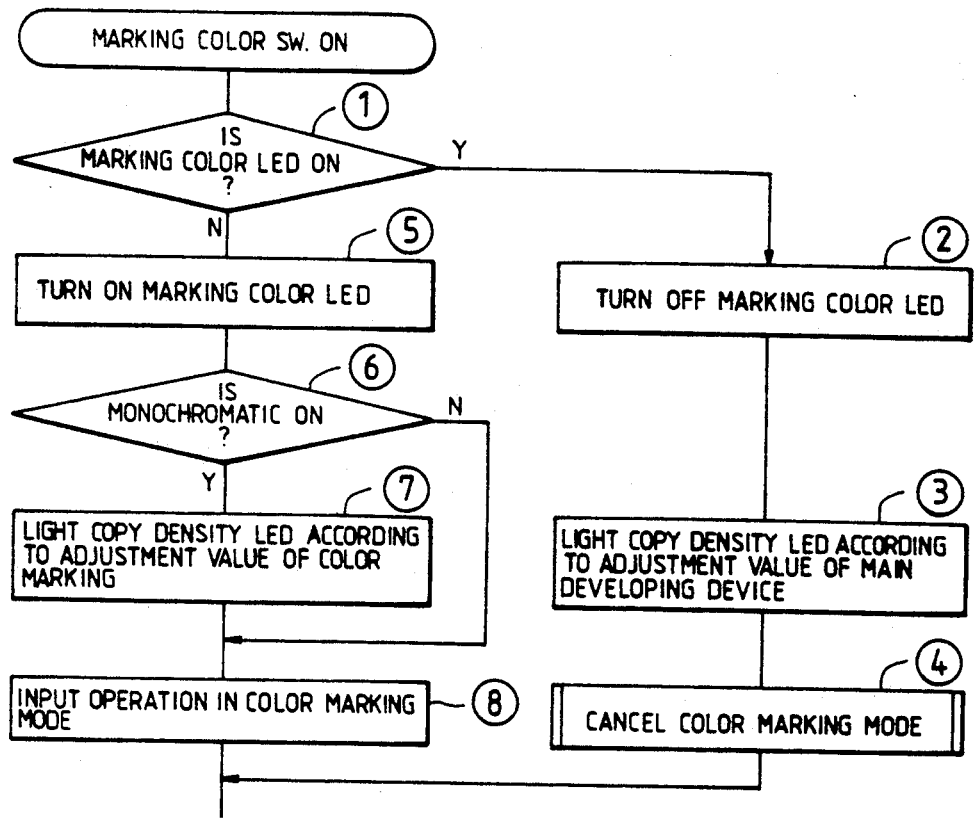
FIG. 41 is a flowchart illustrating control operation when a color marking switch is pressed.

If the operator presses the color marking switch 88, the monochromatic or color copy density set at this point of time is displayed as shown in FIG. 41.

(ii) When the color marking process is performed, the operator completes the input operation for marking in Step 8 of FIG. 41.

Figure 42:
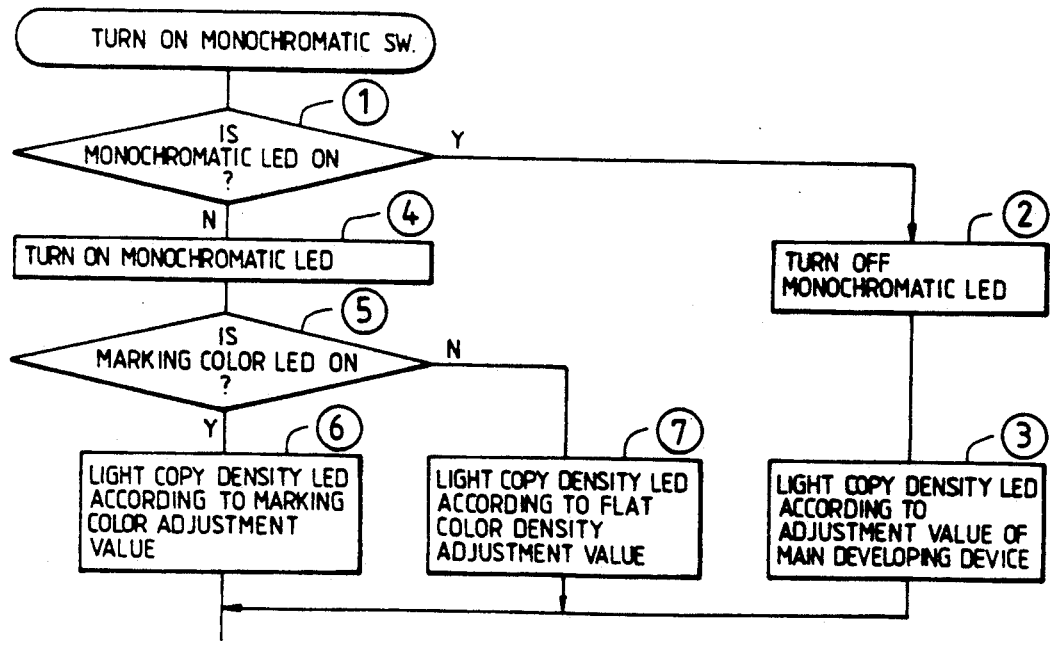
FIG. 42 is a flowchart illustrating control operation when a monochromatic switch is pressed.

(iii) FIG. 42 is a flowchart illustrating a case where the monochromatic switch 91 is pressed.

If the corresponding display lamp 82 is held on (Step 1, Y) when the monochromatic switch 91 is pressed in FIG. 42, the display lamp 82 is turned off (Step 2), and the display CPU 127 lights the copy density lamp set relative to the main developing device 59M among the display lamps 82 of five stages on the copy density panel 77 shown in FIG. 5 (Step 3).

If the corresponding display lamp 82 is held off (Step 1, N) when the monochromatic switch 91 is pressed, the display lamp 82 is turned on (Step 4). In this case, judgment is made on whether the display lamp 82 corresponding to the color marking switch 88 is held on (Step 5) and, if it is held on (Y), one of the display lamps 82 of five stages on the copy density panel 77 is selected according to the marking color adjustment values $c_1$~$c_5$ and turned on (Step 6). When the display lamp 82 corresponding to the color marking switch 88 is held off (N), one of the display lamps 82 of five stages on the copy density panel 77 is selected according to the flat color density adjustment values $b_1$~$b_5$ and is turned on (Step 7).

(iv) The operator confirms the copy density through the operations shown in FIGS. 41 or 42 while performing the color marking process and changes the copy density as the occasion arises.

FIG. 43 is a flowchart illustrating the proceedings for changing the copy density.

When the operator presses the two shift keys 94, 95 (copy density keys) on the copy density panel 77, the on-position of the five display lamps 82 for displaying the copy density changes (Step 1). When the upper shift key 94 shown in FIG. 5 is pressed, the density setting is effected toward lowering the copy density, whereas it is effected toward heightening the copy density when the lower shift key 95 is pressed.

If the display lamp 82 corresponding to the monochromatic switch 91 is held on at this point of time (Step 2, Y) and if the display lamp 82 corresponding to the color marking switch 88 is also held on (Step 3, Y), the marking color adjustment values $c_1$~$c_5$ are changed (Step 4). If the display lamp 82 corresponding to the color marking switch 88 is held off (Step 3, N), the flat color adjustment values $b_1$~$b_5$ are changed.

If the display lamp 82 corresponding to the monochromatic switch 91 is held off (Step 2, N), on the other hand, the copy density adjustment values $a_1$~$a_5$ of the main developing device 59M are changed (Step 6).

(v) Subsequently, the start button 117 (FIG. 5) is pressed so that the copy-making operation is started. When the sub-developing device 59S is used for developing, the developing bias is adjusted according to the flat color adjustment values $b_1$~$b_5$ or marking color adjustment values $c_1$~$c_5$, whereas the developing bias is adjusted according to the adjustment values alias when the main developing device 59M is used for the purpose.

FIG. 44 is a flowchart illustrating the control operation.

More specifically, the main CPU 121 determines whether the sub-developing device 59S is used for developing (Step 1) and, when the developing device 59S is used, further determines whether the display lamp 82 corresponding to the color marking switch 88 is turned on (Step 2). When it is held on (Y), the bias voltage is set according to the marking color adjustment values $c_1$–$c_5$ (Step 3). The bias voltage value is read out of a ROM (Read Only Memory) table (not shown).

When the display lamp 82 corresponding to the color marking switch 88 is held off (Step 2, N), on the other hand, the bias voltage is set according to the flat color adjustment values $b_1$–$b_5$ (Step 4). These values are also read from the aforesaid ROM.

When the main developing device 59M, in place of the sub-developing device 59S, is used for developing (Step 1, N) the buffer employing voltage is set according to the copy density adjustment values $a_1$–$a_5$ of the main developing device 59M (Step 5).

As set forth above, the desired copy densities are set for developing purposes in both the sub- and main developing devices 59S, 59M, respectively.

(5-6) Color Display Control

Although a color display is employed for the liquid crystal display 112 in the copying machine of this embodiment, characters and symbols (simply called letters) are used for color display on the monochromatic or light color display. There is no problem if these letters are displayed within the area in this case. However, they are to be displayed outside the are if it is small. A similar problem will be posed in the case of displaying the number of the area.

Figure 45:
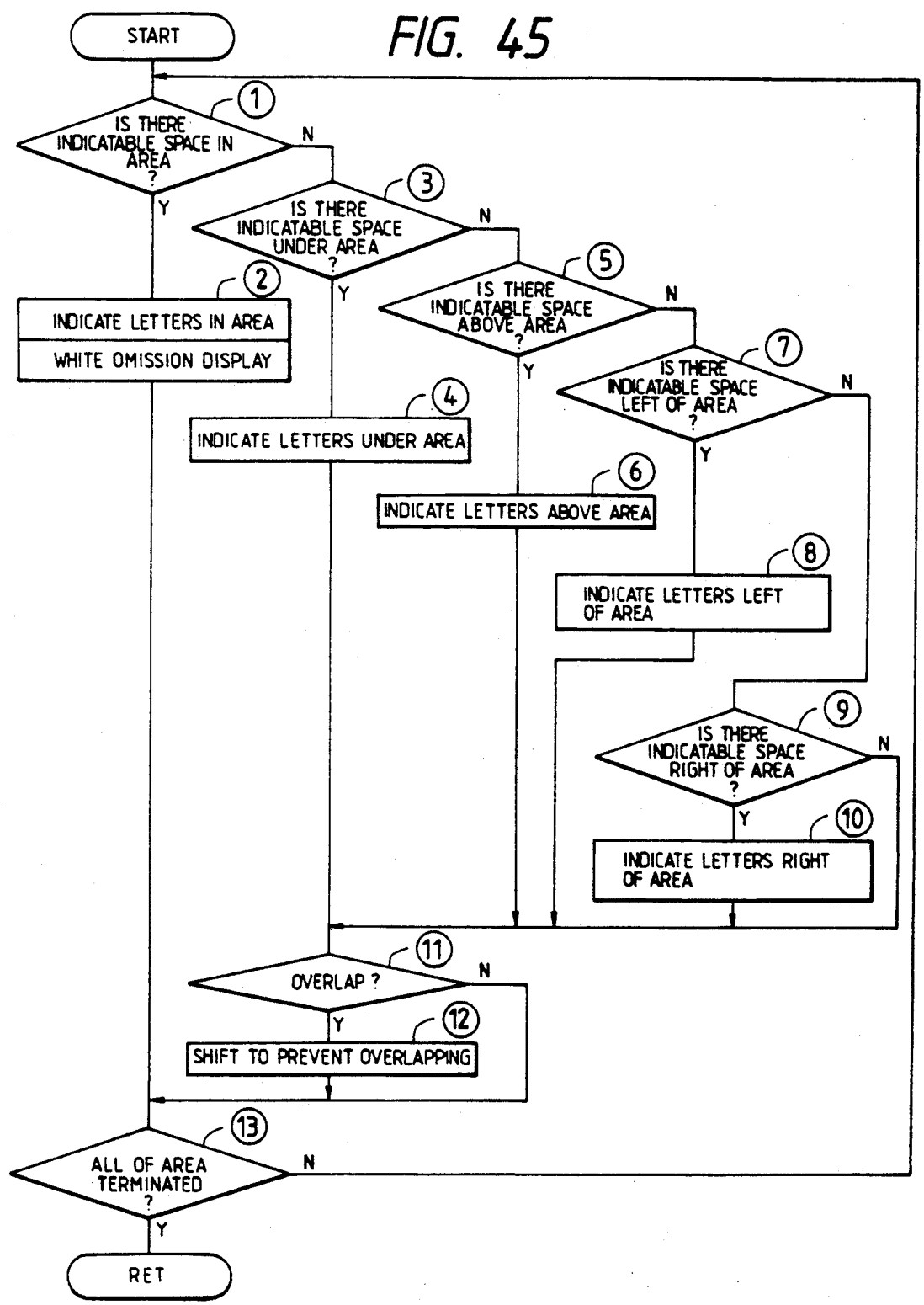
FIG. 45 is a flowchart illustrating color display control areas.

FIG. 45 is a flowchart illustrating an example of such control applicable to color display. In other words, provided a space is large enough to accommodate letters in the first area (Step 1), the letters are contained in the area before being displayed. White-omission display is made at this time (Step 2). In case the space is not large enough to accommodate the letters (Step 1, N), whether there is a space for containing the letters under the area is determined (Step 3). If there is such a space, the letters are displayed therein (Step 4). If there is no such space, whether there is a space above the area is determined (Step 5). If there is space, the letters are displayed therein (Step 6). If there is no such space, whether there is a space to the left of the area is determined (Step 7). If there is space, the letters are displayed therein (Step 8). If there is no such space, whether there is a space to the right of the area is determined (Step 9). If there is space, the letters are displayed therein (Step 10).

When letters are displayed outside the area, the letters may overlap one another. If the letters overlap one another (Step 11), they are shifted from each other by shifting the display portions thereof so as to prevent overlapping (Step 12). When the display position is thus decided, a letter display position 5 is determined for the following area (Step 13, N).

When the position of the letters is determined for each area (Y), this operation is terminated.

When a number representing an area and another designating a color both are displayed, control of displaying letters is possible with an operation similar to what is shown in FIG. 45.

Figure 46:
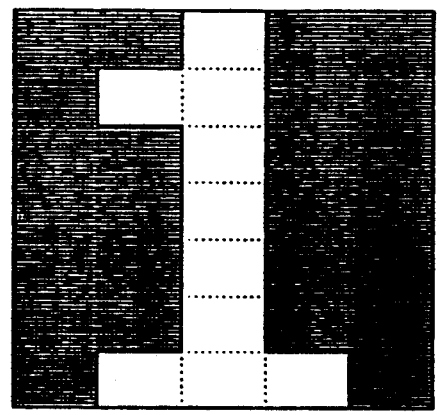
FIG. 46 is a diagram illustrating an example of a number display pattern indicating an area.
Figure 47:
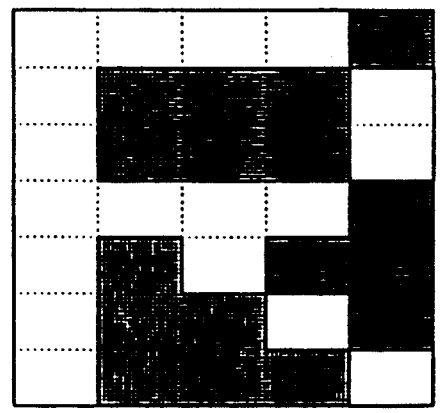
FIG. 47 is a diagram illustrating an example of a color display pattern.

FIG. 46 is a diagram illustrating an example of a number display pattern when "1" representing an area is displayed within the area. In this case, white-omission display is made. On the other hand, FIG. 47 is a diagram illustrating an example of a color display pattern when an alphabet "R" designating a red area is displayed with white-omission.

(6) MODIFICATION OF INPUT DATA

(6-1) Modification of Coordinates

As set forth above, the editor pad 132 or ten keys 80 may be used to input coordinates for designating a figure such as a rectangle. As occasion demands, the IC card can be used to input coordinate data that has been prepared. The coordinate data thus supplied once should preferably be made changeable properly by changing the contents of an original or as the result of examining its position on a copy.

Figure 48:
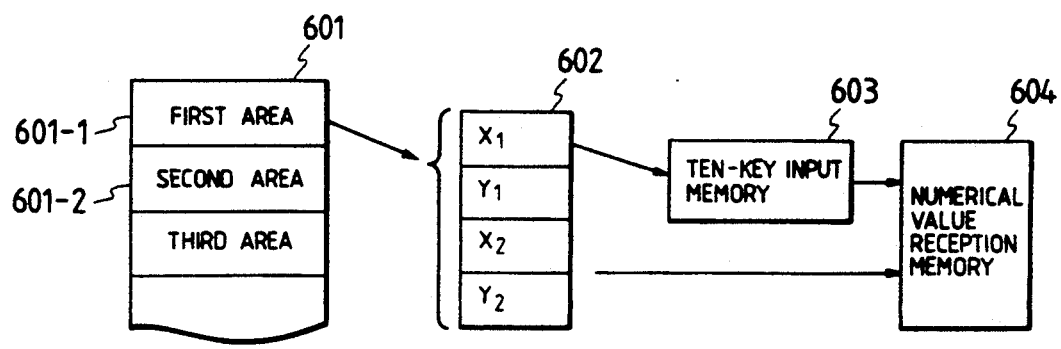
FIG. 48 is a diagram illustrating a memory area for use in modifying coordinate data.

FIG. 48 is a configuration of a circuit for storing and modifying coordinates. The RAM 121 under control of the main CPU 121 shown in 7 is divided into storage areas as shown in FIG. 48: a storage memory 601, a modification memory 602, a ten-key input memory 603, a numerical value reception memory 604, etc.

Coordinate data supplied through the ten keys is classified and stored on an area basis in the full coordinate storage memory 601. When the coordinate data in the first area is modified, for instance, the coordinate data 601-1 is transferred to the modification memory 602 and stored therein. When an area being modified is a rectangular area specified by both ends of its diagonal line, the coordinate data contains data of two points $(X_1, Y_1)$, $(X_2, Y_2)$. The coordinate data is sent to the numerical value reception memory 604 of the display CPU 127 (FIG. 6) and the coordinate data prior to modification is displayed in the form of a numerical value in the liquid crystal display 112 (FIG. 5, etc.).

The main CPU 121 reads the coordinate data specified by the cursor 553 (FIG. 36) in this state from the modification memory 601 and stores it in the ten-key input memory 603. The coordinate data $X_1$ is read at the first stage and stored in the ten-key input memory 603.

The operator operates the ten keys 603 in this state and modifies the coordinate data $X_1$ in a desired form. After the modification is made in this manner, the contents of the ten-key input memory 603 are changed to those modified. When the modification is completed or otherwise the contents of what has been displayed are not changed, the operator presses the selection key 118 (FIG. 5) on the console panel 28 and moves the cursor 553 to the position of the next coordinate data. The main CPU 121 returns the coordinate data stored in the ten-key input memory 603 at this point of time to the original position of the modification memory 602 and rewrites the contents. In this case, the old coordinate data Xis replaced with new coordinate data $X_1$. After the contents of the ten-key input memory 603 is thus transferred to the modification memory 602, the coordinate data (coordinate data $Y_1$ in this case) of the position newly specified by the ten keys 603 is read out and stored in the ten-key input memory 603.

Upon completion of the operation of modifying the coordinate data in the above-described manner, the operator presses the set key 119. At the point in time when the set key 119 is pressed, the main CPU 121 returns the coordinate data stored in the ten-key input memory 603 to the original position of the modification memory 602 to have the contents 7 thereof rewritten. Then the coordinate data $(X_1, Y_1)$, $(X_2, Y_2)$ stored in the modification memory 602 is stored in the area corresponding to the full coordinate storage memory 601 as modified data, and the contents are rewritten.

Subsequently, the main CPU 121 replaces the area for modification by one place and starts performing a similar operation. As the coordinate data in the first area has been completed, coordinate data 601-2 in the second area is read and stored in the modification memory 602. This operation is repeated likewise in order that the modifying operation is continued.

Figure 49:
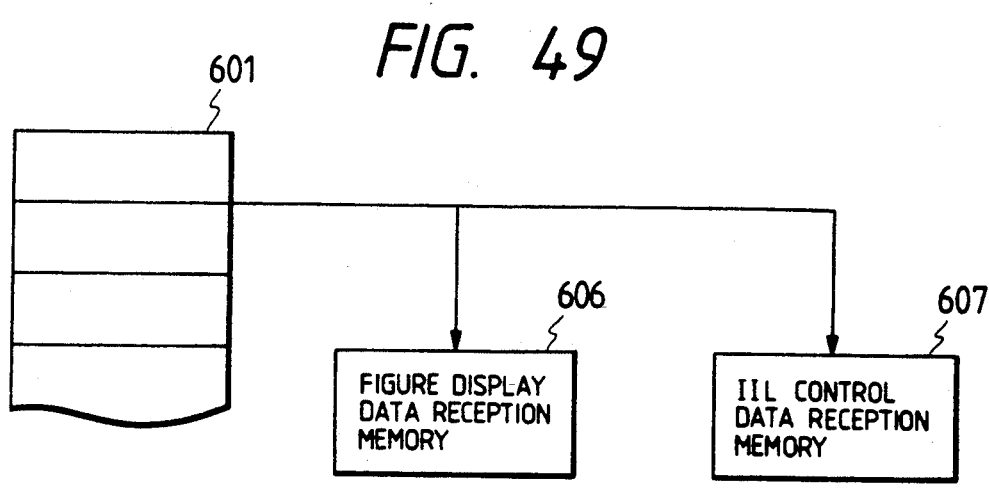
FIG. 49 is a diagram illustrating the proceeding of conveyance of the coordinate data modified.

When the operation of modifying the area is completed in that manner, the coordinate data stored in the full coordinate storage memory 601 is read as shown in FIG. 49 and transmitted to a figure display data reception memory 606 and an IIL control data reception memory 607. The transmission at this time is carried out in such a manner that the normal time sharing multiplex transmission system on the transmission lines connecting the display CPU 127, the inter-image lamp CPU 122, and the main CPU 121 are excluded. In order words, these transmission lines are temporarily monopolized by the main CPU 121 and the display CPU 127 or inter-image lamp CPU 122, whereas the data is transmitted under the large capacity transmission system. When the transfer of the coordinate data is thus completed, "Ready for Copy" is displayed on the liquid crystal display 112 again and the marking process can be conducted with the modified coordinate data.

The coordinate data stored in the figure display data reception memory 606 by the large capacity transmission is developed into figure data to be displayed under control of the display CPU 127, whereby the figure is displayed on the liquid crystal display 112. Moreover, the coordinate data stored in the IIL (Inter-Image Lamp) control data reception memory 607 by the large capacity transmission is developed into figure data to be displayed under control of the inter-image lamp CPU 122. The figure data is successively read line after line when the copy-making operation is started, and the flickering of the inter-image lamp 141 is correspondingly controlled.

Figure 50B:
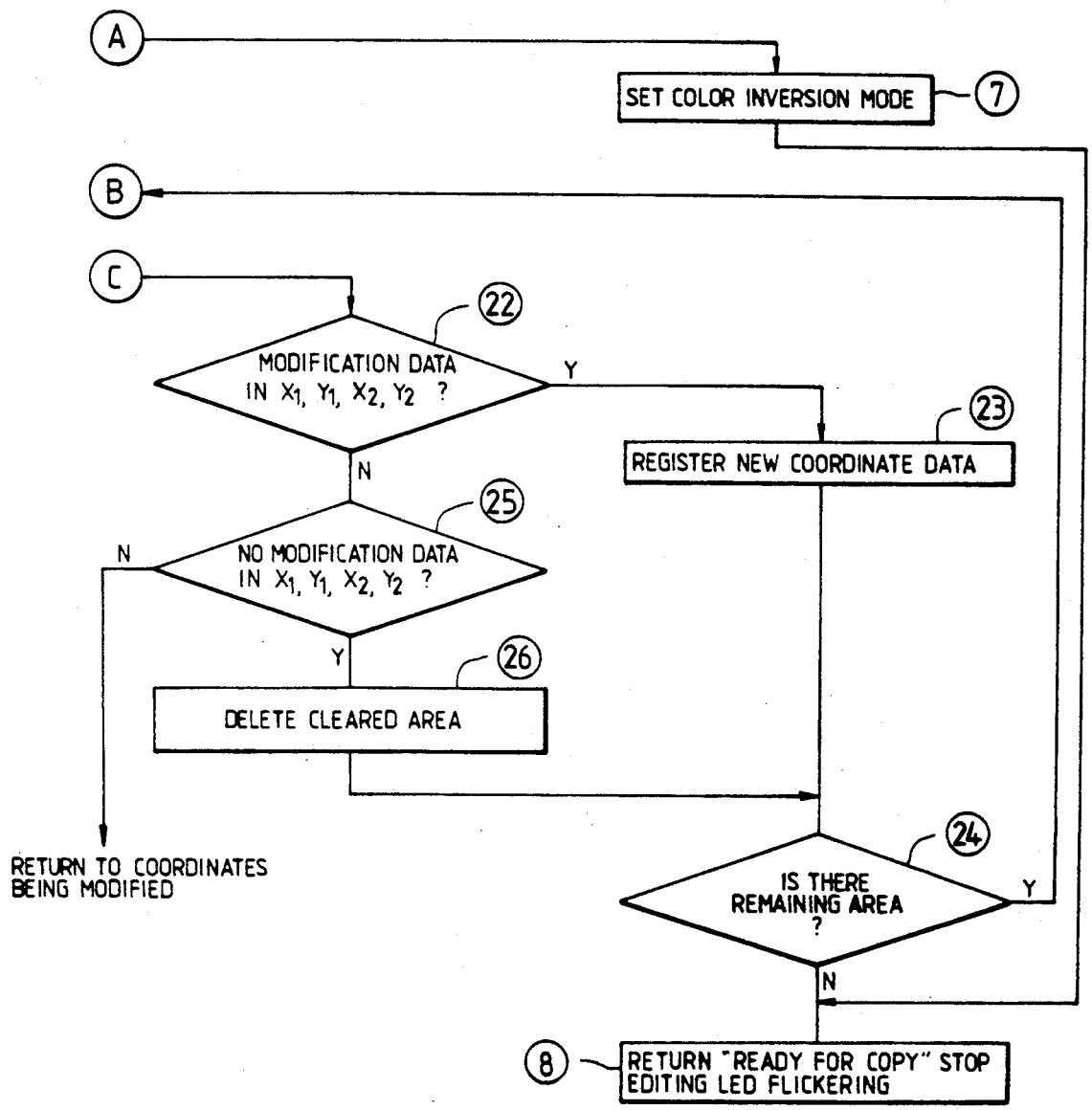

FIG. 50 is a flowchart illustrating the proceeding of the operation of modifying the coordinate data.

Figure 51:
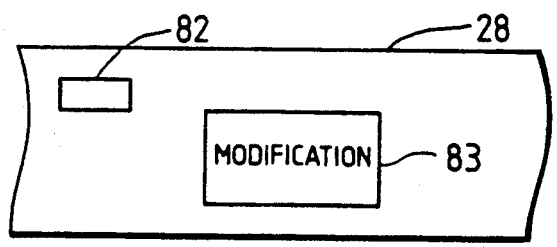
FIG. 51 is a top view of the principal part of the console panel.
Figure 52:
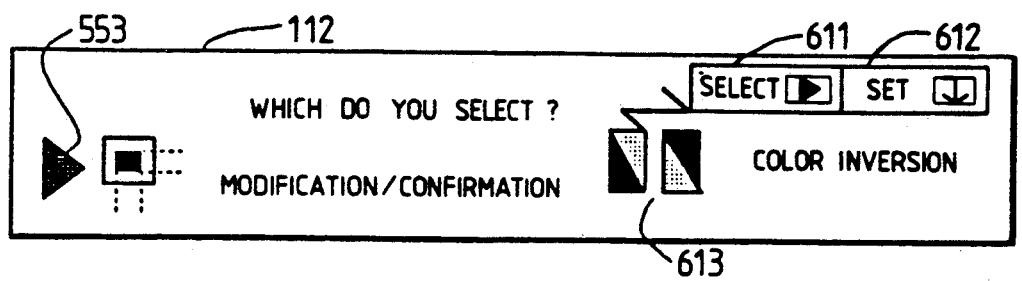
FIG. 52 is a top view of an example of a menu display of the liquid crystal display.

When the coordinates are modified, the operator presses the modification/confirmation switch arranged on the console panel 28 as shown in FIG. 51 (Step 1 of FIG. 50). The display lamp 82 for displaying editing condition which is disposed close thereto starts flickering. As shown in FIG. 52, then, a selection menu is displayed on the liquid crystal display (Step 2). Letters designating two "coordinate modification" and "color inversion" operation modes, the cursor 553 and a group of icons 611~613 indicating selection, setting, etc., are displayed in the selection menu.

Each time the operator presses the selection key 118 in that state of display, the cursor 553 is controlled so that its position is shifted (Step 4). Simultaneously, the main CPU 121 monitors whether the set key 119 is pressed (Step 5) and, when the set key 119 is pressed while the cursor is located on the letters of coordinate modification (Step 6, Y), sets the copying machine to the coordinate alteration mode. If the set key is pressed while the cursor is located on the letters of color inversion (N), on the other hand, the main CPU 121 sets the copying machine to the color inversion mode. In this color inversion mode, a function code instructing the inside of the area designated to be colored black and the outside thereof to be colored is set in the apparatus (Step 7). In this case, "Ready for Copy" is displayed on the liquid crystal display 112, whereas the display lamp 82 for displaying the editing condition stops flickering (Step 8). If the operator selects and executes the inversion mode again, the area for color display is inverted further, and the original state is restored. Since the color inversion mode is not directly concerned with the present invention, a detailed description there of will be omitted.

When the coordinate alteration mode is selected in Step 6 (Y), the coordinate data already supplied is displayed on the liquid crystal display 112 (Step 9). When a rectangle has been designated with two points on the diagonal line, the coordinates $(X_1, Y_1), (X_2, Y_2)$ of these two points are displayed.

In that case, the operator uses the ten keys 80 to modify the coordinate value $X_1$ first (Step 10). The route with the omission of Step 10 shown by a broken line in FIG. 50 indicates a case where no modification with respect to the coordinate value $X_1$ is required. The main CPU 121 monitors whether the selection key 118 is pressed down. When the selection key 118 is pressed (Step 11, Y), the operation of supplying the coordinate value $Y_1$ as that of modifying the next coordinate data can be effected using the ten keys 80 (Step 12). Each time the selection key 118 is pressed (Steps 3, 15), the modification of the next coordinate data may be made thereafter (Steps 14, 16). As shown in FIG. 38 above, the proceeding state conforms to the display state at the point of time the coordinate data $Y_2$ is supplied to the first area.

Even after completion of the operation of modifying the coordinates $(X_1, Y_1), (X_2, Y_2)$ of the two points, the modification of the coordinate data may be made from the beginning (Step 10) by pressing the selection key 118 again (Step 17).

Incidentally, the main CPU 121 always monitors whether the set key 119 is pressed (Steps 18~21) and, when it is pressed, determines whether the modified data exists in any one of all the coordinate values $(X_1, Y_1), (X_2, Y_2)$ of the two points (Step 22). If the modified coordinate data is found (Y), the main CPU registers new coordinate data (Step 23). Provided the remaining area is present (Step 24, Y), the main CPU has the old coordinate data $(X_1, Y_1), (X_2, Y_2)$ displayed on the liquid crystal display 112 (Step 9) to effect the operation of modifying the area. In case no remaining area exists, "Ready for Copy" is displayed because the whole modifying operation has been completed and the display lamp 82 for displaying the editing state stops to flicker (Step 8). As shown in FIG. 39, the proceeding state conforms to the display state where the coordinate data $X_1$ relative to the second area is supplied. FIGS. 53_55 shows display states where coordinate data $X_1$ relative to the third~fifth areas are supplied, respectively.

If no modified data is present in Step 22 (N), on the contrary, whether modified data regarding all the coordinate values $(X_1, Y_1), (X_2, Y_2)$ of the two points exists is determined (Step 25) and, if there is partially modified data, the processing flow returns to the coordinates being modified. If no modified data is contained in all the coordinate values $(X_1, Y_1), (X_2, Y_2)$ of the two points, the area cleared is deleted (Step 26). Provided there is the remaining area, the modifying operation is continued (Step 24).

(6-2) Color Modification

A brief description will subsequently be given of the operation of modifying the marking color.

When the modification/confirmation switch 83 on the console panel 28 is pressed as shown in FIG. 51 first, a sentence reading "Which Do You Select?", together with letters and symbols for making modification, are displayed on the liquid crystal display 112 as shown in FIG. 52. Assuming the color of the first area shown in FIG. 28 is changed from red to blue, the set key 119 shown in FIG. 5 is pressed while the portion marked with color in FIG. 53 is flickering. As a result, the mode for changing the color of the area is established.

At this point in time, the liquid crystal display 112 bears a display as shown in FIG. 56. That is, the number of the area presently set is displayed under the sentence "Which Do You Select?". Numbers from "1" to "5" are displayed in this diagram. The operator makes the numbers flicker in order and presses the set key 119 at the number to be pressed for alteration. The number itself may be caused to flicker or the cursor may be moved to the position corresponding to the target number.

Figure 57:
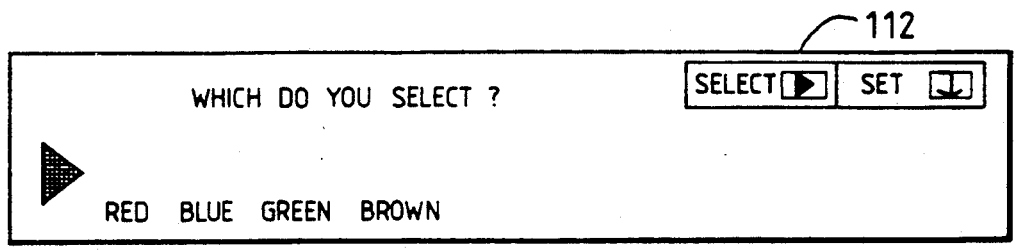
FIG. 57 is a top view of an example of a display on the liquid crystal when a color is selected.
Figure 58:
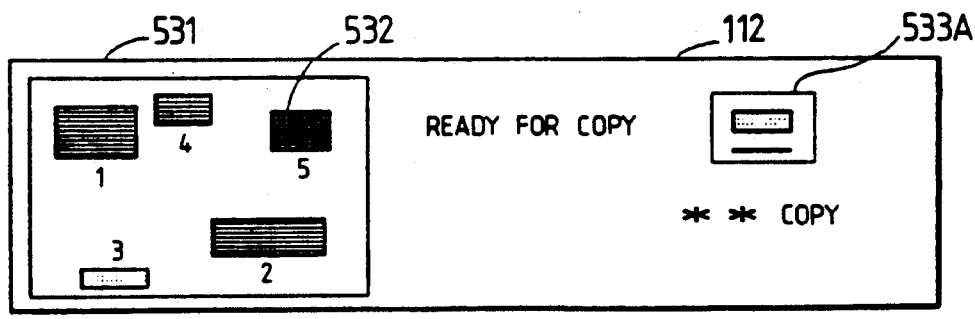
FIG. 58 is a top view of an example of a display on the liquid crystal display when the color display is altered.

If the first number is selected, characters representing colors are displayed under the sentence "Which Do You Select?" as shown in FIG. 57 this time. If the operator selects blue as what is to be employed after alteration, the color display of the first area is changed as shown in FIG. 58, and the copy-making operation can be started with the contents thus altered.

(6-3) Iconographic Display

Display data deriving from the liquid crystal display 112 is utilized when the marking process and the operation of modifying coordinate data is performed in the copying machine of the above-described embodiment. An iconographic (icon) display, as well as information in the form of letters such as "Ready for Copy" and "Which Do You Select?", is displayed on the liquid crystal display 112. The icon is a kind of pictograph and is precisely defined in this embodiment as follows:

(i) Simultaneous display of selective function and event icon.

This refers, for instance, to a case where letters of "color inversion" and an event icon 613 meaning the former are simultaneously displayed as shown in FIG. 52. When the color inversion mode is selected, an unexperienced operator of this copying machine may misunderstand the letters of the "color inversion" themselves and misoperate it. Such an operator, however, will be able to understand what is meant by the event icon 613 step by step as he repeatedly uses the copying machine, and, ultimately, he becomes capable of intuitively recognizing the meaning of the "color inversion" at a glimpse of the event icon 613.

(ii) Display of the contents to be selected and the set mode.

For example, in FIGS. 28-31, there are displayed icons 533A to 533D to the right of the letters reading "Ready for Copy." This indicates the mode presently set. In other words, the icon 533A represents the color marking mode and the icon 533B the extraction mode. The icon 533C displays the deletion mode, whereas the icon 533D indicates the continuous color synthesizing mode. By these icons displayed across the letters of "Ready for Copy", the operator is prevented from performing the copy-making operation in a wrong mode. In addition, these icons are space-saving because each of them can provide information with 16×16 dots.

There are four broken lines drawn in the icon 557 of FIG. 36 and consequently coordinate points $(X_1, Y_1)$, $(X_2, Y_2)$ of two places in existence are displayed. On the contrary, two broken lines are drawn in the icon 557 shown in FIGS. 37 to 39. The upper one indicates the coordinate points $(X_1, Y_1)$ on one side, whereas the lower one designates those $(X_2, Y_2)$ on the other. If the intersecting point of the broken lines is employed to specify the coordinate points, the confirmation of the place is made easier than the case where the coordinate points are caused to directly flicker or where the color of the point or the density only is changed, so that the number of points specified by the number of broken lines is made clear readily.

A selection icon 611 shown in FIG. 52 is used to show the state in which the selection key 118 is ready to be pressed and a set icon 612 to indicate the state in which the set key 119 is ready to be pressed. These icons 611, 612 are composed of letters and figures and display the operations the operator can simply perform.

(iii) Display of area itself.

In the frame 531 shown in FIGS. 29 to 31 are the position and size of each area presently applied, which are displayed in color to represent the area designated. Each of them is a kind of icon which enables the operator to intuitively learn the size and color thereof. When the area and its color are modified, the icon also changes correspondingly. As described above, letters and symbols are employed for the display of the color of the area which the liquid crystal display is unable to display.

(iv) Display of a series of operations.

In the liquid crystal display of this embodiment, the contents to be selected are successively developed as the operations are performed in accordance with the contents to be selected and, when the whole operation is completed, the display such as "Ready for Copy" confirming the completion of the operations appears.

Since the operation of modifying the coordinate data has been described, a description will further be given of the flow of display operation regarding the operation of mutually changing extraction for deletion.

Figure 59:
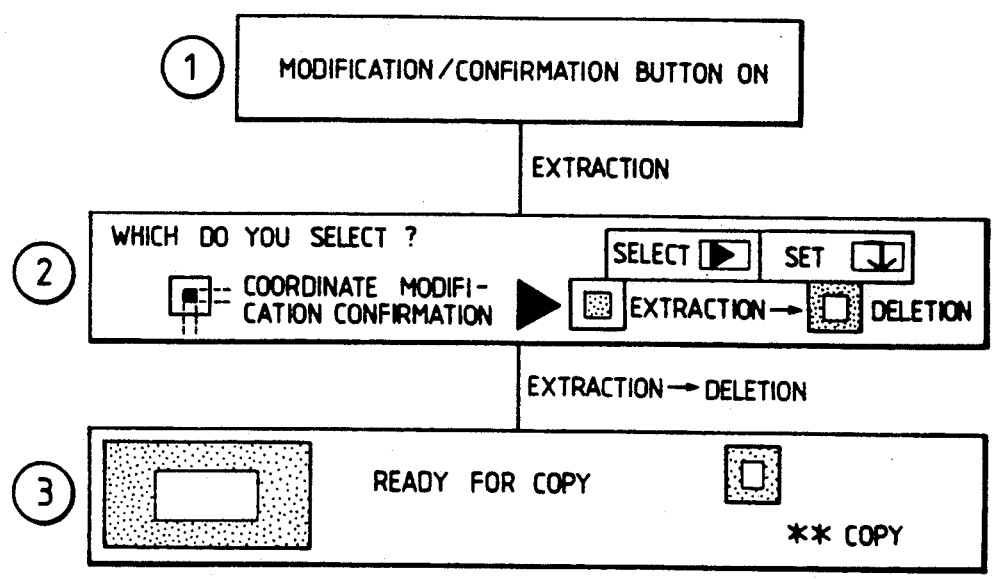
FIG. 59 is a diagram illustrating the flow of the display on the liquid crystal display when the extraction mode is selected.

FIG. 59 is a diagram illustrating the flow of the display on the liquid crystal display when the extraction mode is replaced with the deletion mode. When "extraction" is selected after the modification/confirmation switch 83 is pressed (Step 1), letters reading "Which Do You Select?" are displayed on the liquid crystal display 112 and simultaneously a coordinate modification/confirmation mode, together with an extraction-to-deletion alteration mode, is displayed (Step 2). When the operator adjusts the cursor to the extraction-to-deletion alteration mode, the area extracted is deleted and what is to be deleted is displayed in the frame, whereby the icon indicating the deletion mode and the letters reading "Ready for Copy" are displayed (Step 3).

Figure 60:
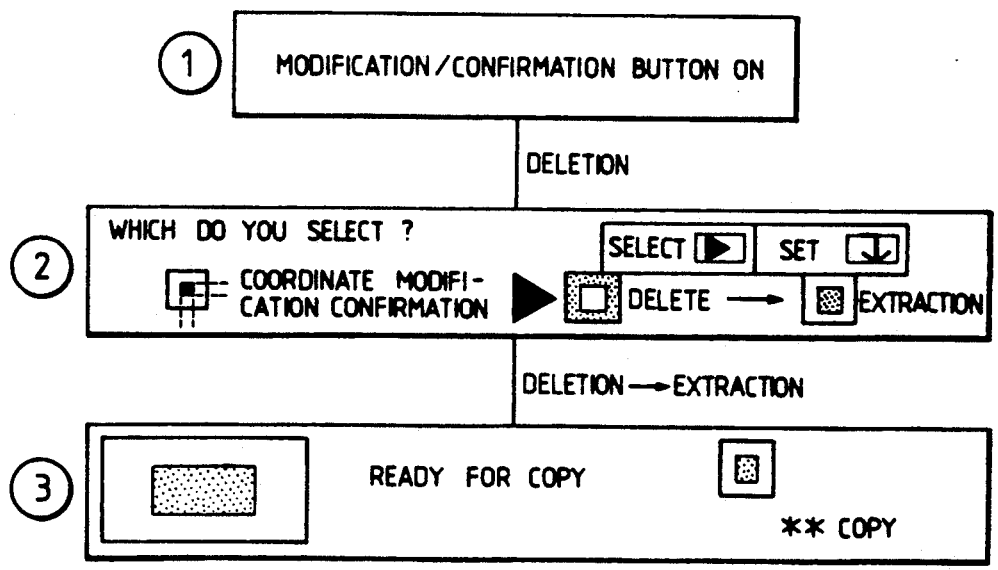
FIG. 60 is a diagram illustrating the flow of the display on the liquid crystal display when the deletion mode is selected.

On the other hand, FIG. 60 shows the opposite operation. When "deletion" is selected and the deletion-to-extraction alteration mode is selected after the modification/confirmation switch 83 is pressed in Step 1 (Step 2), the area specified for deletion is extracted and the area to be deleted is displayed in the frame, whereas the icon indicating the deletion mode and the letters reading "Ready for Copy" are displayed (Step 3).

The operator can confirm the results of the operation while looking at the contents of the liquid crystal display 112 in that manner, so that complicated operations, including the marking process and the modification of coordinate data, are quickly fulfilled without error.

Since the copy density panel is used for the adjustment of the copy density of the original and the marking color density in the above-described embodiment, it becomes possible to make the apparatus compact and reduce its cost. Moreover, as the liquid crystal display and display CPU are employed in the copying machine of this embodiment, Kanjis can be displayed, which makes it possible not only for the operator to readily learn the contents but also for varieties of display such as many icons to be implemented. Detailed display such as "flat color density setting" or "marking color density setting" can be made while the color density is being set and consequently the operability of the operator becomes improvable.

Since the color for use in coloring each marking area is displayed in this embodiment, moreover, the quality of the combination of marking colors can be identified without examining an actual copy and the modification of the color and position of the area involved is readily made with the effect of simplifying the preparation and modification of colored documents.

A modified embodiment of the copying machine will be described, the modified version being basically the same in construction as what has been described in FIGS. 2 to 20. Provided the same drawings as those intended for the description of the embodiment set forth above are employed, the illustration of them will be omitted.

Since multicolor marking is available in the modified embodiment, examples of such marking will be enumerated as follows.

Figure 61:
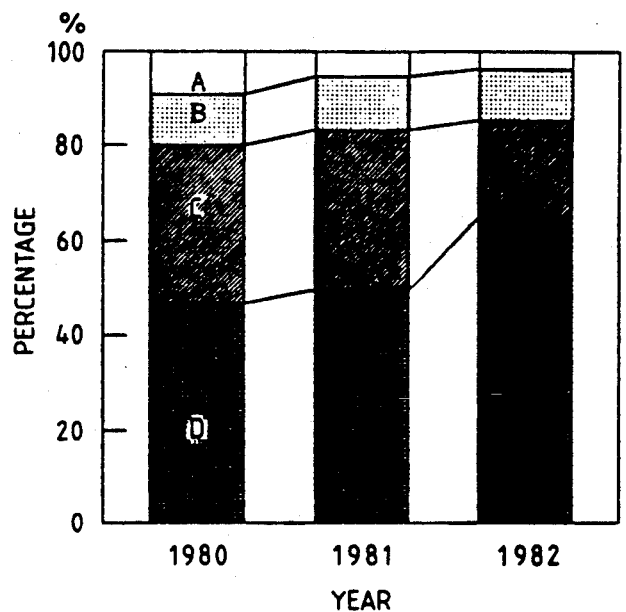
FIG. 61 is a top view of an example of a display of a band graph as an example of multicolor marking.

FIG. 61 is a diagram illustrating an example of band graph processed color marking. As shown in FIG. 61, white portions and dotted portions which are colored red, blue, green and light brown by marking are displayed. Since these marking areas are commonly rectangular, each marking color is designated by specifying each rectangle with two points of diagonal line. In FIG. 61, letters "A" to "D" represent data written to the graph. If dots and variations of copy density are employed, in place of a plurality of colors, to identify the plurality of areas, it becomes difficult to distinguish between the marking portion and the data in the portion having a high density as shown therein (the portion where the data "D" has been written). However, if the plurality of colors are used to color each area differently as in this embodiment, it eliminates difficulties in identifying the letter data because of marking.

Figure 62:
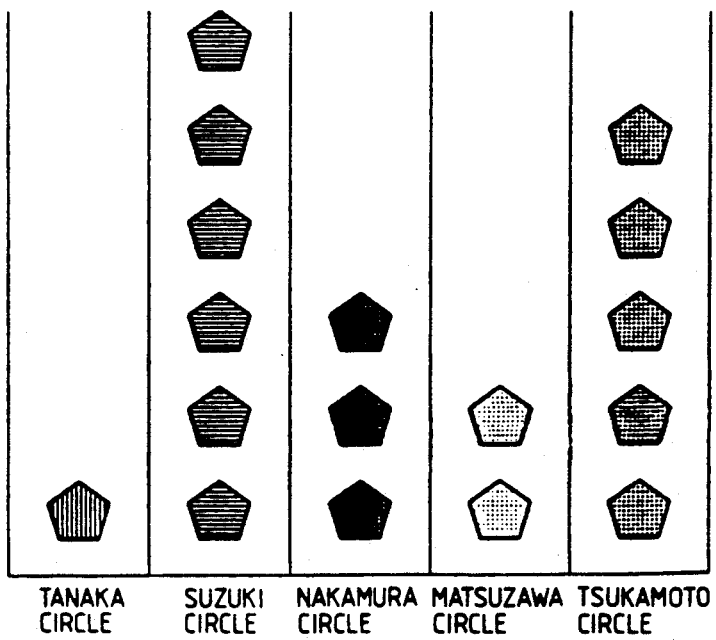
FIG. 62 is a top view of an example of a display of a pictograph as another example of multicolor marking.

FIG. 62 is a diagram illustrating an example of pictograph. Polygons (pentagons) are specified in this example with each QC circle colored differently, thereby an intimate graph is easily prepared. As classification by five colors is required in the case of this example, four colors for use are insufficient. Therefore, one color may be set as black or gray using the main developing device 59M in this case or the copy density is set in two stages relative to parts of one color so that the number of areas expressed thereby is increased. The number of colors itself expressed by overlapping colors or some other means can be increased, depending on the recording system of the color marking apparatus.

Procedure for the color marking process will be described further. Since the steps (1) to (3) are similar to those described above, a brief description of them will be given.

(1) The operator first designates a marking area.

(2) When the operator sets the copying machine in the color marking made and mounts an original on the platen glass plate 55 and pushes the start button 117, the copying machine reproduces the portion designated by the editor pad 132 with a designated color and accommodates the copy on the intermediate tray 33.

The position of the optical lens 58 shown in FIG. 4 is set at an equimultiple position (100%), irrespectively of the magnification to which the copying machine has been set. Moreover, the carriage moved by the mirror 57 stands still in the position of a reference reflection plate and the exposure lamp 56 in this state throws light to the reference reflection plate at all times. The reference reflection plate is installed close to the platen glass plate to keep the copy density constant even though the exposure of the exposure lamp 56 changes. When color marking is conducted, the marking is carried out with a uniform density, irrespective of the image data 502 on the original 501, and the carriage becomes fixed to the position of the reference reflection plate without scanning the platen glass plate 55.

The exposure of the exposure lamp 56 at this time is set at 50% as a target of the equimultiple value during the normal copy-making operation. The reason for this is that the marking is conducted in such a state as if the colored portion is "overlapped" the image. The bias voltage of the developing device 59S1–59S4 (FIG. 8) is set in the "lightest" mode, regardless of the value set by the operator or the initially set value of the copying machine. The lightest mode means the mode of setting the bias voltage at the upper limit value (about 400 V in this embodiment).

To give a marking to only the first marking area designated, a charge pattern corresponding to the area is formed on the photoreceptor drum 51 and the inter-image lamp 141 is used. In other words, the inter-image lamp 141 performs on/off control divided by the image-lamp controller 157 into 128 segments and forms a desired charge pattern by partially erasing the charge on the photoreceptor drum 51 with respect to the first marking area. If the first marking area is marked red, the second marking area is marked blue and the third marking area is marked red again with the same copy density, a charge pattern is formed in the third marking area being marked with the same color as that of the first marking area, simultaneously with the formation of the charge pattern with respect to the first marking area. When the copy density differs, even if the same color is used for the first area, development is carried out separately as in the case of other color marking.

The charge pattern thus prepared is developed by the device involved among the sub-developing devices 59S1 to 59S4 and a light color marking is given as if a marking instrument were used to draw it.

(3) When a predetermined number of sheets of copying paper 60 whose designated area has been given a marking are placed on the intermediate tray 33, the copy-making operation is performed likewise with respect to the second marking area as what is intended for a different color or different copy density. The copying paper 60 passed-through the copy-making operation is delivered onto the intermediate tray 33 likewise.

The aforesaid operation is repeated until the development is completed by the developing devices 59S1 to 59S4.

(4) When the predetermined number of sheets of copying paper 60 are placed on the intermediate tray 33, exposure scanning of the original is started. Copying paper is simultaneously fed from the intermediate tray 33 and normal copy-making operation is performed. When a magnification other than the equimultiple one has been set at the time of the copy-making operation, the position of the optical lens 58 is automatically reset to the position of the magnification. When a copy density has been present, the bias voltage of the main developing device 59M is automatically adjusted to the value of the copy density.

(5-2) Adjustment of Copy Density

The copy density of the portion marked by the sub-developing devices 59S1 to 59S4 has to be adjusted so that it ranges from 0.6 to 1.2, preferably 0.8 to 1.0 in terms of an optical density when a light color marking is given to the specified portion of the image data of the original. The description of the adjustment will be omitted as the contents thereof are the same as those made in the preceding embodiment.

(5-3) Color Marking Control in General

FIGS. 63 to 68 are diagrams illustrating the operations for implementing the color marking process.

Figure 63:
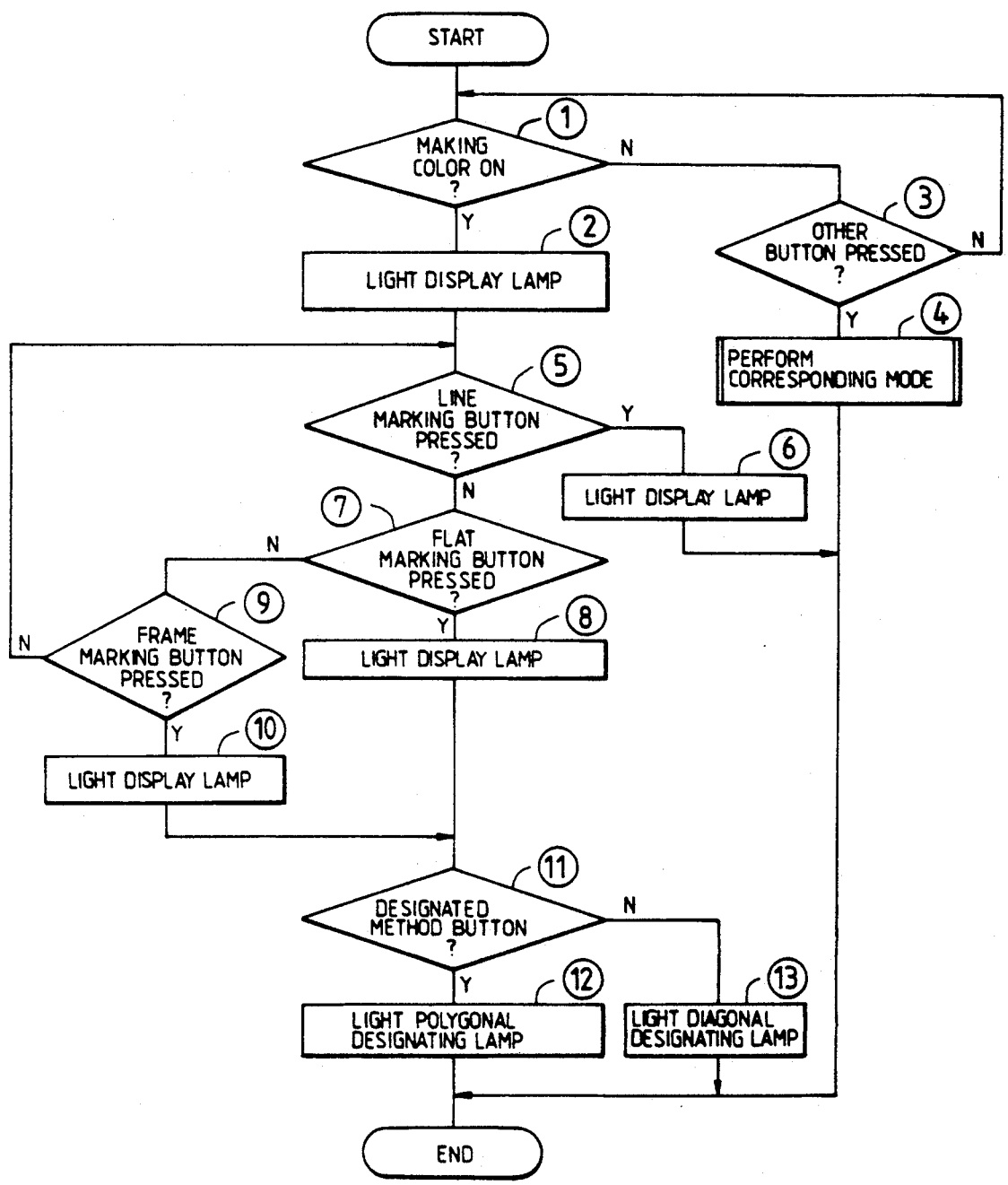

Referring to FIG. 63, there will be given a description thereof. When a marking area is designated, the card CPU 129 (FIG. 6) monitors whether the operator presses the button above the platen 26 with the editor pad. When the marking color button 416 is pressed (Step 1, Y), the card CPU 129 has the corresponding display lamp 424 light to provide the color marking mode (Step 2). If any other button is pressed (Step 3), the operation in the corresponding mode is carried out (Step 4).

If the color marking mode is set, the CPU 129 monitors the state in which an ordinary marking button 431, a frame marking button 432 and a line marking button 433 are pressed. If the line marking button 433 is pressed (Step 5, Y), a line marking display lamp 438 is lit (Step 6). If the flat marking button 431 is pressed (Step 7, Y), an flat marking display button 438 is lit (Step 8). If the frame marking button 433 is pressed (Step 9, Y), a frame marking display lamp 438 is lit (Step 10).

The CPU 129 monitors whether the designated method button 419 has been pressed to confirm the designated method because a polygon is designated when the buttons 431, 432 are pressed (Step 11). When the designated method button 429 is pressed (Y), the CPU 129 causes the polygonal designating lamp 427 to light (Step 12). If the designating method button 429 is not pressed, the diagonal designating lamp 429 is initially lit (Step 13).

Figure 64B:
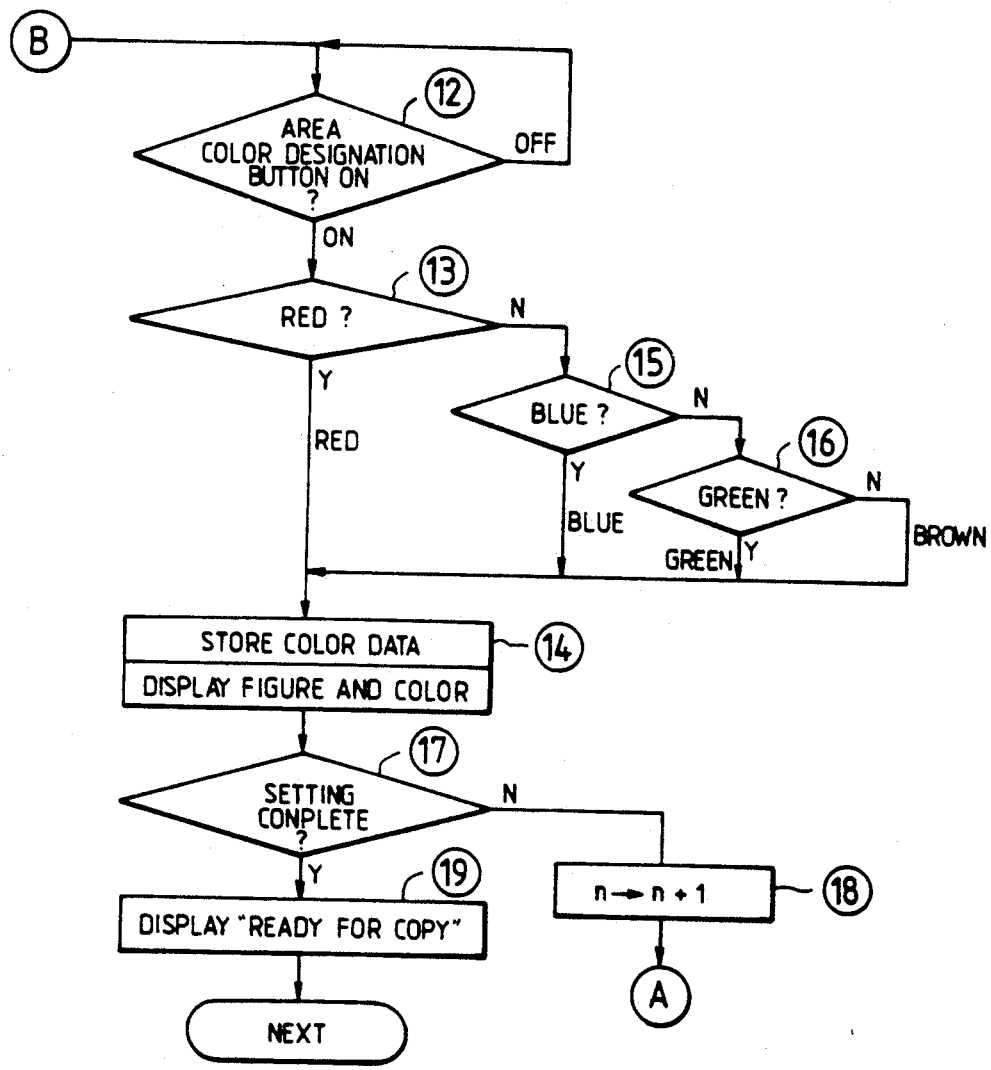

While the line marking display lamp 438 is lit in FIG. 64 (Step 1, Y), the two point data input for specifying both the ends of the line is set on standby (Step 2). While the ordinary marking or frame marking display lamp 438 is lit (Step 1, N), on the contrary, the CPU determines whether the rectangle has been designated by monitoring the on/off state of the diagonal designating lamp 426 and the polygonal designating lamp 427 (Step 3). When the diagonal designating lamp 426 is held on, the two point coordinate data input is set on standby (Y) (Step 2). When the polygonal designating lamp 427 is held on, more than two point data input is set on standby (Step 4).

If the two point coordinate data is supplied in the standby state of the coordinate data in Step 2, the coordinate data of the area determined by the diagonal line is stored in the RAM being controlled by the CPU 129 (Step 5). The data is further transferred to the main CPU 121 of the base machine 21 and stored in the storage areas of both the display CPU 127 and the inter-image CPU 122.

If the coordinate data of more than two and maximum 16 points specifying the area in Step 4 is supplied (Y), on the other hand, the coordinate data of the area thus specified is stored in the RAM being controlled by the main CPU 129 (Step 5). The data is also transferred to the main CPU 121 of the base machine 21. The data is stored in the storage areas of the display CPU 127 and the inter-image CPU 122.

When the data input and the data storage with respect to one area are completed, the CPU 129 waits for one of the color designating buttons 434 to 437 to be pressed (Step 6). When the color designating button 435 is pressed, it means that blue has been designated (Step 7, Y) and the corresponding display lamp 438 is lit (Step 8). When the color designating button 436 is pressed, green has been designated (Step 9, Y) and the corresponding lamp 438 is lit (Step 8). When the color designating button 437 is pressed, light brown has been designated (Step 10, Y) and the corresponding display lamp 438 is lit (Step 8). Unless these three kinds of buttons 435 to 437 are pressed (Step 6, N), it is determined that red has initially been designated and the display lamp 438 corresponding red is lit (Step 11).

When the operator presses the area/color designating button 421 on confirming whether the display lamp 438 corresponding to the color designating buttons 434 to 437 has been lit, the designation of the color intended for the input area is determined (Step 12, Y). In other words, if the area thus specified is red in color (Step 13, Y), data indicating red is stored in the storage area of the coordinate data signifying the figure of the area (Step 14). If the area specified is blue in color (Step 15, Y), data indicating blue is stored in the storage area of the coordinate data signifying the figure of the area (Step 14). If the area specified is green in color (Step 16, Y), data indicating green is stored in the storage area of the coordinate data signifying the figure of the area (Step 14). If the area specified is green in color (Step 16, Y), data indicating green is stored in the storage area of the coordinate data signifying the figure of the area (Step 14). If the area specified does not fall under any one of the aforesaid cases, e.g., it is light brown in color (Step 16, N), data indicating light brown is stored in the storage area of the coordinate data signifying the figure of the area.

Unless the operator presses a setting termination button 423 in that state (Step 17, N), a numerical value starting with n=1 is incremented by +1 (Step 18) and a coordinate input and color designation with respect to the following area is carried out (Steps 1 to 17). If the operator presses the setting termination button 423 in Step 17 or the coordinates designated relates to the 16th place as the maximum value allowing in this apparatus (Step 17, Y), letters reading "Ready for Copy" are displayed on the liquid crystal display 112 (Step 19).

Figure 65:
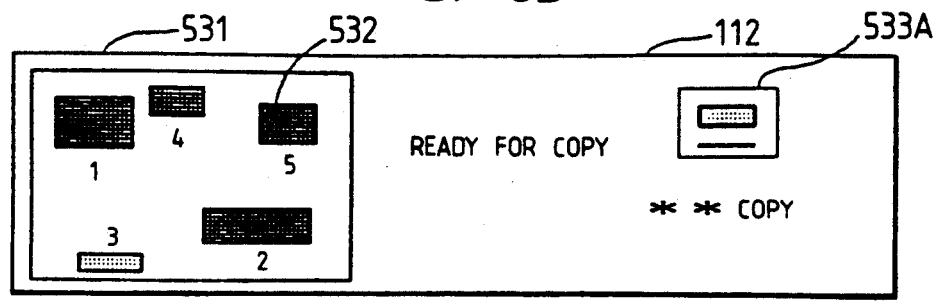
FIG. 65 is a top view illustrating an example of display contents of the liquid crystal display in the color marking mode.

FIG. 65 shows an example of the contents of the liquid crystal display in the aforesaid state. A frame 531 indicating the maximum size in which an area of the coordinate input pad 405 shown in FIG. 18 can be designated is displayed near the left end of the liquid crystal display 112. It is displayed in color therein as an area where the position and size Of each area presently supplied. The frame 531 may be displayed in conformity with the size of the original supplied as occasion demands. Area numbers "1" to "5" are displayed near the areas 532 designated, respectively. In this example, only the number "3" area is colored blue and the remaining areas are colored red.

Information about the aforesaid "Ready for Copy" is displayed with the combination of *Kanjis* and *Kanas*

Figure 66:
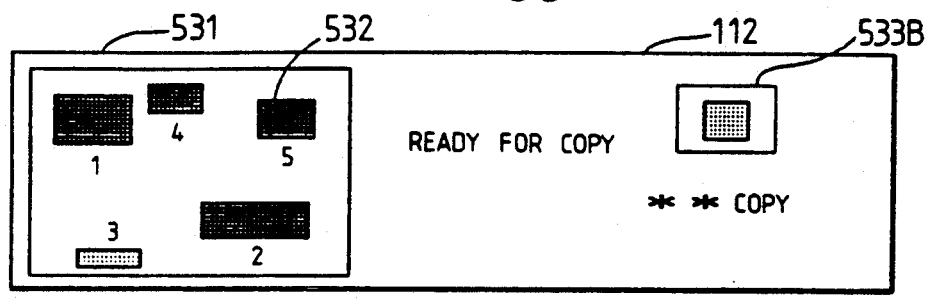
FIG. 66 is a top view illustrating an example of the display contents of the liquid display in the extraction mode.
Figure 67:
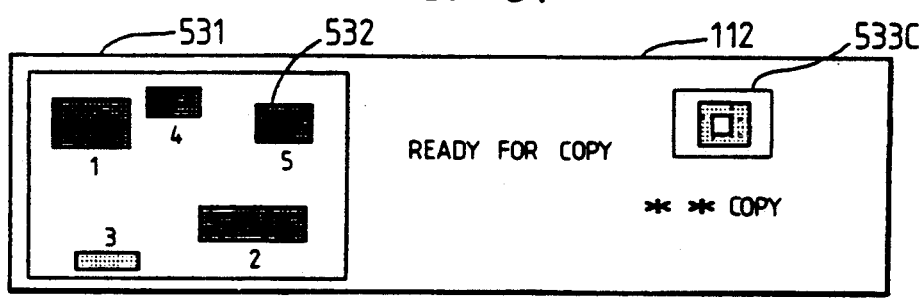
FIG. 67 is a top view illustrating an example of the display contents of the liquid crystal display in the deletion mode.
Figure 68:
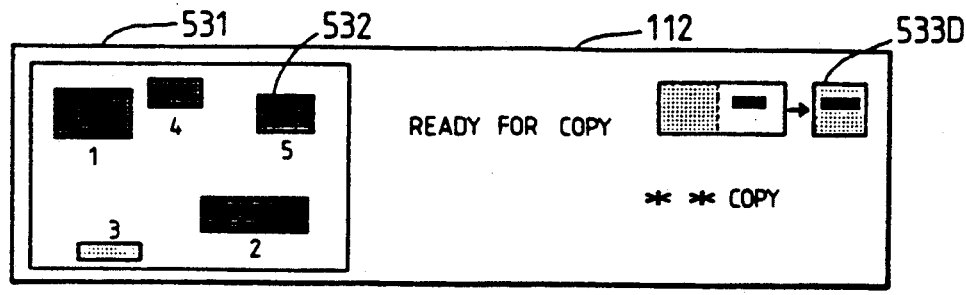
FIG. 68 is a top view illustrating an example of the display contents of the liquid crystal display in the continuous color synthesizing mode.

(Japanese characters) in the central portion of the liquid crystal display 112 shown in FIG. 65 and an icon 533A is displayed to the left thereof. The icon 533A indicates that the mode presently set is the color marking one. FIGS. 66 to 68 shows icons in the other modes for reference. Of the icons, what is shown in FIG. 66 is the icon 533B in the extraction mode and the icon 533C of FIG. 67 is for use in the deletion mode. In FIG. 68, further, there is shown the icon 533D for display when the continuous color synthesizing is carried out. Since a different icon 533 is displayed according to the mode presently set, the operator is prevented from performing a wrong operation.

With reference to the description in Step 4 of FIG. 64, the maximum 16 places of a polygon have been defined as those which can be designated. This conforms to the fact that maximum 16 coordinates can be designated in the copying machine of this embodiment. Although only one area can be specified if a 16-angle area is to be designated, maximum five areas can be designated in the case of a triangle. If polygonal designation is made in the case of a rectangular, maximum four places can be designated. When an area is designated in a rectangular or regular square by making use of its diagonal lines, maximum eight areas can be designated.

A marking operation will subsequently be described. In the copying-making operation in the designated area, the marking operation is as in the above-described embodiment of FIG. 34. Accordingly, the description thereof will be omitted except for the control when the copying paper accommodated on the intermediated tray 33 is continuously marked with a different color to implement the color marking process by reference to FIG. 69.

Figure 69:
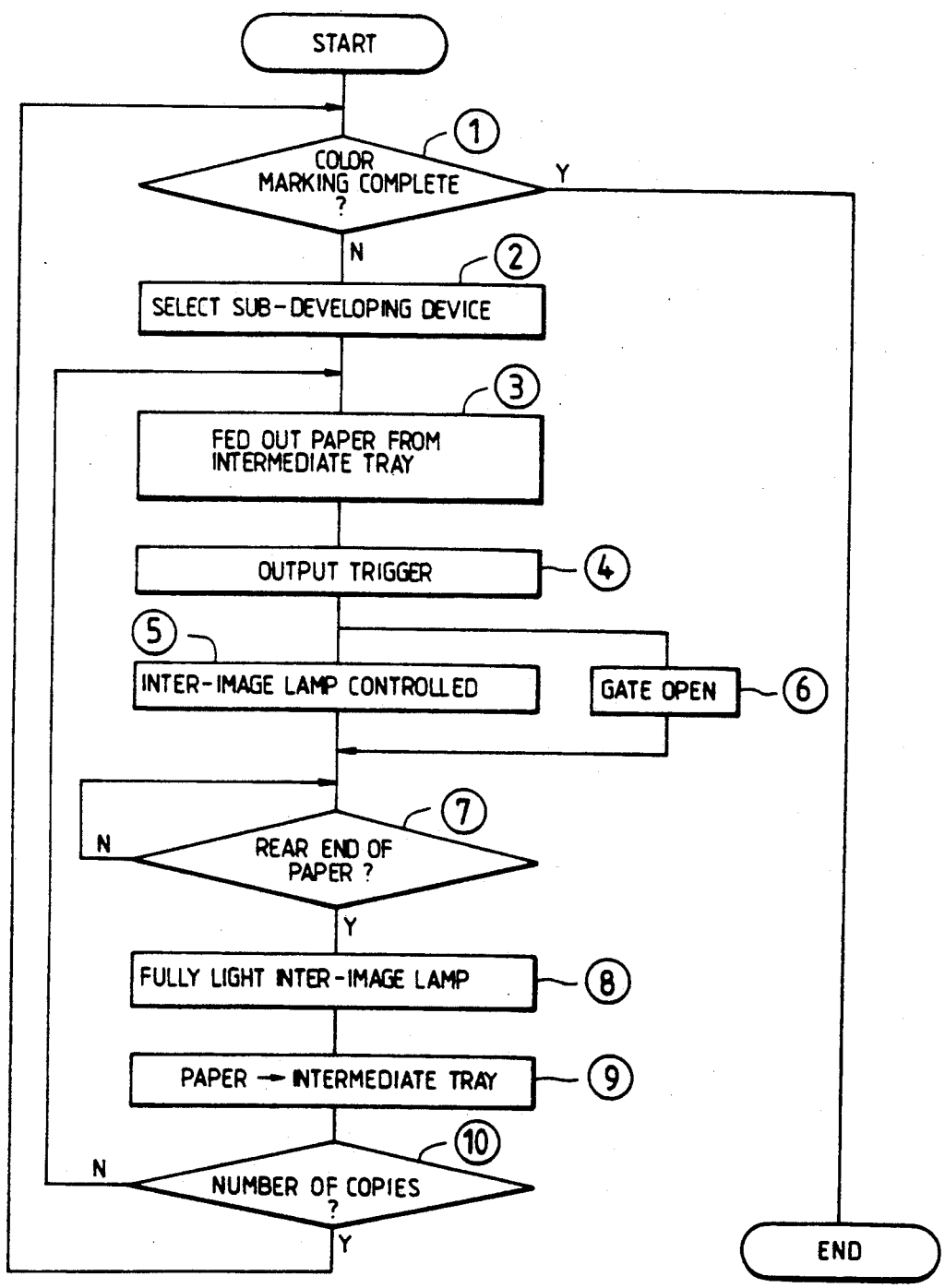

As shown in FIG. 69, the main CPU 121 determines whether the color marking operation has been completed (Step 1) and, if the marking operation by means of the other sub-developing device 59S is left unperformed (N), selects the sub-developing device 59S for fulfilling the development to be subsequently conducted (Step 2). In this state, the copying paper 60 is caused to be sent out of the intermediate tray 33 (Step 3). Then a trigger for driving the inter-image lamp at predetermined timing is produced (Step 4) and the data corresponding to the area involved is read one line after another, so that the inter-image lamp CPU 122 controls the inter-image lamp 141 to switch it on/off (Step 5).

In addition, the gate (registration gate) for starting to move the copying paper moved halfway and stopped once is opened in the tray control CPU 128 (Step 6).

The inter-image lamp 141 controls the light-emitting element to turn it on/off with respect to the area designated and then determines whether it has arrived at the position corresponding to the rear end of the copying paper 60 (Step 7). When the inter-image lamp 141 has reached to the rear end thereof, it lights fully (Step 8) under normal control and has the copying paper 60 after fixation delivered onto the intermediate tray 33 (Step 9). The aforesaid operation is repeated a number of times equivalent to the number of copies (Steps 3~10). This sort of operation is repeated until the color marking operation is completed, i.e., the sub-developing devices 59S1~59S4 complete development (Steps 1~10).

The control of the copying paper accommodated on the intermediate tray 33 is as described in the embodiment of FIG. 35 and the description thereof will be omitted here.

In the above-described embodiment, a marking is given to the copying paper first and image data of the original is superposed thereon during the normal copy-making operation. However, it is acceptable to perform the operation in reverse order.

Since marking is carried out prior to the recording of the image data on the original in the above-described embodiment, the advantage is that the color-superposed position is free from turbidity. Since the copy density panel is used to adjust the marking color density in addition to the copy density of the original in this embodiment, it is possible to make the apparatus compact and reduce its cost. Further, since the liquid crystal display and the display CPU both are employed, *Kanjis* can be used, and it is easier to learn the contents of the display and possible to provide versatile displays. Detailed display, e.g., "flat color density being set" or "marking color density being set", can be made during the color density is being set, whereby operability on the part of the operator is improved.

Moreover, documents mostly offering visually favorable marking are obtainable because the copy density of the color for use in marking is kept low and thus usable for light expression in this embodiment.

Even when a plurality of colors are employed for marking in this embodiment, they can be specified collectively before copy-making operation is started. Accordingly, the color marking apparatus according to the present invention is operated more expeditiously than any of the conventional color recorders in which one color is specified and then the copy-making operation is completed before the next color is specified. Moreover, the operator is prevented from forgetting to specify marking some of the areas. Since it has been arranged that the color for use in coloring each area is displayed in this embodiment, the operator is allowed to identify the quality of the combination of colors for marking without taking a look at an actual copy and, as the color and the position of an area can readily be modified, the modification as well as preparation of colored documents can be made without difficulty.

Since two of the first and second recording means and the area designating means are provided according to the present invention, each specified area in a document can be marked collectively for a short time and this contributes to improving office business and economic efficiency. Moreover, because one of the recording means is operated before the other one is operated, two color developing agents are prevented from mixing with each other and, if necessary, can be recovered for reutilization.

Since a particular portion of image data is marked according to the present invention, positional precision required for marking is not much greater than what is needed in a case where letters in a specified area on an original are marked with a color different from that of the area. Therefore, the apparatus can be manufactured less expensively. It is also possible to provide documents having greater and more natural visual appeal than those in which the color of image data such as letters inside the area is made different from what is outside the area.

POSSIBILITY OF INDUSTRIAL UTILIZATION

As set forth above, like a copying machine, a facsimile and a printer, the color marking apparatus according to the present invention is useful as a recording apparatus for recording a document or data similar to the document and particularly fit for the preparation of such a document in which part of data display has to be emphasized.

What is claimed is:

1. A color marking apparatus comprising:
   first recording means for copying the whole area of an original with a first color to form an image;
   area designating means for designating an area on the original;
   second recording means for superimposing a second color different from said first color onto the image formed by said first recording means to mark the area designated by said area designating means;
   selection means for alternatively selecting the recording operations of said first and second recording means;
   control means for controlling said recording operation in an order selected by said selection means; and
   copy density controlling means for controlling the first recording means and said second recording means such that said designated area marked by said first recording means has a copy density different from a copy density of said designated area marked by said second recording means.

2. A color marking apparatus as claimed in claim 1, wherein said selection means is designed to select said second recording means before selecting said first recording means.

3. A color marking apparatus as claimed in claim 1, wherein said copy density provided by said second recording means is lower than said copy density provided by said first recording means and ranges from 0.6 to 1.2 in terms of an optical density.

4. A color marking apparatus as claimed in claim 1, wherein said first and second recording means are xerographic recorders, and wherein said copy density controlling means controls said first and second recording means to have said difference in copy densities by one of or a combination of controlling the amount of charges given to a photoreceptor, controlling the exposure of an image to the photoreceptor, and controlling the bias of a developing electrode.

5. A color marking apparatus comprising:
   first recording means for copying the whole area of an original with a first color having a first copy density to form an image;
   area designating means for designating an area on the original;
   second recording means for superimposing a second color different from said first color and having a second copy density onto the image formed by said first recording means to mark the area designated by said area designating means;
   selection means for alternatively selecting the recording operations of said first and second recording means; and
   control means for controlling said recording operation in an order selected by said selection means; and copy density setting means for separately setting the first and second copy densities provided by said first and second recording means respectively.

6. A color marking apparatus as claimed in claim 5, wherein said selection means is designed to select said second recording means for coloring before selecting said first recording means for coloring.

7. A color marking apparatus as claimed in claim 5, wherein a copy density provided by said second recording means is lower than the copy density provided by said first recording means and ranges from 0.6 to 1.2 in terms of an optical density.

8. A color marking apparatus as claimed in claim 7, wherein said first and second recording means are those for recording on the principle of xerography and wherein the difference between the copy densities is effectuated by one of or a combination of the amount of charges given to a photoreceptor, the exposure of an image to the photoreceptor, and the set value of the bias of a developing electrode.

9. A color marking apparatus comprising:
   first recording means for copying the whole area of an original with a first color to form an image;
   area designating means for designating one of a plurality of areas on the original;
   second recording means for superimposing a second color different from said first color onto the image formed by said first recording means to mark the area designated by said area designating means;
   selection means for alternatively selecting the recording operations of said first and second recording means;
   control means for controlling said recording operation in an order selected by said selection means;
   marking color designating means for designating a marking color on the basis of each area designated by said area designating means; and
   display means for displaying the area designated by said area designating means.

10. A color marking apparatus as claimed in claim 9, wherein said selection means is designed to select said second recording means for coloring before selecting said first recording means for coloring.

11. A color marking apparatus as claimed in claim 9, wherein a copy density provided by said second recording means is lower than the copy density provided by said first recording means and ranges from 0.6 to 1.2 in terms of an optical density.

12. A color marking apparatus as claimed in claim 9, wherein said color marking apparatus further comprises color density designating means for designating the density of each color for marking.

13. A color marking apparatus as claimed in claim 9, wherein said display means displays the area designated with the color for marking.

14. A color marking apparatus as claimed in claim 9, wherein said display means displays the area designated with letters signifying the color for marking.

15. A color marking apparatus as claimed in claim 9, wherein said display means displays the area designated with a symbol specifying each area.

16. A color marking apparatus comprising first recording means for copying the whole area of an original with a first color; area designating means for designating at least one area on the original; second recording means for coloring the designated area with a second color different from said first color; selection means for alternatively selecting the recording operations of said first and second recording means; control means for controlling said recording operation in an order selected by said selection means; marking color designating means for designating a marking color on the basis of each area designated by said area designating means; modifying mode setting means for setting said apparatus to a data modifying mode; modifying contents display means for displaying the contents being modified in said modifying mode.

17. A color marking apparatus as claimed in claim 16, wherein said modifying contents display means displays said modifying contents with letters and pictograph.

18. A color marking apparatus as claimed in claim 16, wherein said modifying contents display means displays each choice in the modifying mode.

19. A color marking apparatus as claimed in claim 16, wherein said modifying contents display means switches the display of the menu of modifying contents, the choice and the completion of modification successively in accordance with the stage of the modifying operation.

* * * * *